United States Patent
Shah et al.

(10) Patent No.: US 12,500,042 B2
(45) Date of Patent: Dec. 16, 2025

(54) SOLID-STATE HYBRID SUPERCAPACITOR WITH NICKEL-COBALT-LAYERED DOUBLE HYDROXIDE NANOFLOWERS SUPPORTED ON JUTE STICK-DERIVED ACTIVATED CARBON NANOSHEETS

(71) Applicant: KING FAHD UNIVERSITY OF PETROLEUM AND MINERALS, Dhahran (SA)

(72) Inventors: Syed Shaheen Shah, Nishikyo-ku (JP); Md. Abdul Aziz, Dhahran (SA); Zain Hassan Yamani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 185 days.

(21) Appl. No.: 18/502,561

(22) Filed: Nov. 6, 2023

(65) Prior Publication Data
US 2025/0149262 A1  May 8, 2025

(51) Int. Cl.
*H01G 11/32* (2013.01)
*H01G 11/04* (2013.01)
(Continued)

(52) U.S. Cl.
CPC .............. *H01G 11/32* (2013.01); *H01G 11/04* (2013.01); *H01G 11/24* (2013.01); *H01G 11/26* (2013.01)

(58) Field of Classification Search
CPC ........ H01G 11/86; H01G 11/38; H01G 11/36; H01G 11/46; H01G 11/26; H01G 11/24; H01G 11/04; H01G 11/32
See application file for complete search history.

(56) References Cited

U.S. PATENT DOCUMENTS

2022/0199994 A1\* 6/2022 El-Kady ............... H01M 4/62

FOREIGN PATENT DOCUMENTS

| CN | 106449136 B | 4/2019 | |
| CN | 109650465 A \* | 4/2019 | ............. H01G 11/86 |

(Continued)

OTHER PUBLICATIONS

Zhiye Huang, et al., "Bimetallic organic framework in situ fabrication nanoflower-like cobalt nickel sulfide and ultrathin layered double hydroxide arrays for high-efficient asymmetric hybrid supercapacitor", Journal of Alloys and Compounds, vol. 938, Mar. 25, 2023, 7 pages (Abstract only).

*Primary Examiner* — David M Sinclair
(74) *Attorney, Agent, or Firm* — Oblon, McClelland, Maier & Neustadt, L.L.P.

(57) ABSTRACT

An electrode including a substrate, a binding compound, and a composite. The composite includes jute-activated carbon and a nickel-cobalt-layered double hydroxide (NiCoLDH). Particles of the NiCoLDH are in the form of nanoflowers with an average size of 5-15 μm. The nanoflowers comprise nanosheets with an average thickness of 5-20 nm. The particles of the jute-activated carbon are in the form of interconnected nanosheets, which form a porous carbon framework. The porous carbon framework connects the nanoflowers, thereby forming an interconnected structure in the composite. A mixture of the composite and the binding compound is coated on the surface of the substrate. The electrode can be included in supercapacitors and power banks.

19 Claims, 56 Drawing Sheets

(51) Int. Cl.
 *H01G 11/24* (2013.01)
 *H01G 11/26* (2013.01)

(56) References Cited

FOREIGN PATENT DOCUMENTS

| | | |
|---|---|---|
| CN | 111261419 B | 3/2022 |
| CN | 112992558 B | 4/2022 |
| CN | 114446670 A | 5/2022 |

\* cited by examiner

SOLID-STATE HYBRID SUPERCAPACITOR WITH NICKEL-COBALT-LAYERED DOUBLE HYDROXIDE NANOFLOWERS SUPPORTED ON JUTE STICK-DERIVED ACTIVATED CARBON NANOSHEETS

STATEMENT OF ACKNOWLEDGEMENT

The support of the Deputyship for Research & Innovation, Ministry of Education in Saudi Arabia for funding this research work is gratefully acknowledged.

BACKGROUND

Technical Field

The present disclosure is directed to the field of energy storage systems, and more particularly, to a solid-state hybrid supercapacitor including nickel-cobalt-layered double hydroxide nanoflowers supported on jute stick-derived activated carbon nanosheets.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With the rise in the use of electric vehicles, mobile devices, and wearable electronics, there is an increasing need for improved energy storage systems. Various applications, ranging from portable electronic devices to large-scale renewable energy installations, demand energy storage systems with higher energy storing capacity. Among the known energy storage systems, supercapacitors have gained significant attention due to their rapid charge-discharge capabilities, long cycle life, low maintenance cost, and high power densities. Supercapacitors primarily store energy via electrostatic charge accumulation, distinguishing them from conventional batteries, which rely on chemical reactions. However, the limited energy density of the supercapacitors remains a challenge. While supercapacitors excel in power delivery, the overall energy storage often lags behind that of batteries, which prevents the standalone applicability in scenarios where extended energy delivery is needed.

The materials used to make the supercapacitors significantly impact the capacity. Traditional carbon-based materials offer good conductivity and stability, but often fall short in terms of capacitance. Transition-metal-based layered double hydroxides (LDHs) have been explored as potential materials to enhance capacitance. LDHs are characterized by their general chemical formula $M^{2+}_{1-x}M^{3+}_{x}(OH)_2](A^{n-})_{x/n}yH_2O$, in which the host layers consist of divalent ($M^{2+}_{1-x}$) and trivalent ($M^{3+}_{x}$) metal cations, whereas $A^{n-}$ occupies the charge-balancing portion in the interlayer space anions, such as nitrates. LDHs have a unique structure that can change when different molecules are added between their layers, which helps to improve the performance of the material in energy storage. The insertion of various ions or molecules between the layers, known as intercalation, expands the space between the layers, which aids in better ion movement, speeds up reaction times, and improves the material's energy storage ability. Furthermore, the insertion of certain molecules or ions can influence how ions move, how fast reactions occur, and the overall energy storage performance.

Nickel-based LDHs have particularly been explored in supercapacitor development due to their high energy storage potential, however they can have stability issues. To overcome this, cobalt can be added to the nickel hydroxide to stabilize it and increase its conductivity. Additionally, by using nitrate ions, the spacing between layers in nickel-cobalt-layered double hydroxide (NiCoLDH) nanosheets can be adjusted, resulting in better ion movement. Nickel-based LDHs, thus, result in improved energy storage, charge and discharge speeds, durability, and overall energy storage capacity. However, the electrochemical capabilities of energy storage are still constrained by challenges, such as the sluggish transport of electrolyte ions and poor electronic conductivity of electrode materials.

Therefore, there is a need for the development of electrode materials based on transition metals that possess the ability to facilitate rapid charge-discharge rates, exhibit high specific power, and offer a high specific energy. It is one object of the present disclosure to provide a supercapactior that includes a composite of a NiCoLDH and a carbon-based material.

SUMMARY

In an exemplary embodiment, the present disclosure relates to an electrode. The electrode includes a substrate, a binding compound, and a composite. The composite includes jute activated carbon and a nickel-cobalt-layered double hydroxide (NiCoLDH). Particles of the NiCoLDH are in a form of nanoflowers with an average size of 5-15 μm. The nanoflowers comprise nanosheets with an average thickness of 5-20 nm. The particles of the jute-activated carbon are in a form of interconnected nanosheets, which form a porous carbon framework. The porous carbon framework connects the nanoflowers, thereby forming an interconnected structure in the composite. A mixture of the composite and the binding compound is coated on the surface of the substrate.

In some embodiments, the mixture comprises 70-95 wt. % of the composite, based on a total weight of the binding compound and the composite.

In some embodiments, the NiCoLDH comprises $Co^{2+}$ and $Co^{3+}$.

In some embodiments, the NiCoLDH has a molar ratio of Ni to Co of 1:2 to 2:1.

In some embodiments, the nanosheets of the NiCoLDH have an average width of 50-500 nm and an average length of greater than 100 nm.

In some embodiments, the nanosheets of the jute-activated carbon have an average thickness of from 7 to 15 nm and an average width of 50-200 nm.

In some embodiments, the porous carbon framework of the jute-activated carbon comprises pores greater than 200 nm in size.

In some embodiments, a surface area of the jute-activated carbon is greater than 2,000 m²/g.

In some embodiments, the jute-activated carbon has a pore volume of from 0.5-1.5 cm³/g.

In some embodiments, the composite comprises 25-45 wt. % carbon, 15-35 wt. % oxygen, 10-30 wt. % cobalt, and 10-30 wt. % nickel, based on a total weight of the composite.

The present disclosure also relates to a method of making the electrode. In an exemplary embodiment, the method includes pyrolyzing jute sticks at a temperature of 300-500°

C. to form partially carbonized jute powder, mixing the partially carbonized jute powder with a base and pyrolyzing at a temperature of 700-900° C. to form the jute-activated carbon, mixing a cobalt salt, a nickel salt, and cetrimonium bromide in a solvent to form a first solution, heating the first solution and the jute activated carbon in an autoclave for 10-20 hours at a temperature of 150-250° C. to form the composite, and coating the surface of the substrate with the mixture to form the electrode.

The present disclosure further relates to a supercapacitor. The supercapacitor includes a negative electrode, a positive electrode, and a solid-state electrolyte. The negative electrode includes a second substrate, the jute-activated carbon, and a binding compound. A second mixture of the jute-activated carbon and the binding compound is coated on a surface of the second substrate. The positive and negative electrodes are disposed facing each other. The solid-state electrolyte is present between the positive and negative electrodes to form the supercapacitor.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
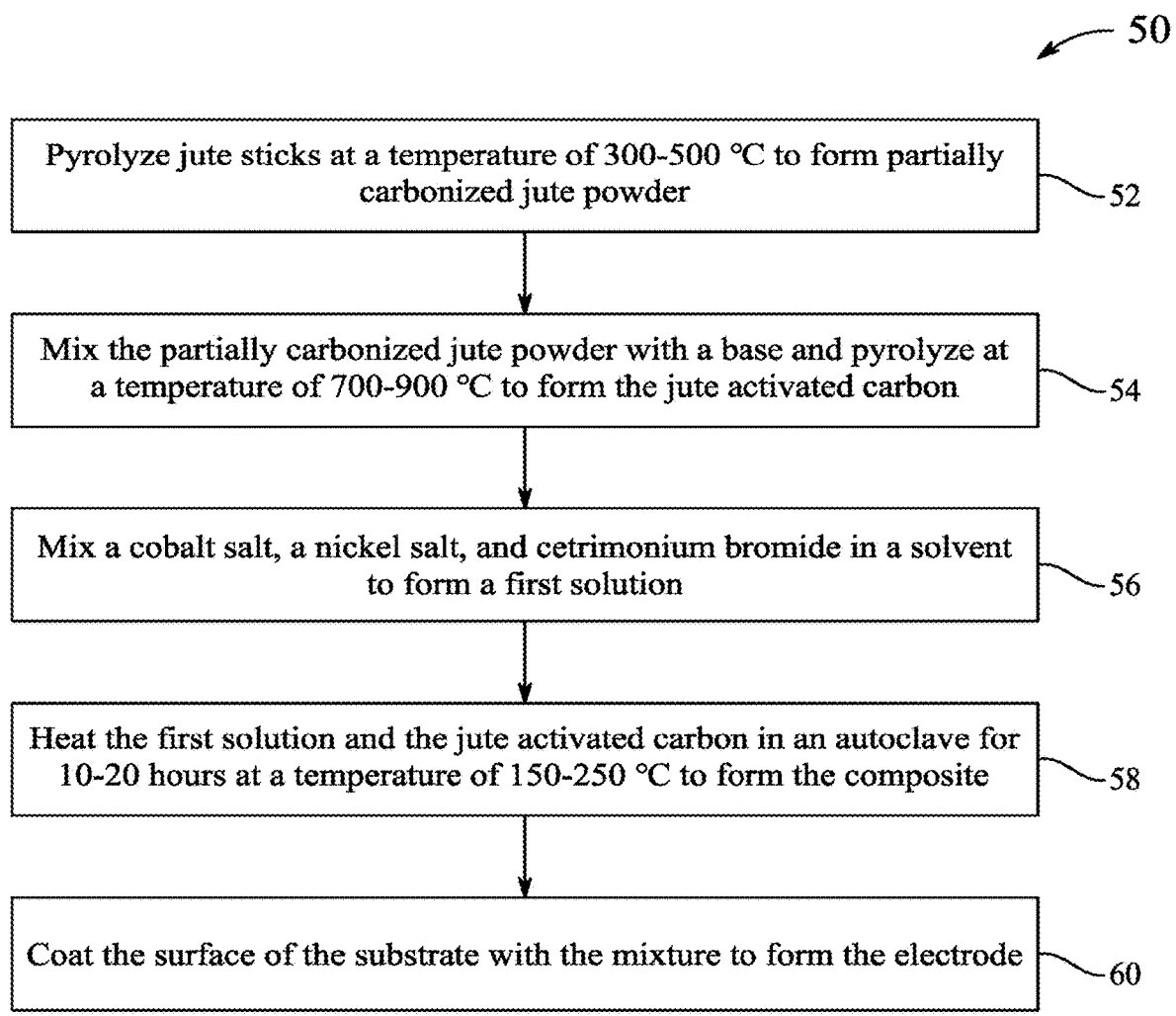
FIG. 1A illustrates a flow chart of a method of preparing jute-derived activated carbon (JAC) using two-step pyrolysis and a composite, according to certain embodiments.

In the drawings, like reference numerals designate identical or corresponding parts throughout the several views.

Further, as used herein, the words "a," "an" and the like generally carry a meaning of "one or more," unless stated otherwise.

As used herein, "particle size" and "pore size" may be considered the lengths or longest dimensions of a particle and a pore opening, respectively.

As used herein, the term "electrode" refers to an electrical conductor that contacts a non-metallic part of a circuit, e.g., a semiconductor, an electrolyte, a vacuum, or air.

As used herein, the term "electrochemical cell" refers to a device capable of generating electrical energy from chemical reactions or using electrical energy to cause chemical reactions.

As used herein, the term "electrolyte" is a substance that forms a solution that can conduct electricity when dissolved in a polar solvent.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of naturally occurring nickel $^{28}$Ni include $^{58}$Ni, $^{60}$Ni $^{61}$Ni, $^{62}$Ni, and $^{64}$Ni.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

Various embodiments of the present disclosure relate to all-solid-state supercapacitors including activated carbon sourced from sustainable jute sticks, termed as JAC. By integrating the JAC with a layered double hydroxide, hybrid nanocomposites were formed. Such composites, when used in all-solid-state asymmetric hybrid supercapacitors, demonstrated sufficient specific capacitance and energy density.

An electrode is described. The electrode includes a substrate, a binding compound, and a composite. The substrate is made from at least one material selected from the group consisting of stainless steel, aluminum, nickel, copper, platinum, zinc, tungsten, and titanium. In a preferred embodiment, the substrate includes nickel, more preferably nickel foam (NF). The NF substrate may optionally include metals in addition to nickel, such as iron, aluminum, or alloys thereof. In an embodiment, at least 80-99%, preferably 85-95%, or about 90% of the nickel foam substrate is porous. In an embodiment, the average pore size of the NF substrate is about 50 to 500 micrometers (µm), preferably 100-400 µm, or 200-300 µm. Also, it may have many shapes, such as cubical, conical, cuboidal, pyramidical, or cylindrical. In an embodiment, the pores of the NF substrate have a spherical shape.

In an embodiment, the binding compound is one or more selected from a group consisting of polyvinylidene fluoride (PVDF)-based polymers, such as poly(vinylidene fluoride) (PVDF) and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is PVDF.

In one aspect, the composite includes a layered double hydroxide (LDH). LDHs are a class of ionic solids characterized by a layered structure with the generic layer sequence [AcBZAcB]$_n$, where c represents layers of metal cations, A and B are layers of hydroxide (HO$^-$) anions, and Z are layers of other anions and neutral molecules (such as water). Lateral offsets between the layers may result in longer repeating periods. LDHs can be seen as derived from hydroxides of divalent cations with the brucite layer structure [AdBAdB]$_n$, by oxidation or cation replacement in the metal layers (d), so as to give them an excess positive electric charge; and intercalation of extra anion layers (Z) between the hydroxide layers (A,B) to neutralize that charge, resulting in the structure [AcBZAcB]$_n$. LDHs may be formed with a wide variety of anions in the intercalated layers (Z), such as dodecyl sulfate (DDS) (CH$_3$(CH$_2$)$_{11}$OSO$_3^-$), Cl$^-$, Br$^-$, nitrate (NO$_3^-$), carbonate (CO$_3^{2-}$), SO$_4^{2-}$, acetate (C$_2$H$_3$O$_2^-$), SeO$_4^{2-}$, and combinations thereof. The size and properties of the intercalated anions may have an effect on the spacing of the layers in the LDH, known as the basal spacing. In an embodiment, the LDH has a basal spacing of 0.5 to 3 nm, preferably 1 to 2.5 nm, or 1.5 to 2 nm.

An LDH may be a synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In preferred embodiments, the layered double hydroxide has a positive layer (c) which contains both divalent and trivalent cations, also labeled as a first and second metal, respectively. In an embodiment, the divalent ion is selected from the group consisting of M$^{2+}$ is Ca$^{2+}$, Mg$^{2+}$, Mn$^{2+}$, Fe$^{2+}$, Cu$^{2+}$, Ni$^{2+}$, Cu$^{2+}$, and/or Zn$^{2+}$. In an embodiment, the trivalent ion is selected from the group consisting of N$^{3+}$ is Al$_3^+$, Mn$^{3+}$, Cr$^{3+}$, Fe$^{3+}$, Sc$^{3+}$, Ga$^{3+}$, La$^{3+}$, V$^{3+}$, Sb$^{3+}$, Y$^{3+}$, In$^{3+}$, Co$^{3+}$ and/or Ni$^{3+}$. In an embodiment, a molar ratio of a first and second metal in the LDH 1:2 to 2:1, preferably 1:1. In preferred embodiments, the layered double hydroxide has a nitrate intercalated anion. In a preferred embodiment, the LDH is a nickel-cobalt-layered double hydroxide (NiCoLDH). In an embodiment, the NiCoLDH includes both $Co^{2+}$ and $Co^{3+}$.

In an embodiment, the layered double hydroxide component may have a particulate form, for example in the form of spheres, granules, whiskers, sheets, flakes, flowers, plates, foils, fibers, and the like. In some embodiments, the layered double hydroxide is in a form of nanosheets. In some embodiments, the nanosheets have an average width of 50-500 nm, preferably 100-400 nm, or about 200-300 nm and an average length of greater than 100 nm, preferably 100-1,000 nm, 200-900 nm, 300-800 nm, 400-700 nm, or about 500-600 nm. In some embodiments, the nanosheets have an average thickness of 5-20 nm, preferably 7-17 nm, or about 10-15 nm. Such nanosheets may have a thickness of less than 10 nm, preferably less than 8 nm, preferably less than 6 nm, preferably less than 4 nm. In some embodiments, the nanosheets of the LDH form nanoflowers. In the nanoflowers the nanosheets assemble around a center axis and act as petals similar to that of a hydrangea. In some embodiments, as in a natural flower, the nanosheets have a rounded edge. In some embodiments, the layered double hydroxide particles may have a particle size of 5-15 μm, preferably 7-13 μm, or about 10 μm.

The composite further includes jute-activated carbon (JAC). In some embodiments, the JAC are in a form of particles in the shape of, for example in the form of spheres, granules, whiskers, sheets, flakes, flowers, plates, foils, fibers. In a preferred embodiment, the JAC particles are in the form of nanosheets. In an embodiment, the nanosheets of the jute activated carbon have an average thickness of from 7 to 15 nm, preferably 8-14 nm, 9-13 nm, 10-12 nm, or about 11 nm and an average width of 50-200 nm, preferably 75-175 nm, 100-150 nm, or about 125 nm. In some embodiments, the nanosheets are interconnected which form a porous carbon framework. In other words, the nanosheets are not free standing but each nanosheet is connected and adjacent to at least one other nanosheet. The nanosheets then form a network with pores. In some embodiments, the pores are micropores (less than 2 nm), mesopores (2-50 nm) and/or macropores (greater than 200 nm). In a preferred embodiment, the pores are a combination of micropores, mesopores, and macropores. In some embodiments, the macropores are greater than 200 nm in size, preferably 200-500 nm, 250-450 nm, or about 300-400 nm. In some embodiments, the JAC has an average pore volume of 0.5-1.5 $cm^3/g$, preferably 0.7-1.3 $cm^3/g$, or about 1.0 $cm^3/g$. The surface area of the JAC is greater than 2,000 $m^2/g$, preferably 2050, 2100, 2150, 2200, 2250, 2300, 2350, 2400, 2450, 2500, 2550, 2600, 2650, 2700, 2750, 2800, 2850, 2900, 2950, 3000 $m^2/g$, preferably about 2500-2700 $m^2/g$, preferably 2600 $m^2/g$.

The composite includes 25-45 wt. %, preferably 30-40 wt. %, preferably 31, 32, 33, 34, 35, 35.5 wt. % of carbon; 15-35 wt. %, preferably 18-20 wt. %, preferably 19, 20, 21, 22, 23, 24, 24.3 wt. % oxygen; 10-30 wt. %, preferably 11, 12, 13, 14, 15, 16, 17, 18, 19, 20, 20.3 wt. % of cobalt; and 10-30 wt. %, preferably 11, 12, 13, 14, 15, 16, 17, 18, 19, 20, 20.1 wt. % of nickel, based on the total weight of the composite. In a preferred embodiment, the composite consists of C, O, Co, and Ni and does not include further impurities.

In the composite of the JAC and LDH, the porous carbon framework connects the nanoflowers, present in the LDH, thereby forming an interconnected structure in the composite. The nanoflower particles of the LDH are not aggregated but instead the nanoflowers are dispersed on a surface of the JAC nanosheets. The high surface area of the JAC, exhibits an enhanced affinity for metal ions on the surface of the nanoflowers. This interaction results in the formation of metal-oxygen bonds between the JAC and LDH.

A mixture of the composite and the binding compound is coated on a surface of the substrate. In an embodiment, the mixture includes 70-95 wt. %, preferably 72%, 74%, 76%, 78%, 80%, 82%, 84%, 86%, 88%, 89%, and preferably 90% of the composite, based on the total weight of the binding compound and the composite. In an embodiment, the concentration of the binding compound in the mixture is at least 5 wt. %, preferably 6 wt. %, 7 wt. %, 8 wt. %, 9 wt. %, and yet more preferably about 10 wt. %. The mixture of the composite and the binding compound is coated on at least 50%, preferably 55%, 60%, 65%, 70%, 75%, 80%, 85%, 90%, 95%, 96%, 97%, 98%, 99%, of the substrate. The coating can be done by any method in the art, including but not limited to drop casting, spin coating, and using an automatic coating machine.

FIG. 1A illustrates a flow chart of a method 50 of preparing an electrode. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes pyrolyzing jute sticks at a temperature of 300-500° C., preferably 400° C. to form partially carbonized jute powder. Pyrolysis is a process of thermochemical decomposition of the dried jute sticks at elevated temperatures and in the absence of an oxidizing agent such as oxygen, hydrogen peroxide, and/or a halogen-containing gas (e.g., a chlorine-containing gas). In some embodiments, pyrolysis is performed in an inert gas (e.g., nitrogen, helium, neon, and/or argon), preferably nitrogen.

Prior to pyrolyzing the jute sticks, the jute sticks may be obtained by collecting or otherwise obtained and cut/chopped into small pieces, and optionally rinsed/cleaned with water. Generally, at least 50, 60, 70, 75, 80, 85, 90, 91, 92, 92.5, 93, 94, 95, 96, 97, 97.5, 98, 99, 99.1, 99.5, or 99.9 wt. % of jute sticks may be the stalks of jute or typically the less fibrous material left behind after removal (or substantial removal) of the jute fibers, ribbons, and the like, generally post-retting.

In an embodiment, the jute sticks are cut/chopped/ground/chipped to a size of about 1 to 5 cm, preferably 2 to 4 cm, preferably 2 to 3 cm, washed, and subsequently dried in an oven at 90 to 140° C., preferably 95 to 130° C., preferably 100 to 120° C., preferably about 100 to 110° C., preferably 100° C. to reduce the moisture content to below 5 wt. %, preferably below 4 wt. %, preferably below 3 wt. %, preferably below 2 wt. %, preferably below 1 wt. %. The cut *Corchoris olitorius* sticks may be dried for any amount of time that provides an adequately dried product, typically, for drying times of 12 to 48 hours, preferably 24 hours. The dried jute sticks are further pulverized using any suitable means, for example, by grinding, ball milling, blending, etc., using manual methods (e.g., mortar) or machine-assisted methods such as using a mechanical blender, or any other apparatus known to those of ordinary skill in the art. The dried jute sticks are preferably pulverized until an average particle size of less than 100 μm is achieved.

The dried jute sticks are further pyrolyzed by placing the powder into a furnace such as a tubular furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min, preferably 5° C./min. In preferred embodiments, the jute sticks are heated with a heating rate in the range of 1 to 15° C./min, preferably 3 to 10° C./min, preferably 5 to 10° C./min to 300-500° C., for 1 to 15 hours, preferably 2 to 10 hours, preferably 3 to 8 hours, preferably 3 hours. The furnace may also be equipped with a cooling accessory such as a cooling air stream system, or a liquid nitrogen stream system, which may provide a cooling rate of up to 20° C./min, or preferably up to 15° C./min, or preferably up to 10° C./min, preferably 5° C./min, preferably until the temperature was below 50° C. Pyrolysis of the pulverized jute sticks preferably forms a solid, for example, a carbonaceous ash/char/tar that mainly contains partially carbonized jute powder.

At step 54, the method 50 includes mixing the partially carbonized jute powder with abase and pyrolyze at a temperature of 700-900° C., preferably 800° C. to form the jute-activated carbon. In some embodiments, the partially carbonized jute powder is mixed with a base. The base is a carbonate salt, including, but not limited to, sodium carbonate, sodium bicarbonate, potassium carbonate, potassium bicarbonate, cesium bicarbonate, magnesium bicarbonate, and calcium bicarbonate, preferably sodium bicarbonate. In preferred embodiments, the weight ratio of partially carbonized jute powder to the base ranges from 1:1 to 1:10, preferably 1:2 to 1:8, preferably 1:2, 1:2.5, 1:3, 1:3.5, or 1:4 and/or 1:7.5, 1:7, 1:6.5, 1:6, 1:5.5, 1:5, 1:4.5, 1:4. The partially carbonized jute powder is further pyrolyzed, in an inert atmosphere, in the temperature range of 7° C. to 900° C., for a time interval of about 2-8 hours, preferably 3 hours, to form the jute-activated carbon.

The pyrolyzed jute sticks may be treated with the acid solution, HCl (although other acids such as sulfuric acid or nitric acid may be used as well) using any known agitation method known to those of ordinary skill in the art, for example, via stirring, swirling, mixing, sonicating (e.g., ultrasonication or sonication). The treated jute sticks may be washed with water and further dried at 50 to 90° C., preferably 55 to 85° C., preferably 60 to 80° C., for 6 to 15 hours, preferably 12 hours to form the jute activated carbon. It is preferred that the drying is carried out under a vacuum to prevent air oxidation.

At step 56, the method 50 includes mixing a cobalt salt, a nickel salt, and cetrimonium bromide (CTAB) in a solvent to form a first solution. The Co salt may include cobalt sulfate, cobalt acetate, cobalt citrate, cobalt iodide, cobalt chloride, cobalt perchlorate, cobalt nitrate, cobalt phosphate, cobalt triflate, cobalt bis(trifluoromethanesulfonyl)imide, cobalt tetrafluoroborate, cobalt bromide, and/or its hydrate. In a preferred embodiment, the cobalt salt is cobalt nitrate and its hydrates thereof. The nickel salt may include one or more selected from nickel sulphate, nickel chloride, nickel dinitrate, and nickel carbonate and its hydrates thereof. In a preferred embodiment, the nickel salt is nickel nitrate and its hydrates thereof. The weight ratio of the cobalt salt to the nickel salt is in the range of 1:1 to 1:5, preferably 1:1. Although CTAB is used as a surfactant, optionally other surfactants that are known in the art may be used as well.

The mixing may be carried out manually or with the help of a stirrer. In some embodiments, the solvent is an organic or an inorganic solvent. Suitable examples of the organic solvent may be a ketone solvent, an ester solvent, an alcohol solvent, an amide solvent, and an ether solvent. Suitable examples of ketone solvents include acetone, acetophenone, and/or combinations thereof. Suitable examples of ester solvents include ethyl acetate, methyl salicylate, and/or combinations thereof. Suitable examples of alcohol solvents include ethanol, isopropyl alcohol, and/or combinations thereof. Suitable examples of amide solvents include dimethylformamide (DMF), acetamide, and/or combinations thereof. Suitable examples of ether solvents include diethyl ether and Tetrahydrofuran (THF). In a preferred embodiment, the solvent is a mixture of organic and inorganic solvent, preferably a mixture of methanol and water. The ratio of methanol to water in the solvent is in the range of 1:1 to 10:1, preferably 1:1, 2:1, 3:1, 4:1, or 5:1. This method grows the LDH directed onto the JAC.

At step 58, the method 50 includes heating the first solution and the jute-activated carbon in an autoclave for 10-20 hours, preferably 12-18 hours, or about 14-16 hours at a temperature of 150-250° C., preferably 175-225° C. about 200° C. to form the composite. The heating can be done by using heating appliances such as ovens, microwaves, autoclaves, hot plates, heating mantles and tapes, oil baths, salt baths, sand baths, air baths, hot-tube furnaces, and hot-air guns. In a preferred embodiment, the mixture was heated at 180° C. in an autoclave for 12 hours.

At step 60, the method 50 includes coating surface of the substrate with the mixture to form the electrode. The method of coating the substrate with the mixture maybe performed by any of the methods, obvious to a person skilled in the art. The electrode produced therein is suitable as a positive electrode in a supercapacitor as described below.

The supercapacitor includes a positive electrode (the electrode as described earlier), a negative electrode, and an electrolyte. In the supercapacitor, the positive and negative electrodes are disposed facing each other. In some embodiments, the electrolyte is present between the positive and negative electrodes to form the supercapacitor.

The electrolyte is any suitable electrolyte known in the art. Suitable examples of electrolyte salts are sodium chloride (NaCl), sodium sulphate ($Na_2SO_4$), potassium chloride (KCl), potassium bicarbonate ($KHCO_3$), sodium bicarbonate ($NaHCO_3$), sodium nitrate ($NaNO_3$), lithium nitrate ($LiNO_3$), and potassium nitrate ($KNO_3$). In an embodiment, the supercapacitor further includes a separator between the two electrodes. The electrolyte may be injected into the separator. The separator may be a cellulose or filter paper.

In a most preferred embodiment, the electrolyte is a solid-state electrolyte. A solid-state electrolyte (SSE) is a solid ionic conductor and electron-insulating material. In a preferred embodiment, the SSE is a solid polymer electrolyte (SPE) which is a solvent-free salt solution in a polymer host material that conducts ions through the polymer chains. The solid-state electrolyte comprises a base and a polymer. The base is selected from sodium carbonate, sodium bicarbonate, potassium carbonate, potassium bicarbonate, cesium bicarbonate, magnesium bicarbonate, calcium bicarbonate, sodium hydroxide, and potassium hydroxide. In an embodiment, the polymer is selected from polycarbonates, polyesters, polynitriles, polyalcohols, polyamines, polysiloxane, fluoropolymers, lignin, chitosan, and cellulose. In a preferred embodiment, the solid-state electrolyte includes polyvinyl alcohol and potassium hydroxide.

In one aspect, the negative electrode includes a second substrate, the JAC, and a binding compound. The second substrate is made from at least one material selected from the group consisting of stainless steel, aluminum, nickel, copper, platinum, zinc, tungsten, and titanium. In a preferred embodiment, the substrate includes nickel, more preferably nickel foam (NF). The NF substrate may optionally include metals in addition to nickel, such as iron, aluminum, or alloys thereof. In an embodiment, at least 80-99% of the nickel foam substrate is porous. In an embodiment, the average pore size of the NF substrate is about 50 to 500 micrometers (μm). Also, it may have many shapes, such as cubical, conical, cuboidal, pyramidical, or cylindrical. In an embodiment, the pores of the NF substrate have a spherical shape. The second substrate may be the same of different from the substrate in the positive electrode.

In an embodiment, the binding compound is the same or different from the binding compound in the positive electrode. In an embodiment, the binding compound is one or more selected from a group consisting of polyvinylidene fluoride (PVDF)-based polymers, such as poly(vinylidene fluoride) (PVDF) and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is PVDF.

The jute-activated compound and the binding compound together form a second mixture. The second mixture is coated on the surface of the second substrate. In some embodiments, the second mixture includes 80-95 wt. % of the JAC, preferably 85-90 wt. %, and 5-20 wt. % of the binding compound, preferably 10-15 wt. %. In some embodiments, at least 50%, preferably 55, 60, 65, 70, 75, 80, 85, 90, 95, 96, 97, 98, 99 wt. % of the second mixture is coated on the second substrate.

The asymmetric supercapacitor has a specific capacitance of 700-800 F/g, preferably 725-775 F/g, or about 750 F/g at a current density of 0.5 A/g and an energy density of 90-110 Wh/kg, preferably 95-105 Wh/kg, or about 100 Wh/kg at a power density of 250 W/kg. Further, the supercapacitor has a capacitance retention of at least 85%, preferably 90%, 95%, or 100% after 10,000 charge-discharge cycles, indicating a high stability.

While not wishing to be bound to a single theory, it is thought that the method of making the composite results in a unique structure that provides improved supercapacitor performance. The two-step pyrolysis process yields JAC nanosheets with a hierarchical structure, high surface area, high porosity, and well-organized characteristics. The highly porous nanosheets provide more anchor points for LDH growth, resulting in the nanocomposite exhibiting higher current densities and a higher number of active sites exposed. The presence of both micro- and mesopores in JAC facilitates electrolyte ion diffusion through the porous material, maximizing surface accessibility, and minimizing the electronic transport path, thereby resulting in improved performance.

In some embodiments, a plurality of the supercapacitors may be connected in parallel and/or series to form a power bank, which may act as a power source for powering electrical devices. According to the present disclosure, 2-10, preferably 3-9, 4-8, or 5-7 of the supercapacitors may be connected in parallel and/or series to form the power bank. The number of supercapacitors in the power bank may be determined based on the intended use of the power bank for the specified electrical devices.

In some embodiments, the supercapacitor may be attached to a wearable device and function as a battery to provide electric power to various components of the wearable device. Particularly, the supercapacitor may be electrically connected to a sensor, thereby facilitating the sensor to detect various operating conditions or parameters of the wearable device. In an example, the wearable device may be a wristwatch. In some examples, the wearable device may be any device that may be deriving power from a power source such as a battery; as such, the supercapacitor of the present disclosure may be implemented in the device to function as a battery.

EXAMPLES

The following details of the examples demonstrate an electrode and a supercapacitor as described herein. The examples are provided solely for illustration and are not to be construed as limitations of the present disclosure, as many variations thereof are possible without departing from the spirit and scope of the present disclosure.

Example 1: Synthesis of Jute-Derived Activated Carbon

The jute sticks were cut into small pieces, thoroughly cleaned using DI water, and dried in an electric oven for 24 hours at 100° C. The clean and dried jute stick pieces were further processed by grinding them into a fine powder using a kitchen blender. To ensure the collection of fine particles measuring equal to or less than 100 μm on an average size, the jute powder was filtered through a 100 μm mesh filter. The resulting jute powder was then transferred into an alumina crucible for the subsequent heat treatment, which took place in a tubular furnace under various low temperatures, i.e., 300, 400, and 500° C. The 3-hour-long pyrolysis procedure was carried out in an inert ($N_2$) environment with a regulated heating and cooling rate of 5° C./min. The primary objective of this initial pyrolysis step was to carbonize the jute powder partially.

Figure 1B:
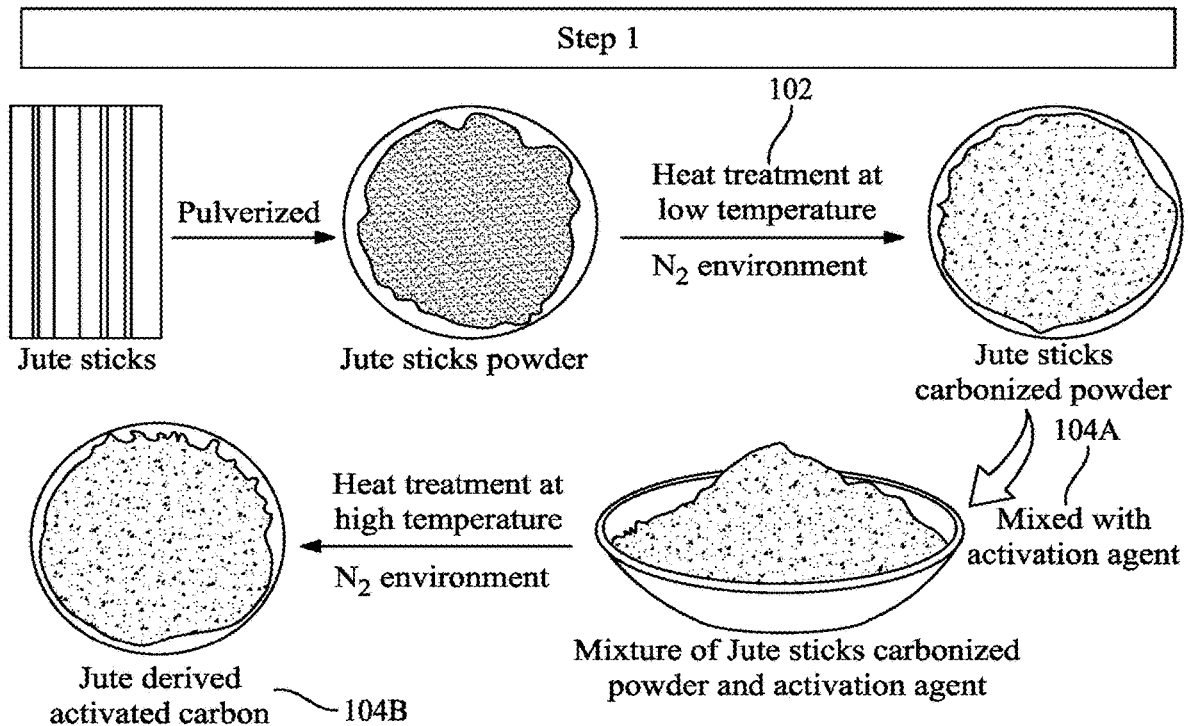
FIG. 1B is a schematic illustration depicting synthesis of JAC nanosheets, according to certain embodiments.

In the second step, the partially carbonized jute powder obtained from the first step was mixed thoroughly with $NaHCO_3$ (activation agent) at a 1:4 mass ratio. The resulting mixture was exposed to further pyrolysis using high temperatures of 700, 800, and 900° C. This second pyrolysis step also lasted for 3 hours, employing the same 5° C./min heating and cooling rates and maintaining the inert ($N_2$) environment. The purpose of this step was to activate the partially carbonized jute powder. After pyrolysis, the resultant activated carbon was washed twice with 0.5 M HCl and rinsed three times with DI water to eliminate contaminants. The final product was then dried in an electric oven at 80° C. for 12 hours to acquire the JAC. FIG. 1B provides a schematic representation of the JAC synthesis process via two-step pyrolysis, and Table 1 summarizes the conditions and results of the pyrolysis process for different JAC samples, highlighting the temperatures, activation agents, and yields achieved. Among the JAC samples, JAC-2 had the highest yield of ~24%. This implies that the pyrolysis procedure resulted in a proportion of the target product being produced from JAC-2. JAC-3, on the other hand, had the lowest yield of ~10% among the samples. This reduced yield shows that the components in JAC-3 were lost during the pyrolysis process at 500° C. Further activation led to a decrease in its components, explaining the lower yield observed. The yield percentages in Table 1 are relative to the original jute stick powder used as the starting material for the pyrolysis process.

TABLE 1

List of the JAC samples prepared via two-step pyrolysis.

| Sample Name | Step 1 Temperature | Step 2 Temperature | Activation Agent | Obtained Yield (%) |
|---|---|---|---|---|
| JAC-1 | 300 | 800 | NaHCO$_3$ | 11 |
| JAC-2 | 400 | 800 | NaHCO$_3$ | 24 |
| JAC-3 | 500 | 800 | NaHCO$_3$ | 10 |
| JAC-4 | 400 | 700 | NaHCO$_3$ | 24 |
| JAC-5 | 400 | 900 | NaHCO$_3$ | 18 |

Example 2: Synthesis of NiCoLDHs and NiCoLDH@JAC Nanocomposite Electrodes

Figure 1C:
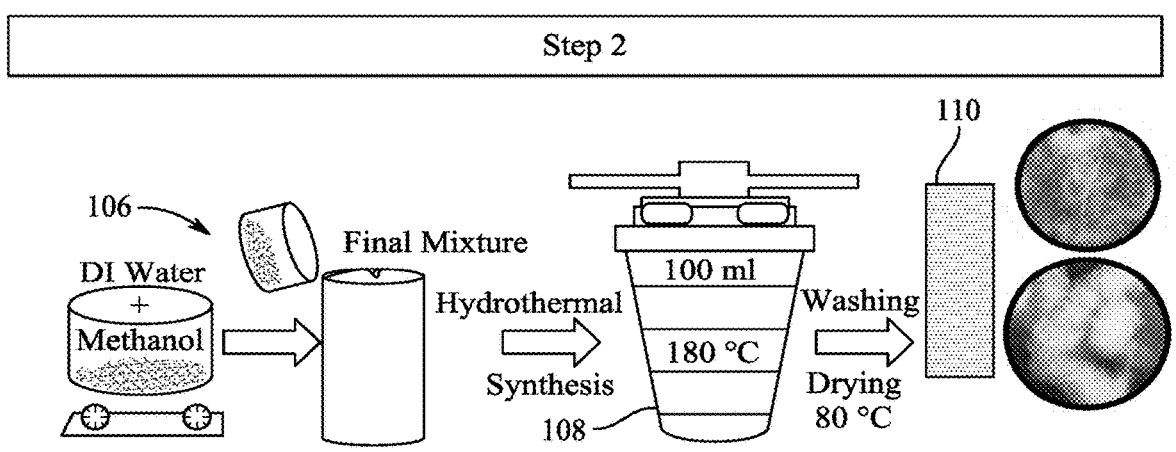
FIG. 1C is a schematic illustration depicting in-situ hydrothermal synthesis of nickel-cobalt-layered double hydroxide nanoflowers (NiCoLDH) supported on JAC nanosheets (NiCoLDH@JAC) on a nickel foam (NF) substrate, according to certain embodiments.

Hydrothermal synthesis was employed in-situ to grow NiCoLDH@JAC materials on a nickel foam (NF) substrate, as depicted in FIG. 1C. The synthesis process involved sequentially dissolving stoichiometric ratios of Co(NO$_3$)$_2$·6H$_2$O, Ni(NO$_3$)$_2$·6H$_2$O, and cetrimonium bromide (CTAB) in a mixture of DI water (12 mL) and methanol (60 mL) at room temperature with continuous stirring. The resulting mixture solution and a clean NF substrate (1×5 cm$^2$) were then transferred to a 100 mL autoclave and exposed to heat treatment for 12 hours at 180° C. The NiCoLDH/NF composite was washed using DI water and dried at 80° C. for 24 hours. Various NiCoLDH compositions with different stoichiometric ratios were prepared for comparative analysis, as outlined in Table 2.

In a similar manner, JAC-2 nanosheets were utilized as a conductive support material for the in-situ synthesis of nanocomposites with NiCoLDH-1. Different concentrations of JAC-2 (10 mg, 20 mg, and 30 mg) were employed in the hydrothermal synthesis of the nanocomposites, namely NiCoLDH-1@JAC-2_10, NiCoLDH-1@JAC-2_20 (also labeled as NiCoLDH-1@JAC-2), and NiCoLDH-1@JAC-2_30, respectively. These prepared electrodes served as the positive electrodes in the asymmetric HSCs configuration.

TABLE 2

Samples prepared via hydrothermal synthesis using NF as a substrate.

| Sample Name | Ni(NO$_3$)$_2$·6H$_2$O (g) | Co(NO$_3$)$_2$·6H$_2$O (g) | CTAB (g) | JAC-2 (g) |
|---|---|---|---|---|
| NiCoLDH-1 | 0.210 | 0.210 | 0.5 | ... |
| NiCoLDH-2 | 0.210 | 0.105 | 0.5 | ... |
| NiCoLDH-3 | 0.105 | 0.210 | 0.5 | ... |
| NiCoLDH-1@JAC-2_10 | 0.210 | 0.210 | 0.5 | 0.010 |
| NiCoLDH-1@JAC-2_20 | 0.210 | 0.210 | 0.5 | 0.020 |
| NiCoLDH-1@JAC-2_30 | 0.210 | 0.210 | 0.5 | 0.030 |

Example 3: JAC Electrode Fabrication

Figure 2A:
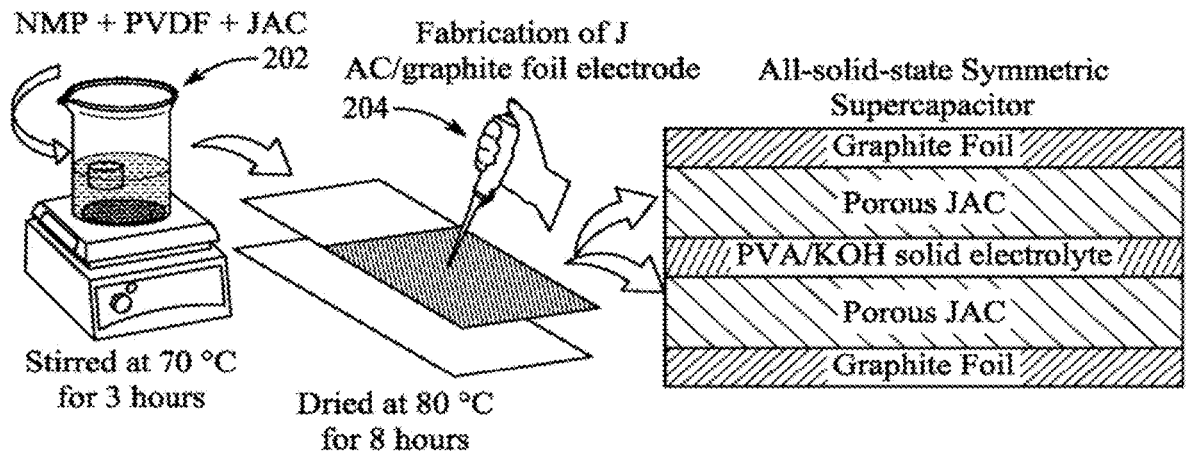
FIG. 2A depicts the fabrication process of a JAC-based electrode, and the corresponding all-solid-state symmetric supercapacitor, according to certain embodiments.

When making the working electrodes, the prepared active material (JAC, with a concentration of 90%) and a binder (PVDF, with a concentration of 10%) were dissolved in N-methyl-2-pyrrolidone solvent. The resulting combination underwent vigorous stirring at a temperature of 70° C. for a duration of 3 hours to achieve a uniform slurry. This homogeneous black slurry was then applied onto a conductive graphite foil current collector and dried in an electric oven at 80° C. for 8 hours. The loading of active materials (~1 mg/cm$^2$) was determined by calculating the weight difference of the graphite foil before and after the application of the active materials. The all-solid-state symmetric supercapacitor device was constructed using the JAC-based working electrodes as both the negative and positive electrodes, with a PVA/KOH solid electrolyte. The JAC//PVA/KOH//JAC all-solid-state symmetric supercapacitor fabrication process is illustrated in FIG. 2A.

Example 4: Fabrication of the NiCoLDH@JAC Nanocomposite Supercapacitor

Figure 2B:
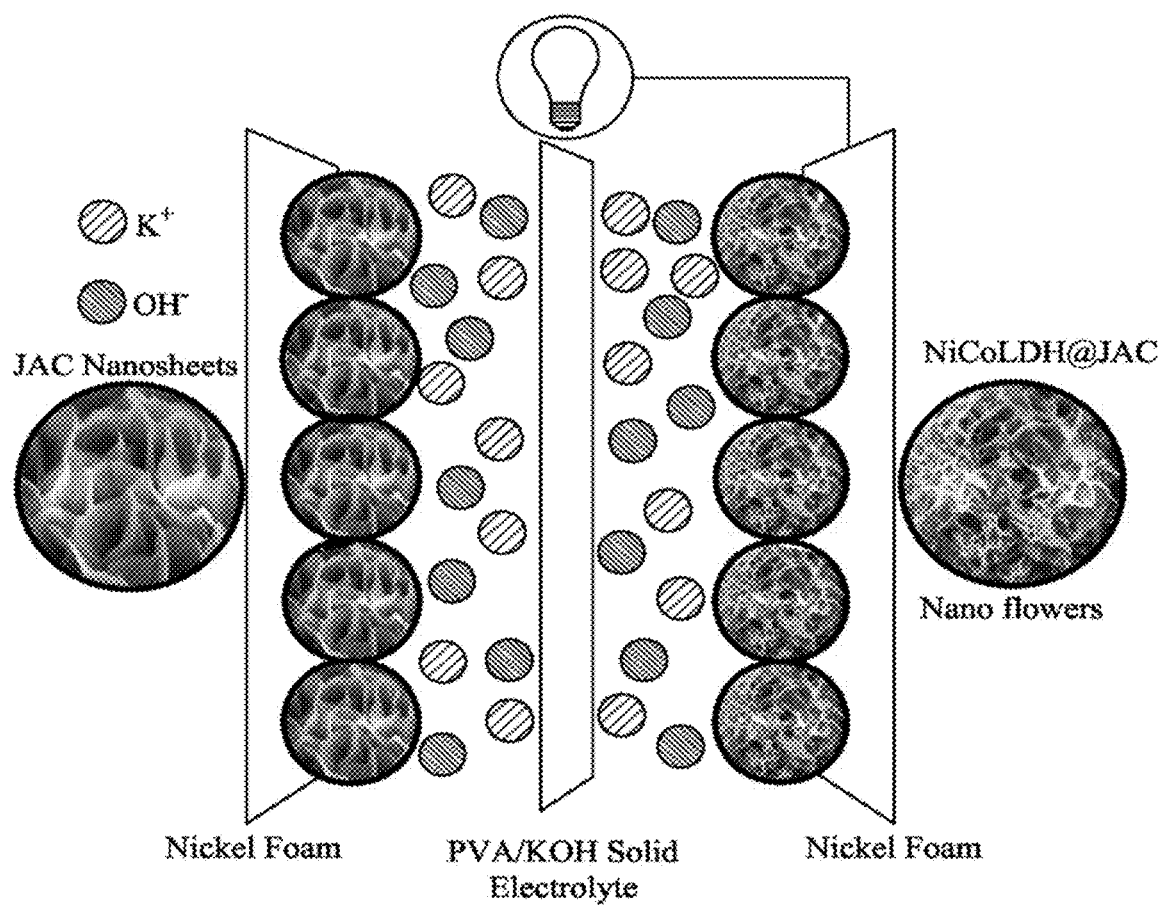
FIG. 2B is a schematic representation for the NiCoLDH@JAC and JAC-based asymmetric hybrid supercapacitors (HSC), according to certain embodiments.

The JAC-2 material was cast onto the NF substrate using a drop-drying method to develop the negative electrode, resulting in the JAC-2/NF electrode. The negative electrodes were prepared for this case by mixing JAC-2 (90 wt. %) and PVDF binder (10 wt. %) in NMP solvent. To achieve a uniform slurry, the mixture was vigorously stirred at a temperature of 70° C. for a duration of 3 hours. After that, the black slurry was applied to a NF current collector and allowed to dry in an electric oven at 80° C. for eight hours. To evaluate the electrochemical performance, the prepared NiCoLDH-1@JAC-2/NF electrode assisted as the positive electrode, while the JAC-2/NF electrode operated as the negative electrode. The NiCoLDH-1@JAC-2//JAC-2 asymmetric HSC electrochemical properties were also assessed using KOH-based aqueous and PVA/KOH solid electrolytes. A schematic illustration of the NiCoLDH@JAC and JAC-based asymmetric HSC is depicted in FIG. 2B.

Example 5: Material Characterization

Thermogravimetric analysis (TGA) was conducted to ascertain the decomposition temperature of jute stick powder and to assess the thermal stability of the synthesized JAC-2 under an argon atmosphere. The TGA analysis revealed that the jute powder exhibited stability up to approximately 250° C. and underwent rapid decomposition between 25° and 500° C. Beyond 500° C., no significant mass loss was observed in the jute powder. This observation indicates that volatile components were either eliminated or decomposed prior to reaching 500° C., resulting in a yield of approximately 29%. The observed mass loss can be attributed to the generation of non-condensable gases such as $CH_4$, $H_2$, $CO_2$, and CO, as well as the decomposition of cellulose and hemicellulose, within the jute powder. Therefore, it is advantageous to select a temperature below 500° C. for the low-temperature treatment of biomass to produce soft or partially carbonized jute powder. Subsequently, this powder can be exposed to higher temperatures for activation, leading to the formation of activated carbon materials characterized by a high degree of porosity. The preferred temperature for low-temperature treatment to yield soft/partially carbonized carbon was determined to be 400° C., falling within the mid-range of the decomposition temperature. The TGA curve of the soft/partially carbonized jute powder produced at 400° C. exhibited substantial mass loss between 400° C. and 550° C., primarily due to the decomposition of residual cellulose/hemicellulose and the removal of volatile materials. This resulted in a similar yield of approximately 30% at 900° C. As anticipated, JAC-2 demonstrated remarkable stability up to 900° C., with a minor mass loss of around 11% observed at temperatures below 100° C., attributed to moisture evaporation.

Figure 3A:
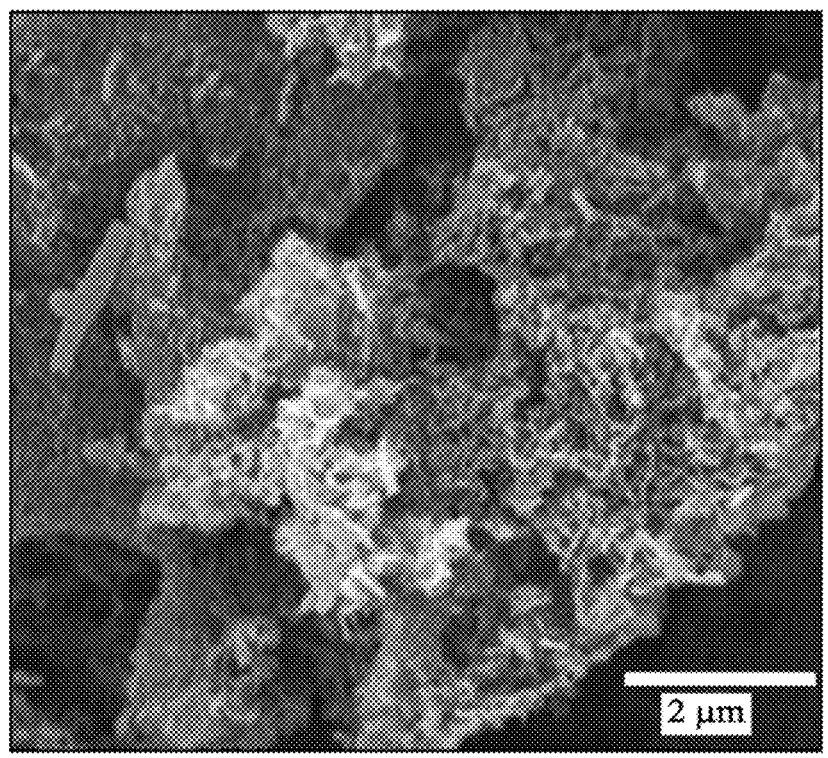
FIG. 3A is a field emission scanning electron microscopy (FESEM) image of JAC-1, according to certain embodiments.
Figure 3B:
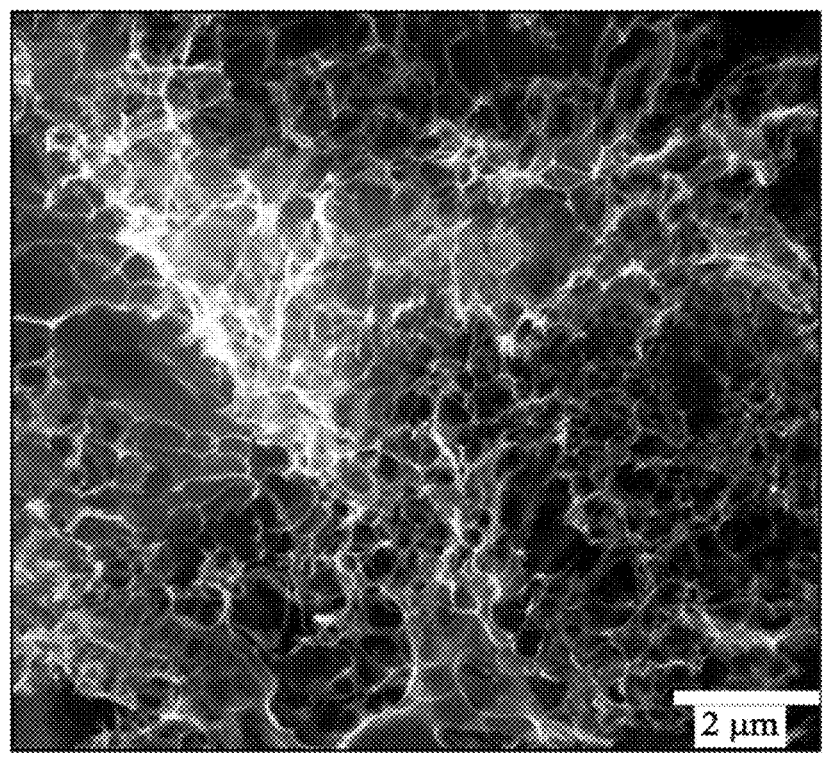
FIG. 3B is a FESEM micrograph of JAC-2, according to certain embodiments.
Figure 3C:
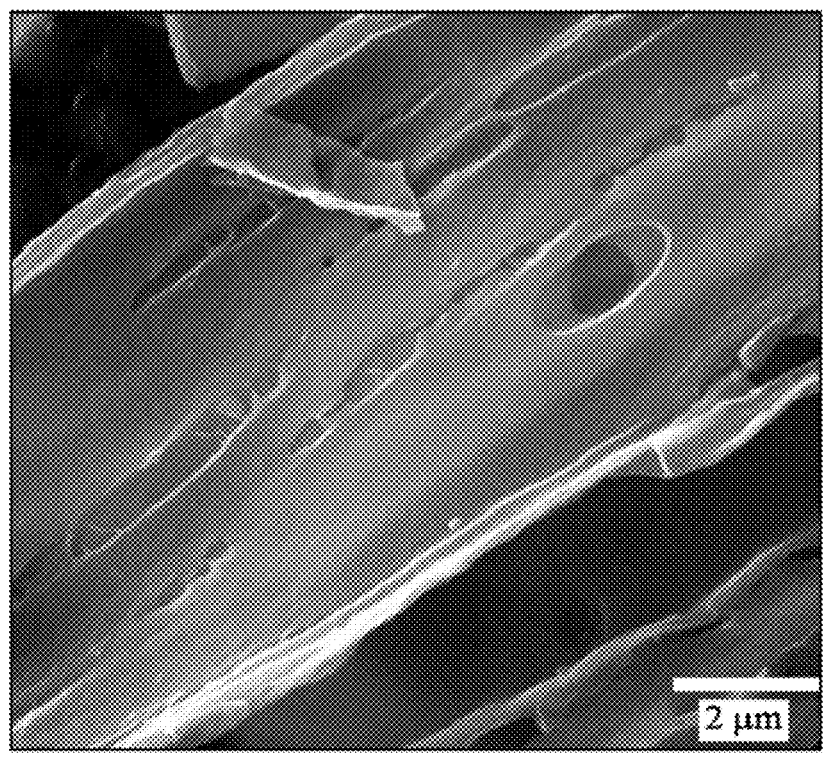
FIG. 3C is a FESEM micrograph of JAC-3, according to certain embodiments.
Figure 3D:
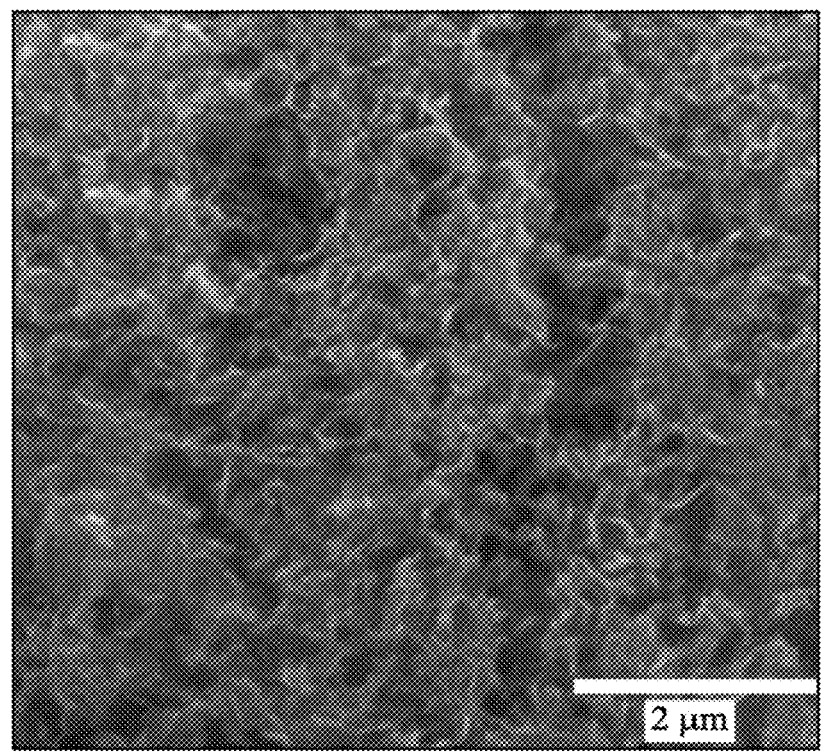
FIG. 3D is a FESEM micrograph of JAC-5 at elevated temperatures, according to certain embodiments.

Field emission scanning electron microscopy (FESEM) was employed to investigate the shape and microstructure of the synthesized carbon materials. FIGS. 3A-3D depicts FESEM micrographs of the prepared carbon samples, namely, JAC-1, JAC-2, JAC-3, and JAC-5, respectively, all captured at the same magnification. FIG. 3A portrays a collection of aggregated nanosheets with non-uniform profiles and distribution within JAC-1. However, FIG. 3B showcases the uniformly distributed nanosheet morphology present in JAC-2. JAC-2 consists of interconnected nanosheets forming a structured network characterized by porous and open structures. This observation validates the successful activation of jute soft/partially carbonized carbon prepared at 400° C., resulting in the efficient production of activated carbon at 800° C. Conversely, FIG. 3C illustrates the microbar-type morphology of JAC-3, derived from pre-treated biomass at 500° C. and subsequently activated at 800° C. This indicates insufficient activation of JAC-3 due to cellulose/hemicellulose degradation during the pre-treatment phase. Similarly, FIG. 3D illustrates uniformly distributed nanosheets without structural disorder in JAC-5 at elevated temperatures.

FIGS. 4A-4L illustrate FESEM micrographs, captured at various magnifications, providing a detailed view of the distinctive morphology of JAC-2. The FESEM images reveal that JAC-2 possesses a nanosheet morphology with an average thickness ranging from approximately 7 to 15 nm and an average width of 50-200 nm. These nanosheets intricately interconnect, forming a three-dimensional hierarchical porous structure. FIGS. 4A-4E illustrates FESEM micrographs with different magnification levels, and, particularly, illustrates the highly porous nature of the JAC-2 surface, featuring well-defined pores. The surface area of the JAC-2 structure is greater than 2,000 m$^2$/g and has a pore volume of from 0.5-1.5 cm$^3$/g. The widespread presence of pores signifies the existence of macropores interconnected with mesopores. This porous structure of JAC-2 is a direct outcome of the two-step treatment involving low-temperature treatment (400° C.) of jute powder followed by high-temperature activation (800° C.). Low-temperature treatment, at appropriate temperatures, expands the pore size within the JAC-2 structure, with certain pores exceeding dimensions of 200 nm.

Furthermore, high-magnification FESEM micrographs, reveals that JAC-2 nanosheets exhibit an average diameter in the range of several tens of nanometers. These nanosheets form an interconnected network characterized by a highly porous and open structure. Consequently, a significant portion of the JAC-2 nanosheet surfaces is easily accessible to electrolyte ions when employed as an electrode in supercapacitors. The successful integration of JAC-2 nanosheets onto a conductive substrate results in reduced diffusion resistance experienced by the electrolyte, thus improving ion transport efficiency. This enhancement is attributed to the increased quantity of active surface sites, as evidenced by FESEM analysis.

Figure 4A:
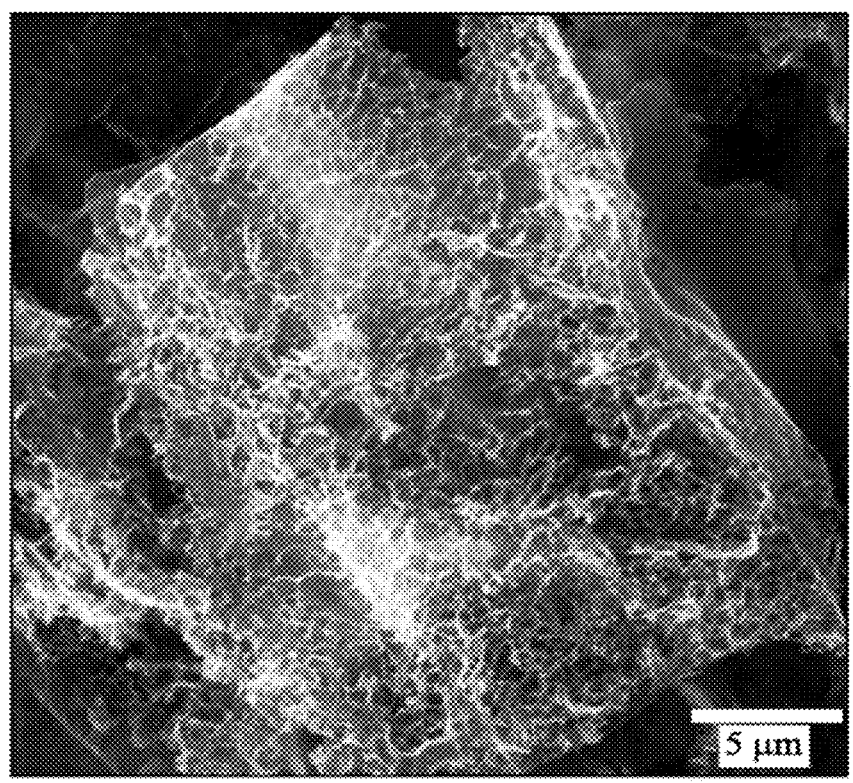
FIGS. 4A-4E show FESEM micrographs of JAC-2 with different magnification levels, according to certain embodiments.
Figure 4B:
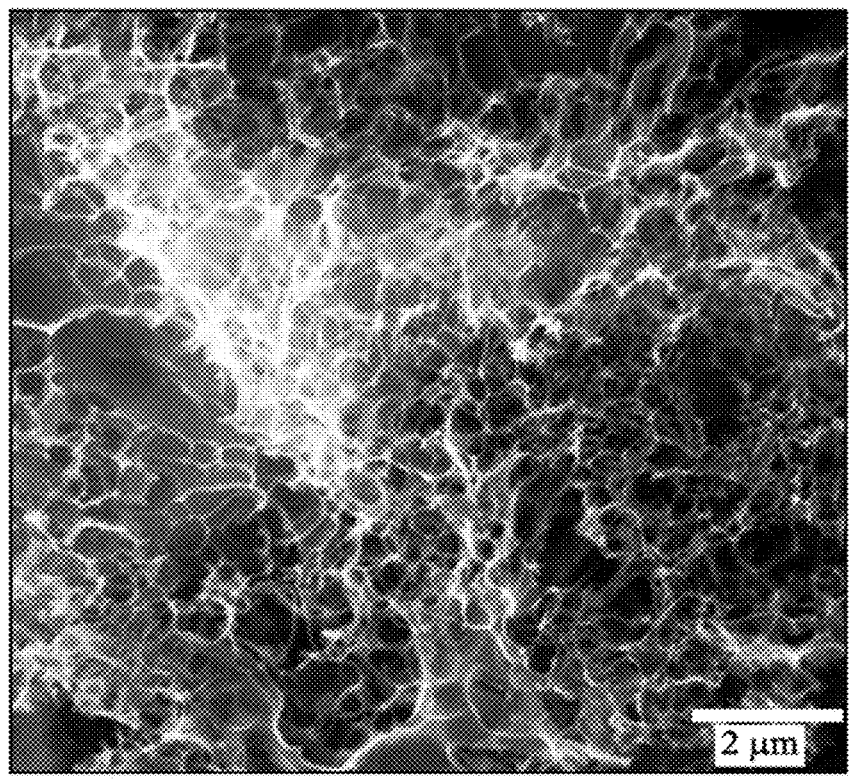
Figure 4C:
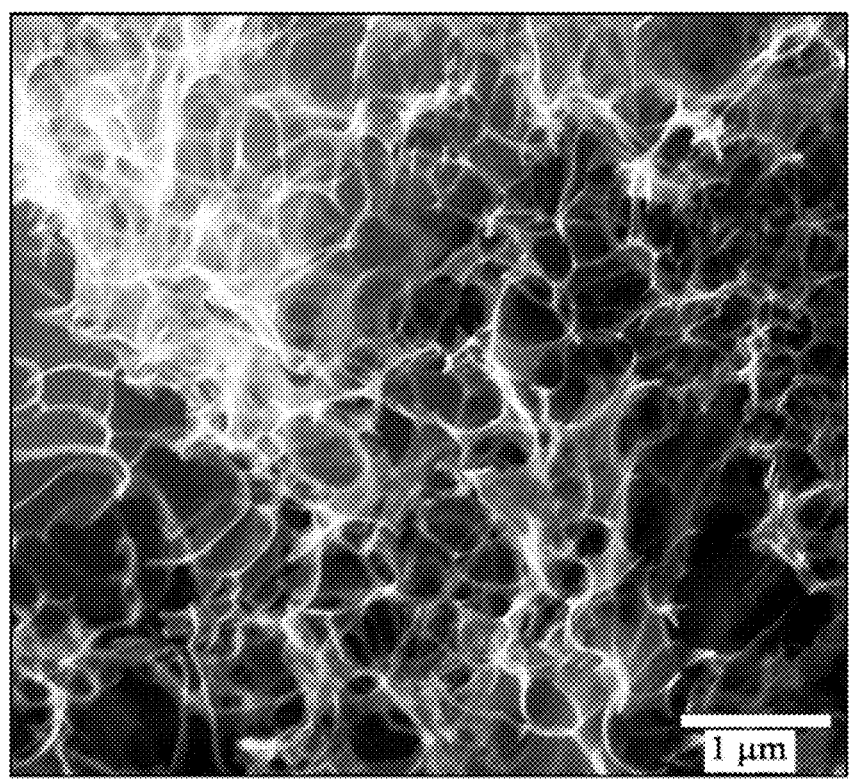
Figure 4D:
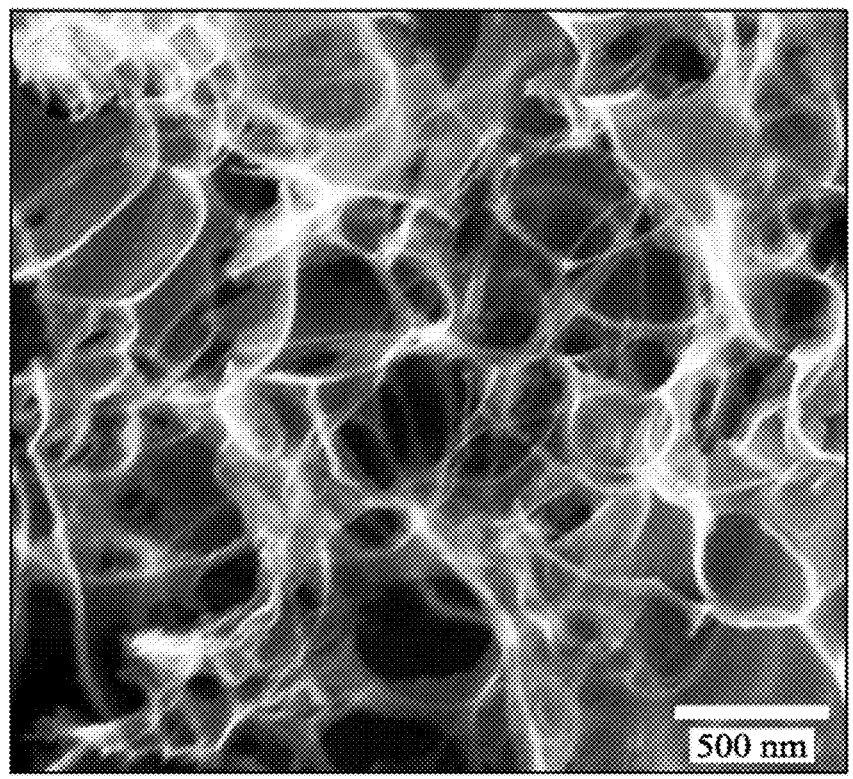
Figure 4E:
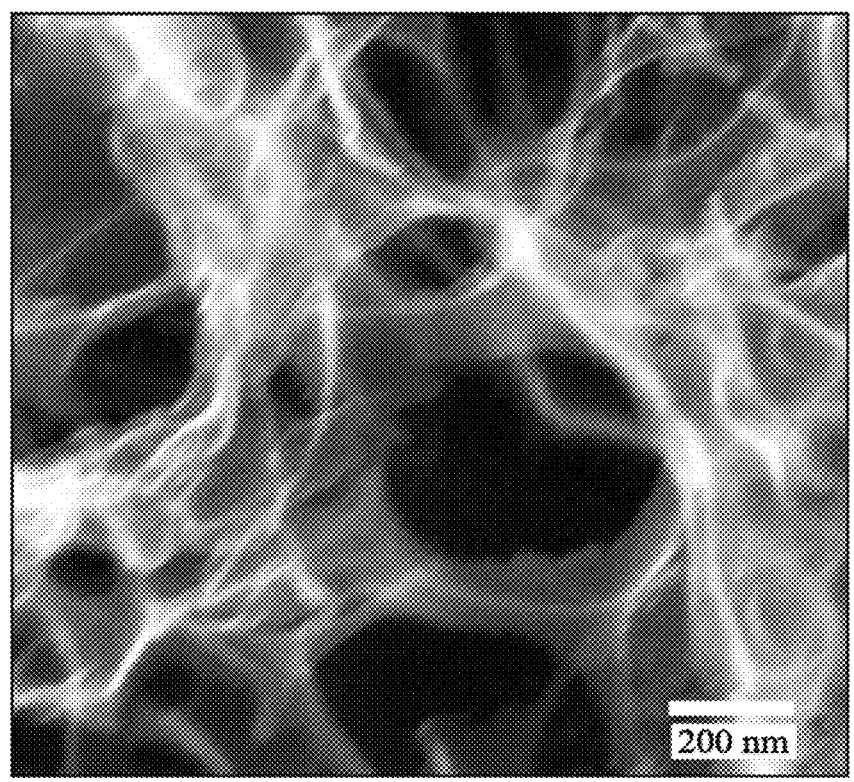
Figure 4F:
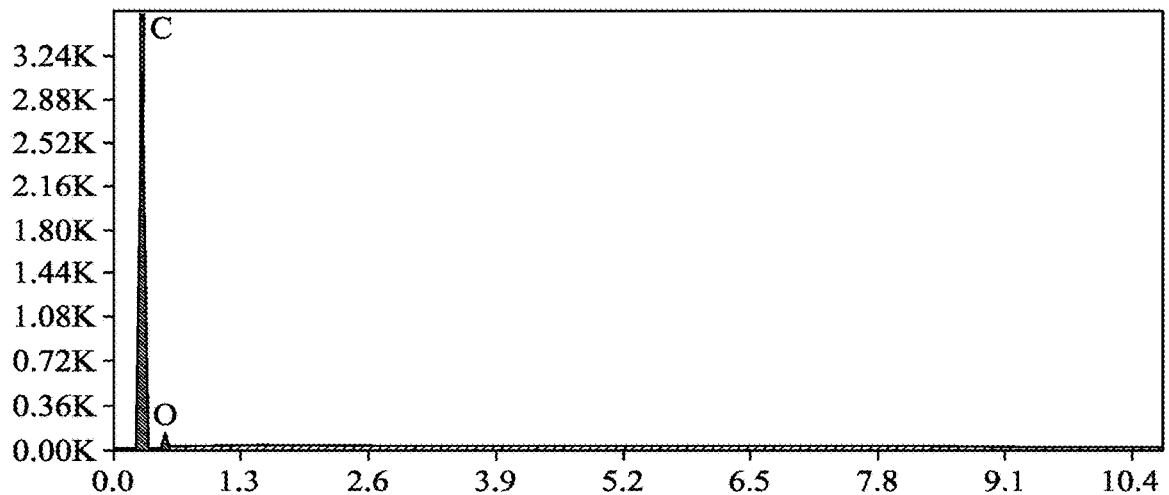
FIG. 4F shows energy-dispersive X-ray spectroscopy (EDS) and elemental mapping of JAC-2, according to certain embodiments.
Figure 4F:
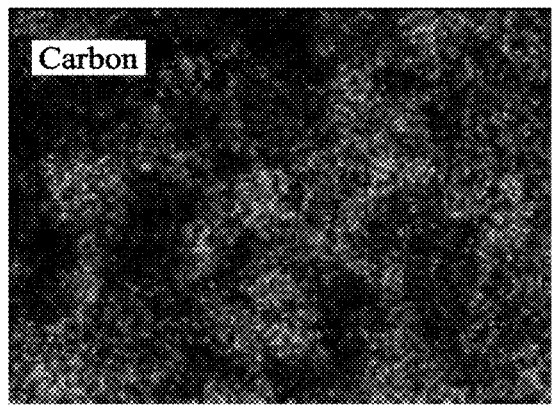
Figure 4F:
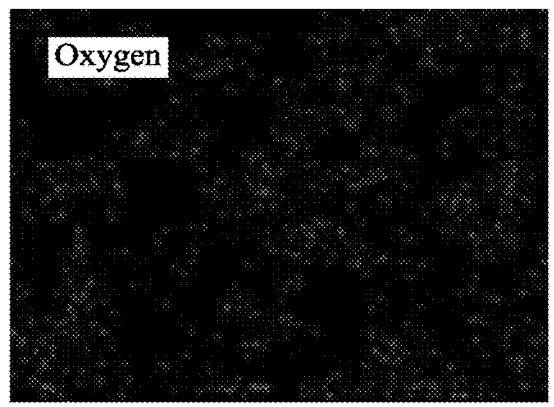
Figure 4G:
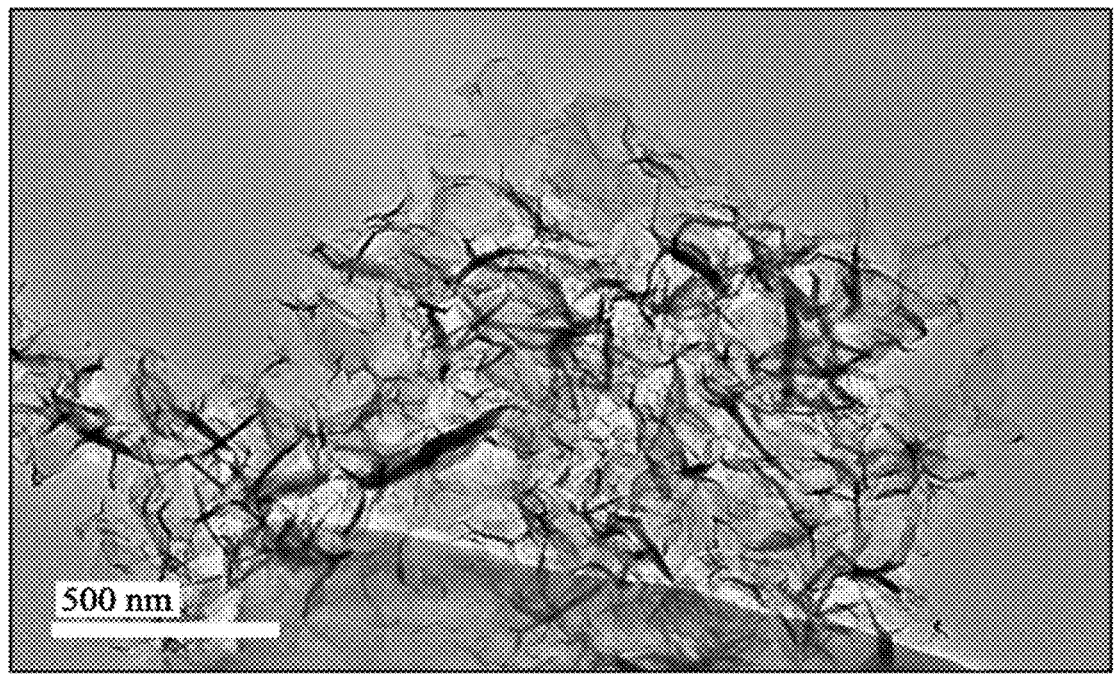
FIGS. 4G-4J show transmission electron microscope (TEM) images of JAC-2, at different magnifications, according to certain embodiments.
Figure 4H:
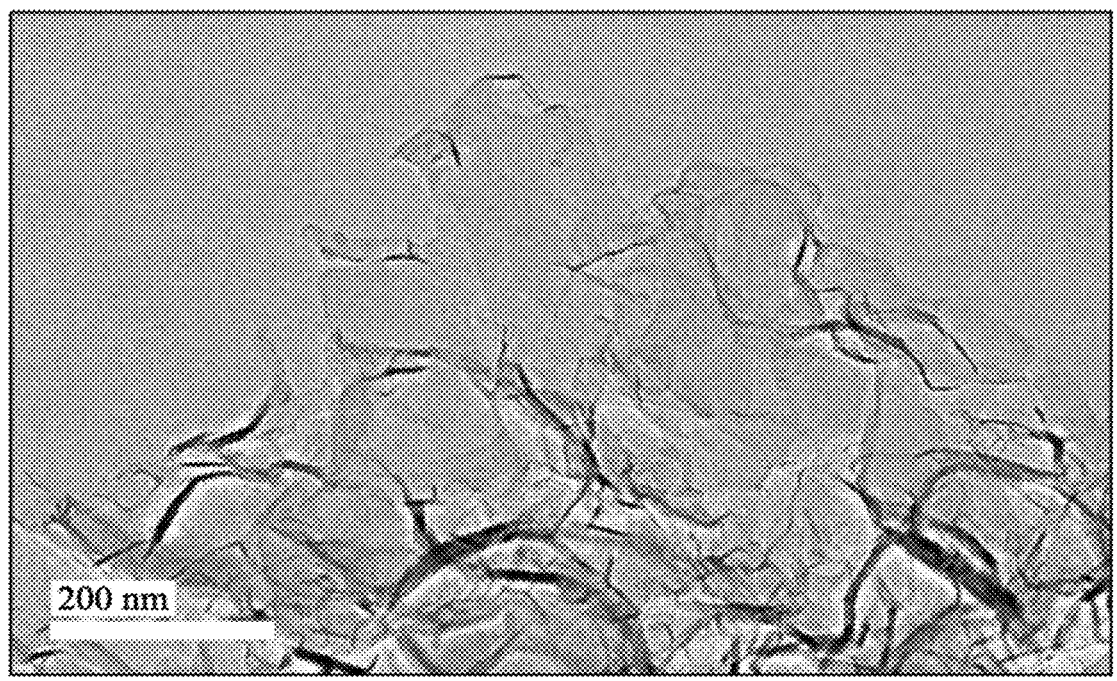
Figure 4I:
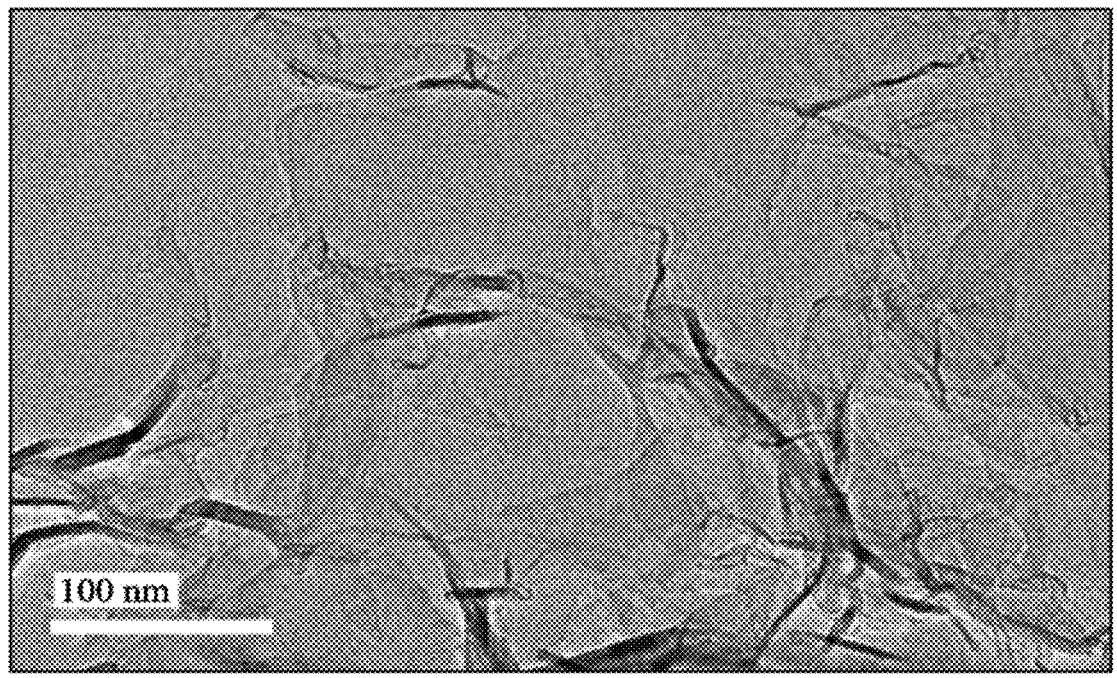
Figure 4J:
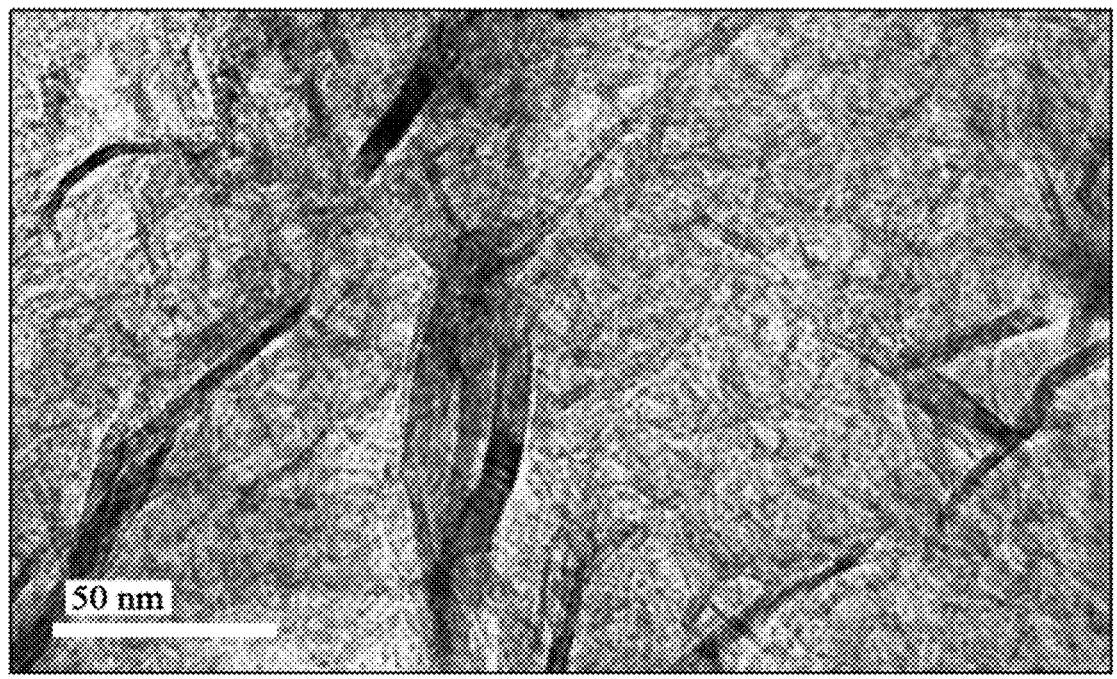

The carbonaceous composition of JAC-2 is confirmed through energy-dispersive X-ray spectroscopy (EDS) microanalysis, which also reveals a minor presence of oxygen, as depicted in FIG. 4F. The EDS spectrum affirms the absence of other elements, indicating the high purity of JAC-2, primarily comprising carbon. The elemental mapping inset in FIG. 4F illustrates the uniform distribution of carbon and oxygen throughout JAC-2. Thanks to the precise activation temperature employed during its production from jute sticks, JAC-2 maintains exceptional purity.

Figure 4K:
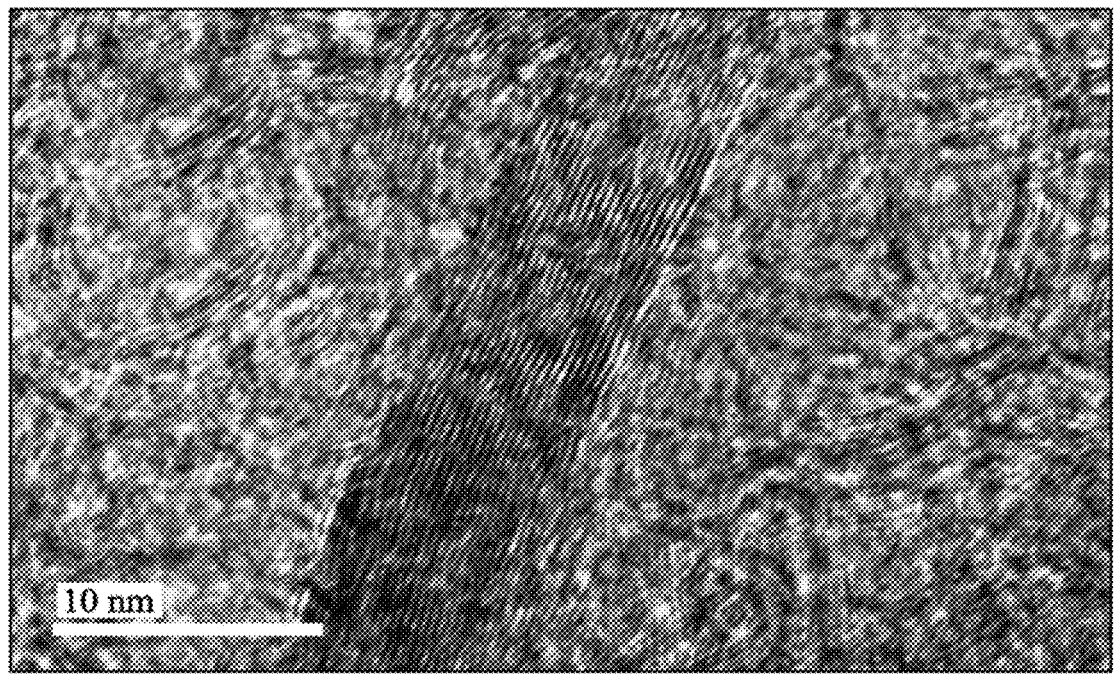
FIG. 4K depicts a high-resolution TEM (HRTEM) micrograph of JAC-2, according to certain embodiments.
Figure 4L:
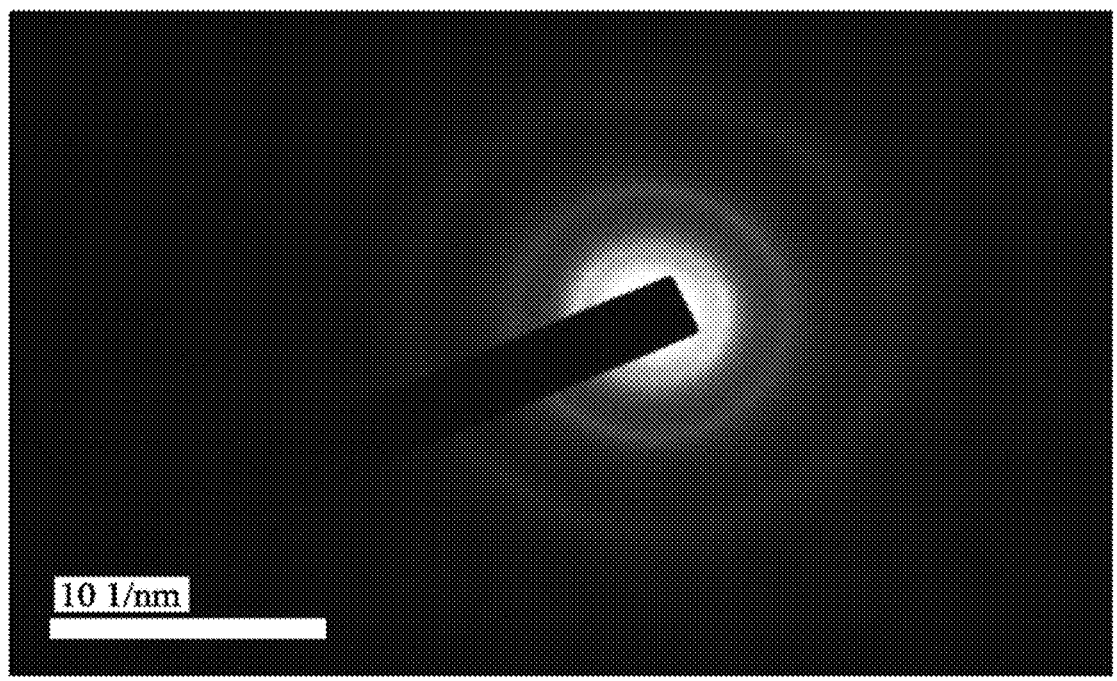
FIG. 4L is a selected area electron diffraction (SAED) diffraction pattern of JAC-2, according to certain embodiments.

To further explore the morphology and crystallinity of JAC-2, transmission electron microscopy (TEM) analysis was conducted. The low magnification images (FIGS. 4G-4J) reveal ripples and corrugations, indicative of the flexibility and ultrathin nature of JAC-2 nanosheets. FIG. 4K depicts the high-resolution TEM (HRTEM) image, which further confirms its partial turbostratic graphite-like structure, with JAC-2 nanosheets displaying an ultra-thin thickness. The average lattice spacing in the HRTEM image, measured using ImageJ software, closely aligns with the d-spacing of graphitic carbon (i.e., C (200) XRD diffraction plane), approximating 0.3 nm. The well-defined diffraction patterns of JAC-2 observed in the selected area electron diffraction (SAED; FIG. 4L) study corroborate the ordered graphite crystal structure of the material.

Figure 5A:
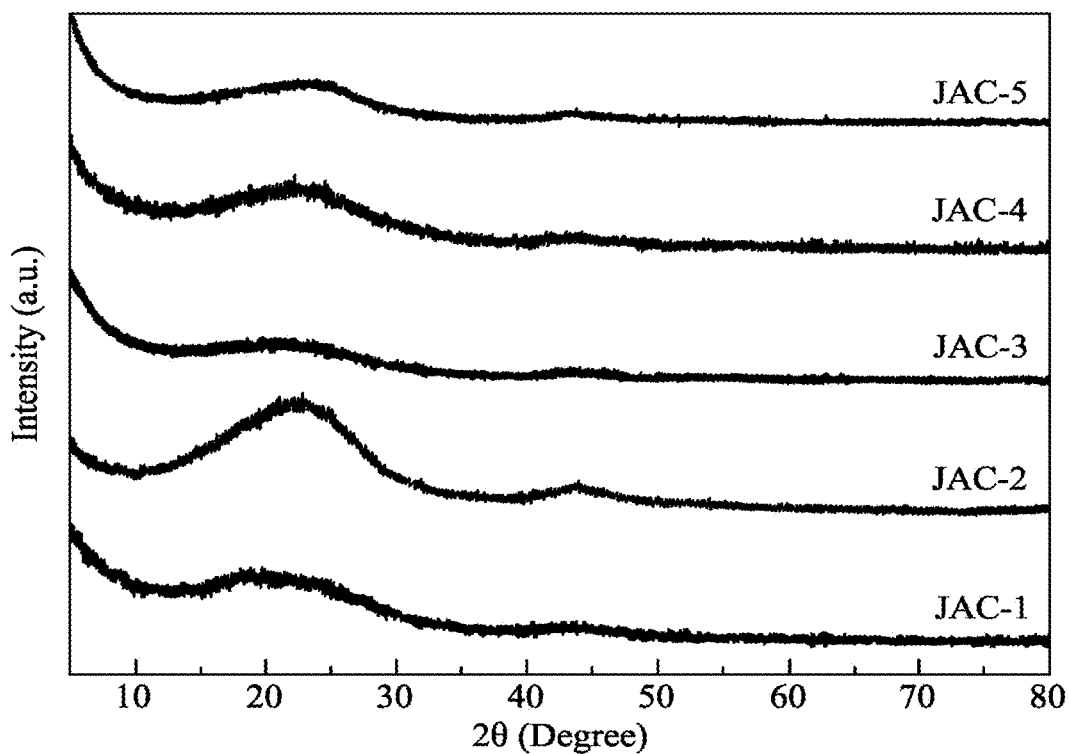
FIG. 5A is an X-ray diffractogram (XRD) of various JAC samples (JAC-1, JAC-2, JAC-3, JAC-4, and JAC-5) synthesized at various pre-treatment temperatures (JAC-3, JAC-2, and JAC-1) and different high activation temperatures (JAC-4 and JAC-5), according to certain embodiments.

The phase formation and diffraction properties of the prepared JAC materials were systematically examined using X-ray diffraction (XRD) analysis. FIG. 5A illustrates the XRD patterns of JAC samples synthesized at various pretreatment temperatures (JAC-3, JAC-2, and JAC-1) and different high activation temperatures (JAC-4 and JAC-5). Each sample exhibits a consistent diffraction profile, with all observed peaks corresponding to high-purity graphitic carbon. The XRD spectra of the JAC samples manifest two discernible peaks. The first peak, located at approximately $2\theta=\sim 25°$, corresponds to the C (002) diffraction peak, signifying the presence of graphitic carbon structures within the material. The second peak, observed around $2\theta=\sim 42°$, exhibits reduced intensity and broader characteristics, attributable to the C (100) diffraction peak, indicative of the existence of amorphous carbon components in JAC. This assignment aligns with reference JCPDS card number 41-1487. Notably, the JAC-2 sample exhibits a highly intense C (002) diffraction peak, indicative of a relatively high degree of graphitization. Furthermore, the C (002) peak in JAC-2 is observed at larger angles, indicating a reduction in the interlayer distance (d002) between the graphitic sheets. Additionally, the sharper width of the C (002) peak implies a more precise and compact arrangement of the graphitic layers. Importantly, the XRD spectra exhibit no additional peaks, confirming the production of pure JAC.

To assess the composition and level of graphitization in the prepared JAC-2 sample, Raman spectroscopy was employed. The resulting Raman spectrum displays two distinct bands known as the G and D bands. The D-band signifies disorder and is associated with imperfectly structured arrangements, whereas the G-band represents well-ordered graphite crystals. Typically, the G-band, situated at approximately 1550 cm$^{-1}$, corresponds to the in-plane motion of strongly bonded sp$^2$ carbon atoms, characteristic of graphitic carbon. Unlike, the D-band, positioned around 1350 cm$^{-1}$, indicates the presence of defect sites or disordered tetrahedral sp$^3$-hybridized carbon atoms. Both the G and D bands exhibit a narrower half-width at half maximum, providing additional evidence of localized short-range ordering structures in JAC-2. The ratio of integrated intensities between the D-band and G-band (ID/IG) serves as an indicator of structural defects. For JAC-2, the calculated ID/IG ratio is 0.8, implying a lower number of defects and a higher prevalence of significant graphitic segments. The presence of fewer defects and enhanced graphitic segments, as indicated by Raman spectroscopy, aligns with HRTEM analysis, affirming the well-defined graphite crystal structure of JAC-2. Furthermore, the XRD analysis corroborates the presence of graphitic carbon in JAC-2 by detecting the C (002) diffraction peak. Concisely, the Raman spectroscopy results are consistent with the structural characteristics revealed by HRTEM and XRD, collectively highlighting the high-quality graphitic nature of JAC-2.

Figure 5B:
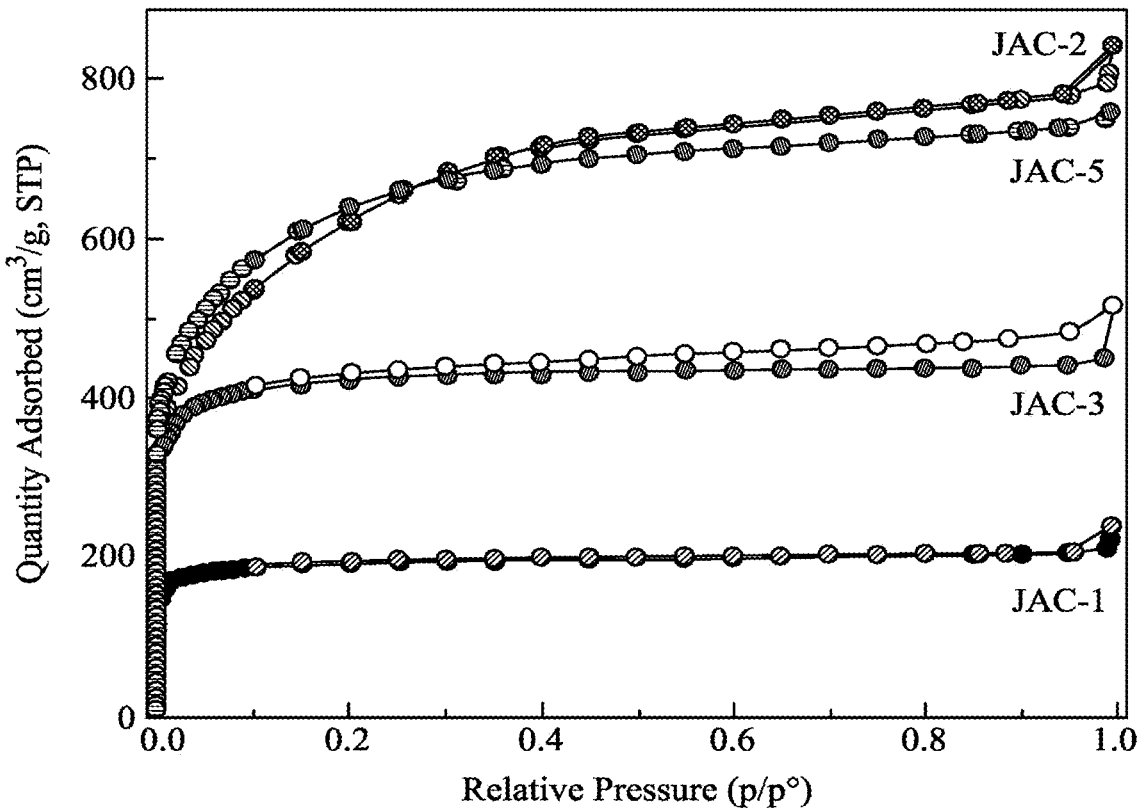
FIG. 5B shows nitrogen adsorption/desorption isotherms for various JAC samples, according to certain embodiments.

The adsorption capacity of electrolytes is influenced by pore size distribution, pore volume, and the specific surface area (SSA) of activated carbon. These textural attributes are affected by several factors, including the choice of raw materials, the specific preparation technique, and environmental conditions. Nitrogen adsorption/desorption isotherms were employed to determine the SSA, pore size distribution, and pore volume of the produced carbon materials, utilizing the Brunauer-Emmett-Teller (BET) method. FIG. 5B presents the average pore width distribution curves and nitrogen adsorption/desorption isotherms for the JAC materials. All JAC materials exhibit a type IV nitrogen adsorption/desorption isotherm with an $H_4$ hysteresis loop in the range of approximately 0.42 to 0.99 P/Po. Materials comprising a combination of micropores, mesopores, and macropores exhibit the $H_4$-type hysteresis loop. Particularly, samples JAC-2 and JAC-3 exhibit a wider hysteresis loop spanning from $P/P_o=0.45$ to $P/Po=1$, indicating the presence of additional mesopores. The JAC samples display well-developed pores spanning from micropores to macropores, facilitating effective electrolyte ion adsorption/desorption with excellent connectivity. Among the JAC samples, JAC-2 nanosheets exhibit the highest BET surface area, approximately 2600 $m^2/g$, while JAC-1, JAC-3, and JAC-5 display BET surface areas of around 760, 1100, and 1650 $m^2/g$, respectively. The average Barrett-Joyner-Halenda (BJH) pore volume is 0.3 $cm^3/g$ for JAC-1, 1.3 $cm^3/g$ for JAC-2, 0.7 $cm^3/g$ for JAC-3, and 1.2 $cm^3/g$ for JAC-5. The enhanced BJH pore volume of JAC-2 enables effective electrolyte ion absorption throughout the supercapacitor's charging process. The pore structure of JAC-2 encompasses a combination of micro- and mesopores, underscoring the contribution of activation with $NaHCO_3$ and the pre-treatment temperature to pore development enhancement.

Figure 5C:
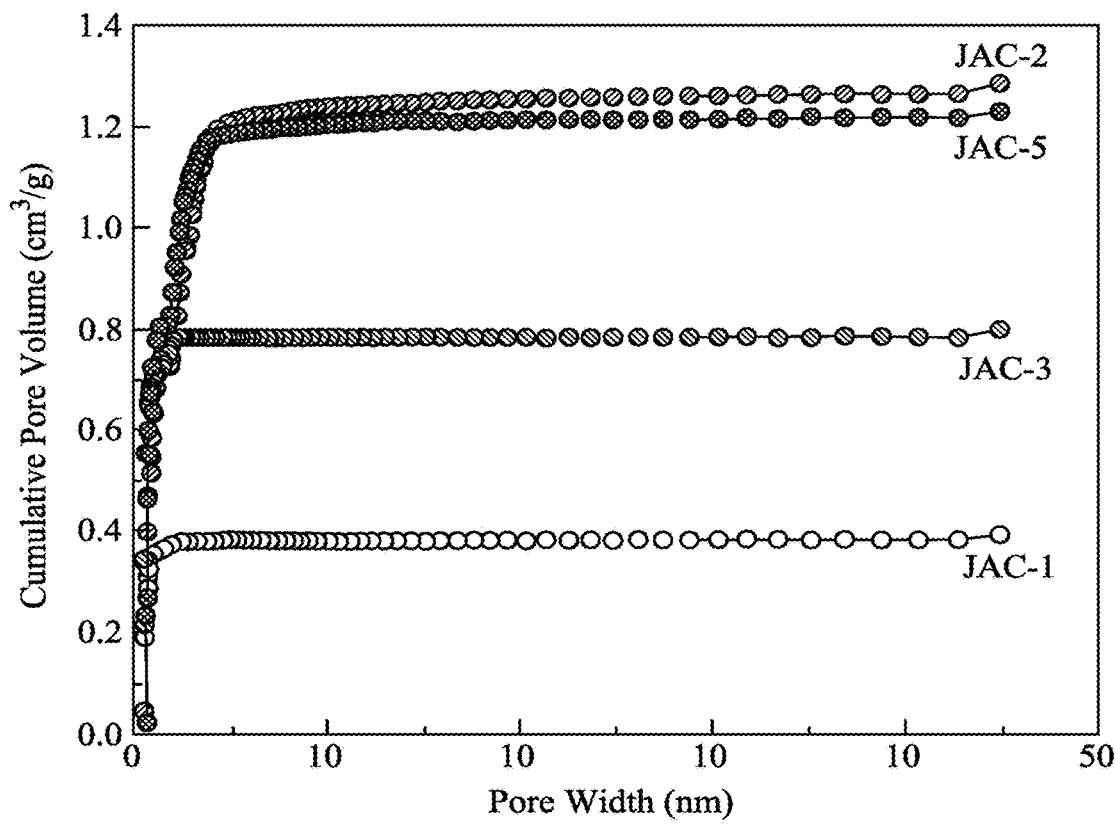
FIG. 5C shows Barrett-Joyner-Halenda (BJH) pore size distribution profile for various JAC samples, synthesized under different conditions from the jute sticks powder, according to certain embodiments.

FIG. 5C presents consistent BJH pore size distributions, revealing a broad distribution ranging from approximately 0.4 nm to 47 nm. The predominance of micropores (approximately 0.2 to 2 nm) and mesopores (approximately 2 to 50 nm) in JAC-2 signifies its highly porous nature. The presence of both micro- and mesopores in JAC-2 facilitates advanced energy storage strategies by promoting efficient electrolyte ion diffusion through the porous material, maximizing surface accessibility, and minimizing the electronic transport path. This benefits the charging and discharging process of the supercapacitor, especially under high current density conditions. JAC-2, characterized by a substantial proportion of mesopores, demonstrates a higher capacitance capacity. The two-step pyrolysis process used to produce JAC-2 outperforms the one-step pyrolysis method concerning characteristics relevant to supercapacitor applications. The two-step pyrolysis process yields nanosheets with a hierarchical structure, high porosity, and well-organized characteristics. These nanosheets possess an increased SSA of 2600 $m^2/g$, surpassing the 1100 $m^2/g$ achieved through the one-step pyrolysis method. Additionally, the two-step pyrolysis process yields a higher yield of 24% and produces JAC-2 with a highly graphitic structure. JAC-2, obtained through the two-step pyrolysis method, embodies a combination of attributes that make it exceptionally well-suited for use in supercapacitors, owing to its outstanding surface area, porosity, and improved electrical conductivity attributed to its highly graphitic nature.

Figure 5D:
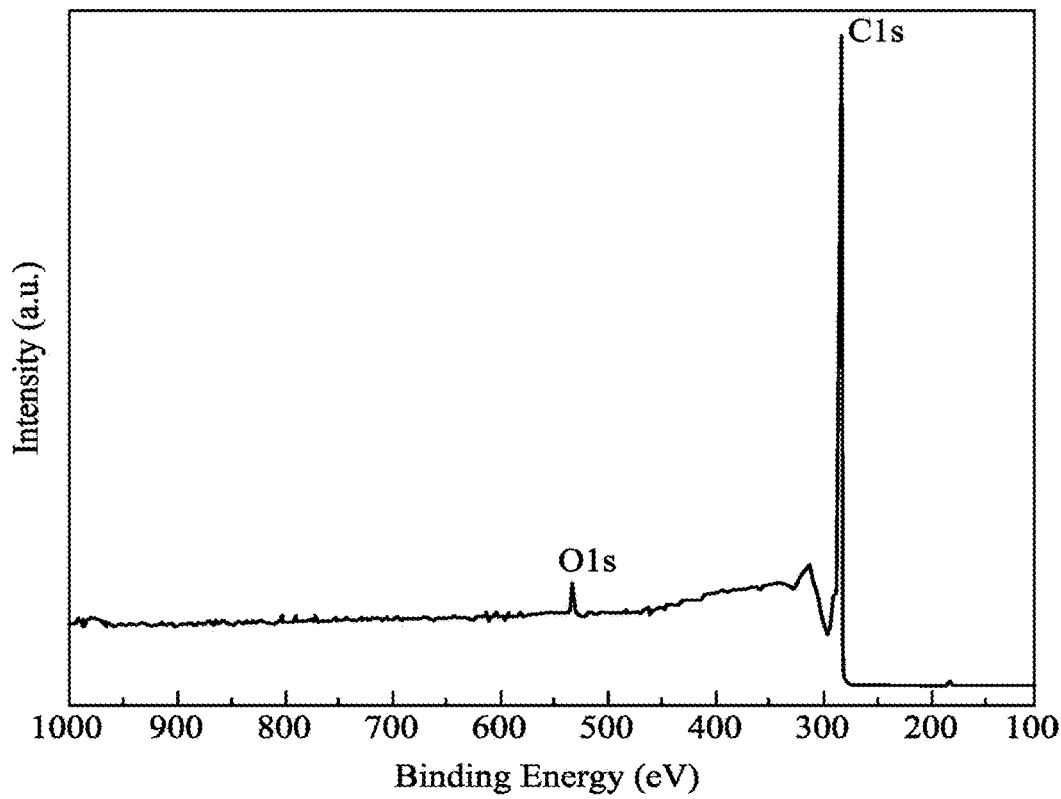
FIG. 5D shows an X-ray photoelectron spectroscopy (XPS) analysis survey spectrum of the JAC-2, according to certain embodiments.
Figure 5E:
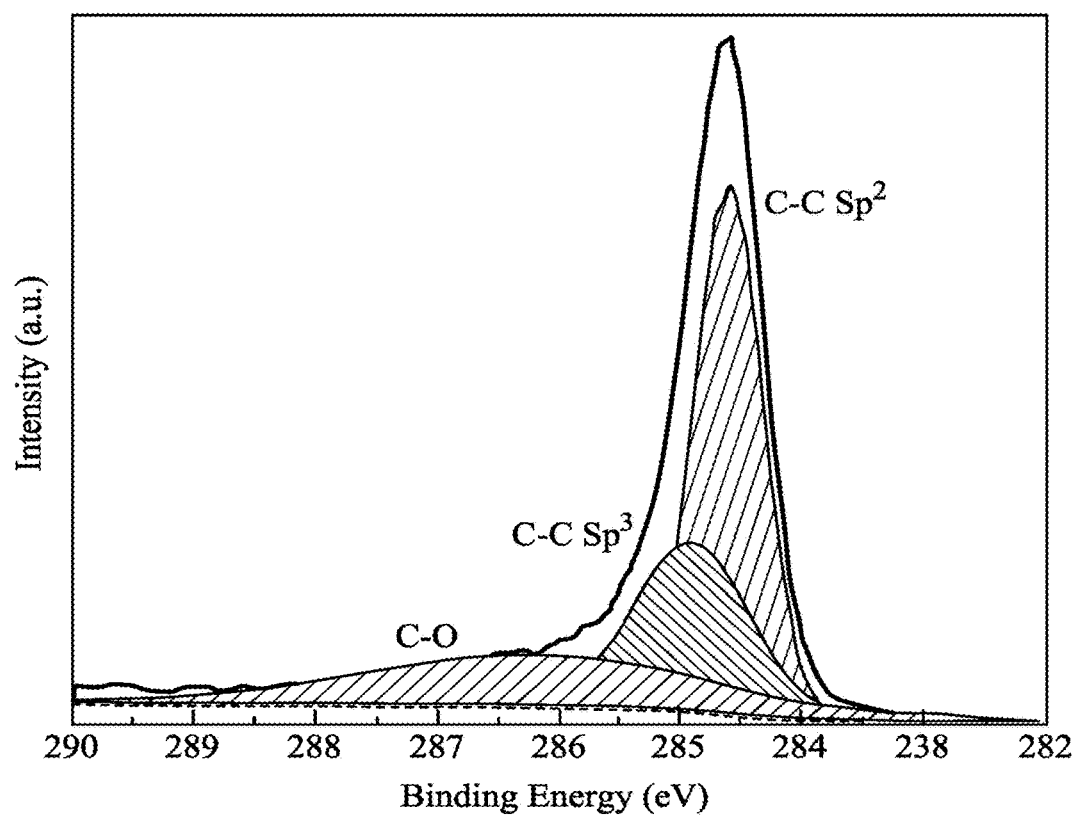
FIG. 5E is an XPS C1s spectrum of JAC-2, according to certain embodiments.
Figure 5F:
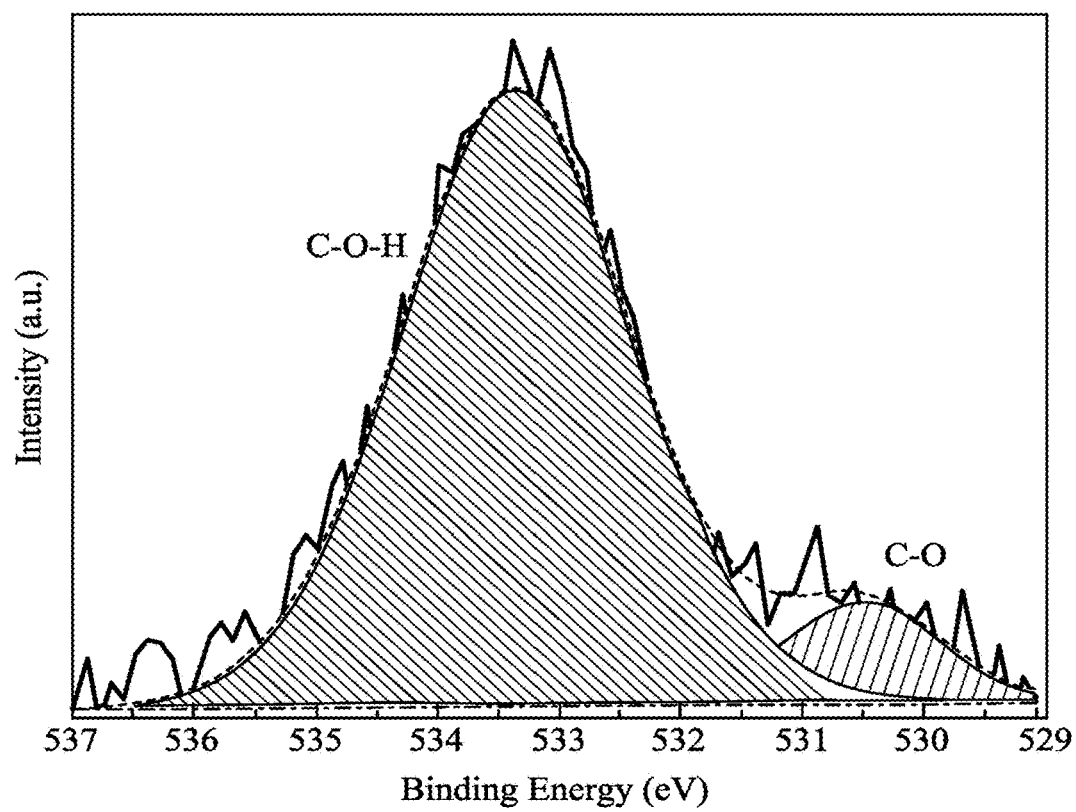
FIG. 5F is an XPS O1s spectrum of JAC-2, according to certain embodiments.

X-ray photoelectron spectroscopy (XPS) analysis was conducted to investigate the elemental composition and chemical bonding structures of the synthesized JAC-2 sample. The comprehensive XPS survey spectrum is presented in FIG. 5D, substantiates that JAC-2 primarily comprises carbon (C1s), with a minor presence of oxygen (O1s). The high-resolution C1s spectrum in FIG. 5E delineates two discernible peaks corresponding to $sp^2$ C—C (located at approximately 284.6 eV) and $sp^3$ C—C bonds (located at approximately 285.3 eV). The $sp^2/sp^3$ ratio, calculated at approximately 1.3, affirms that JAC-2 predominantly consists of $sp^2$ carbon sites, denoting a high degree of graphitic carbon content. Furthermore, a peak observed at a binding energy of roughly 290 eV can be ascribed to C—O bonds. The high-resolution XPS spectrum of O1s, as illustrated in FIG. 5F, unveils two distinctive peaks centered around 530 and 533 eV, corresponding to adsorbed C—O and C—O—H bonds, respectively. These functional groups within carbon materials, used in supercapacitors, such as C—O and C—O—H bonds, are conducive to pseudocapacitance, augmenting charge storage capacity, improving wettability, ion diffusion, stability, and cycling performance.

Figure 6A:
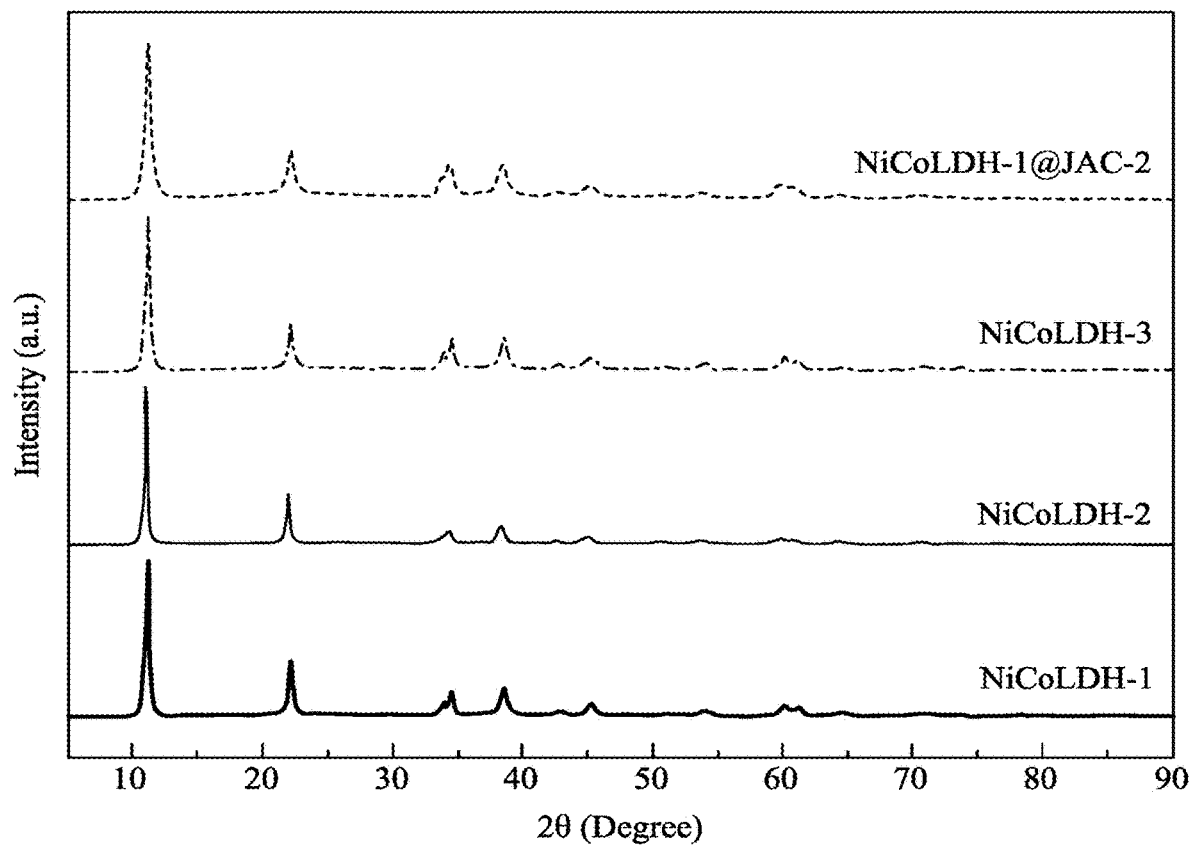
FIG. 6A shows XRD patterns of various NiCoLDH samples (NiCoLDH-1, NiCoLDH-2, NiCoLDH-3, and NiCoLDH-1@JAC-2), synthesized via hydrothermal synthesis, according to certain embodiments.

These functional groups introduce additional active sites for charge storage and enhance the efficiency of electrochemical reactions, resulting in enhanced supercapacitor performance FIG. 6A presents the X-ray Diffraction (XRD) patterns of the samples synthesized via hydrothermal synthesis. The diffraction peaks observed at around 2θ=11°, 22°, 34°, 38°, 45°, 54°, and 600 for all NiCoLDHs correspond to the (003), (006), (101), (012), (015), (018), and (110) plane reflections of the hydrotalcite-like LDH phase. These results affirm the presence of a layered structure in the analyzed samples, consistent with the standard JCPDS data (card no. 40-0216) for NiCoLDH. Notably, the diffraction peaks of NiCoLDH-1@JAC-2 show minimal changes, even at very low scan rates (e.g., 0.1°/minute), when coupled with JAC-2. This observation indicates that the inclusion of JAC-2 in the NiCoLDH-1@JAC-2 composite has a negligible impact on the crystallinity and structure of NiCoLDH-1.

Figure 6B:
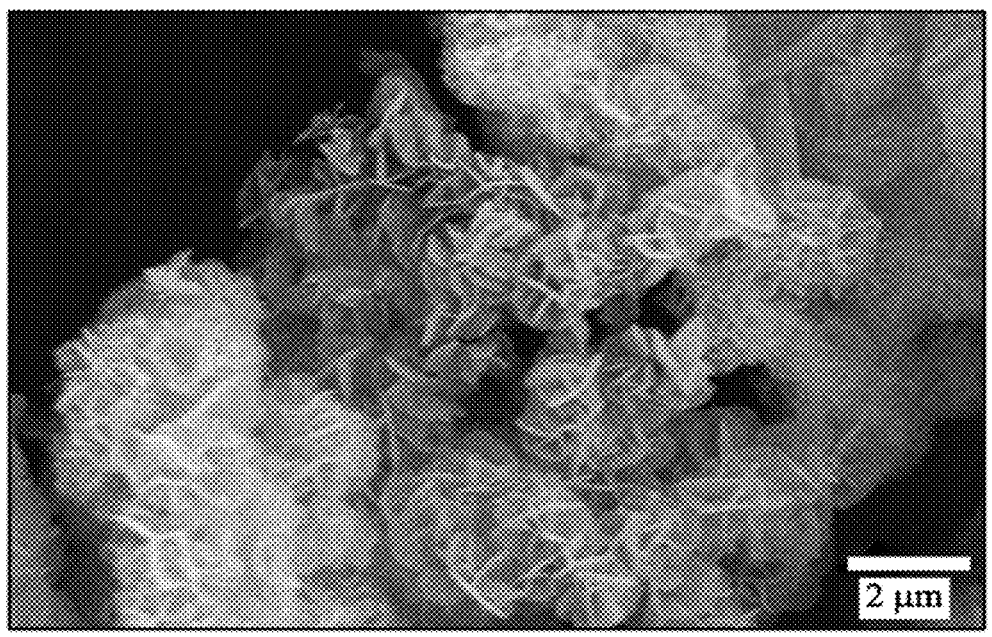
FIG. 6B depicts an FESEM image of NiCoLDH-1, according to certain embodiments.
Figure 6C:
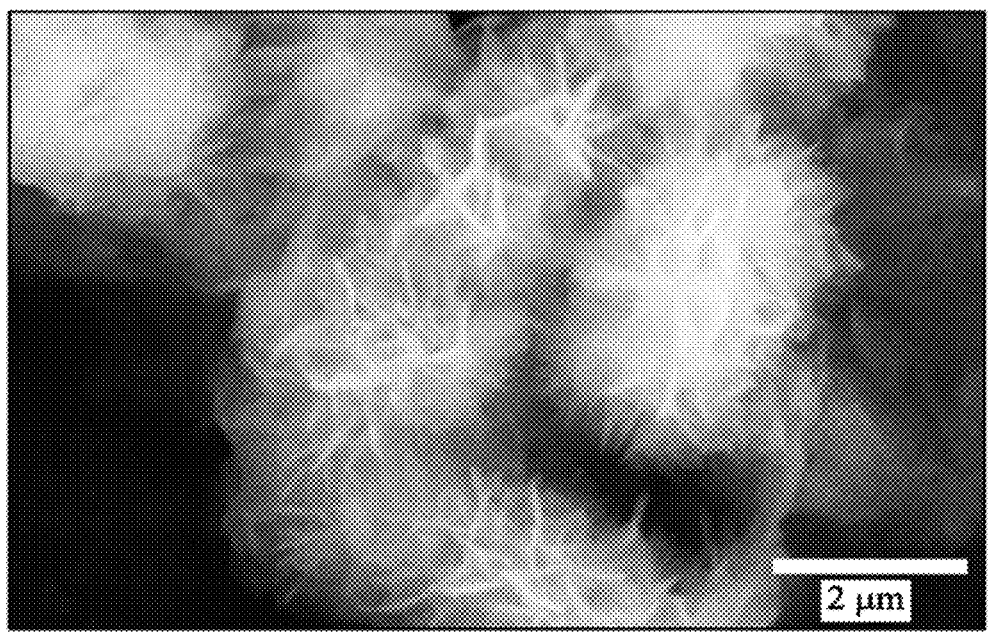
FIG. 6C shows an FESEM image of NiCoLDH-2, according to certain embodiments.
Figure 6D:
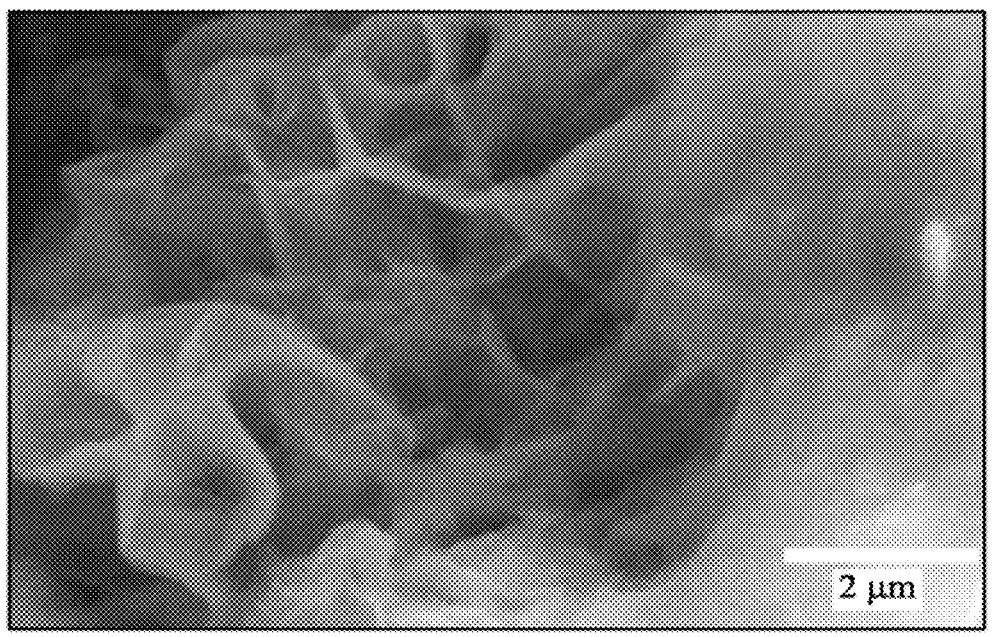
FIG. 6D shows an FESEM image of NiCoLDH-3, according to certain embodiments.

FIGS. 6B-6D depict field emission scanning electron microscopy (FESEM) micrographs of NiCoLDH-1, NiCoLDH-2, and NiCoLDH-3, which were synthesized using varying stoichiometric ratios of Ni and Co. These images reveal the presence of a nanoflower morphology with hierarchical porous architectures in all prepared samples. These structural features enhance the accessibility of electrolyte ions, thereby contributing to improved electrochemical performance. The existence of interparticle gaps within the lamellar structure facilitates the incorporation of electrolyte ions and provides additional electrochemically active sites, enhancing the utilization of LDH. Moreover, the molar ratios of Ni and Co exert a significant influence on the morphological distribution of nanoflowers and the size of nanosheets. From the FESEM micrographs, it is evident that NiCoLDH-1 exhibits a more consistent shape with a uniform distribution compared to NiCoLDH-2 and NiCoLDH-3. Notably, NiCoLDH-1 electrodes synthesized at a molar ratio of 1:1 exhibit the smallest nanosheet size, approximately 10 nm, due to the controlled deposition rate employed during synthesis, resulting in a higher number of active sites exposed compared to the other electrodes.

Figure 6E:
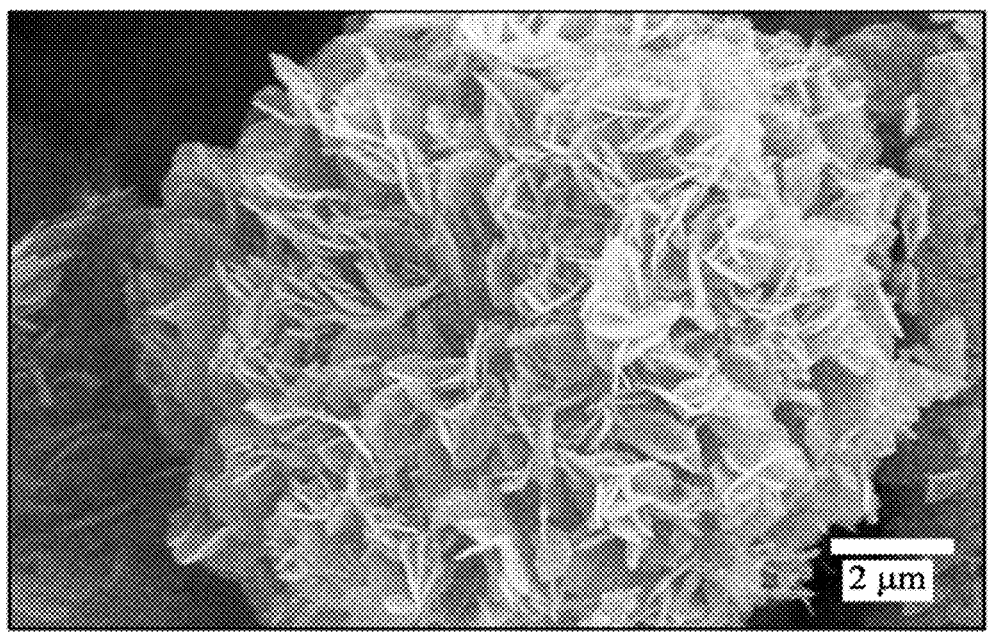
FIG. 6E shows an FESEM image of NiCoLDH-1@JAC-2 nanocomposite, according to certain embodiments.

FIG. 6E presents the FESEM micrograph of NiCoLDH-1@JAC-2, providing evidence that the nanocomposite retains the nanoflower sizes observed in NiCoLDH-1, with a diameter of approximately 10 μm. The observed morphological changes can be attributed to the synergistic action of JAC-2, which selectively binds to the surface of the nanoflowers and impedes the spontaneous formation of nanosheets, leading to the formation of well-defined spherical structures. Additionally, the integration of JAC-2, characterized by its substantial surface area, exhibits an enhanced affinity for metal ions on the surface of the nanoflowers. This interaction results in the formation of metal-oxygen bonds, ultimately leading to an expansion in the diameter of the nanoflowers.

NiCoLDH-1, as observed in the FESEM images, exhibits numerous flower-like structures with diameters ranging from 0.3 to 2.0 µm, closely resembling the natural hydrangea flower's structure. These nanoflowers possess hierarchical architectures characterized by high surface-to-volume ratios, a feature evident in high-magnification micrographs. These distinctive nanoflowers are uniformly distributed and composed of ultrathin nanosheets with an average thickness of approximately 10 nm. The elemental composition of NiCoLDH-1 nanoflowers was determined through the energy-dispersive X-ray spectroscopy (EDS) spectrum, which exhibited prominent peaks corresponding to Ni, Co, and O, without any impurity peaks, indicating the pure synthesis of NiCoLDH-1 nanoflowers. The presence of Au peaks in the EDS spectrum of NiCoLDH-1 is attributed to the gold coating applied during FESEM sample preparation. Similarly, the EDS elemental mapping of NiCoLDH-1 nanoflowers confirms the uniform distribution of Ni, Co, and O within the NiCoLDH-1 sample.

FESEM micrographs of the NiCoLDH-1@JAC-2 nanocomposite at various magnifications are presented in FIGS. 7A-7F. At low magnification, the FESEM image reveals rod-like structures of JAC-2 interconnecting the NiCoLDH-1 nanoflowers, enhancing interconnectivity within the nanocomposite. The presence of a porous carbon framework with improved connectivity plays a role in facilitating the adsorption process and enabling sufficient access for electrolyte ions. Consequently, this enhances the electrochemical energy storage performance. Furthermore, the nanocomposite exhibits a flower-like spherical morphology, providing ample capacity for charge transfer and ion penetration.

Figure 7A:
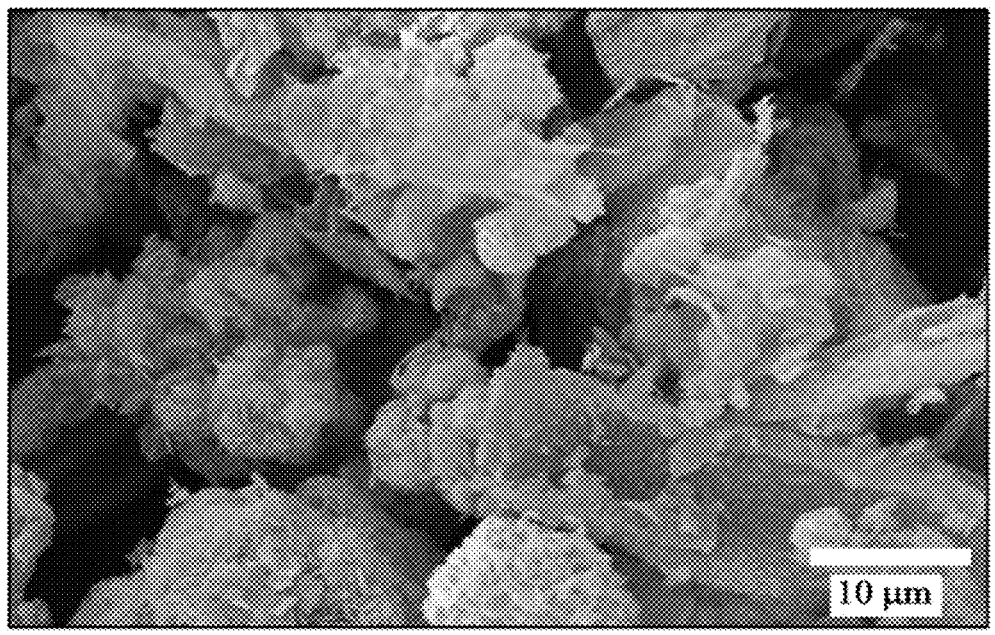
FIGS. 7A-7F show FESEM micrographs of the NiCoLDH-1@JAC-2 nanocomposite, at various magnifications, according to certain embodiments.
Figure 7B:
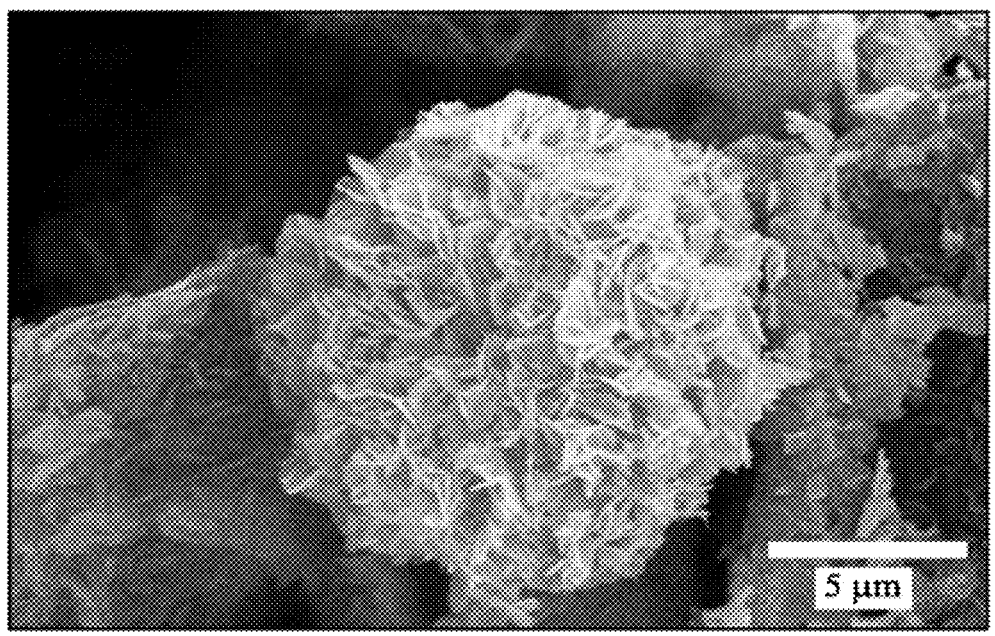
Figure 7C:
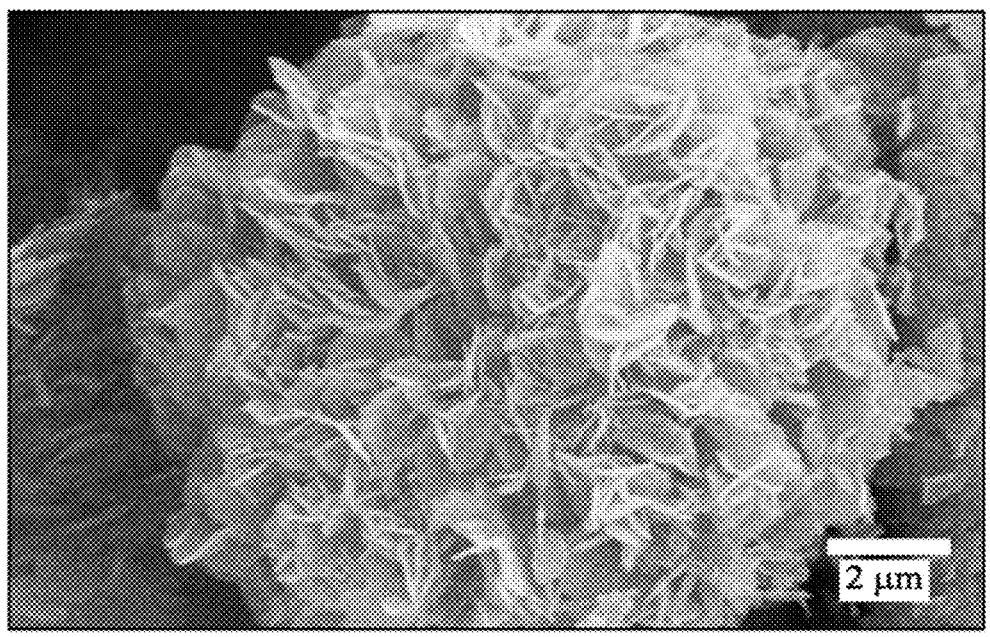
Figure 7D:
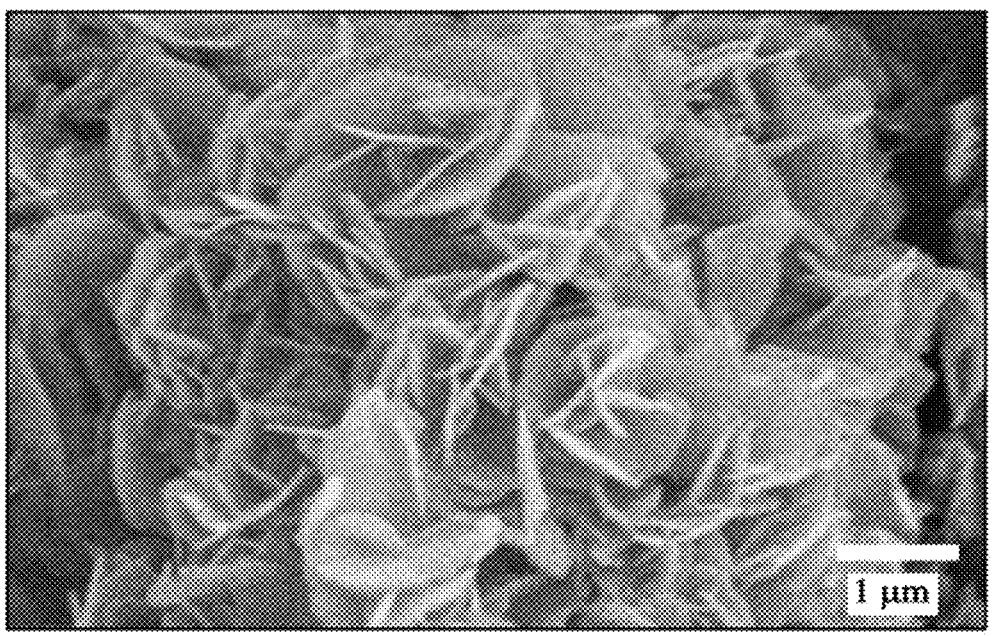
Figure 7E:
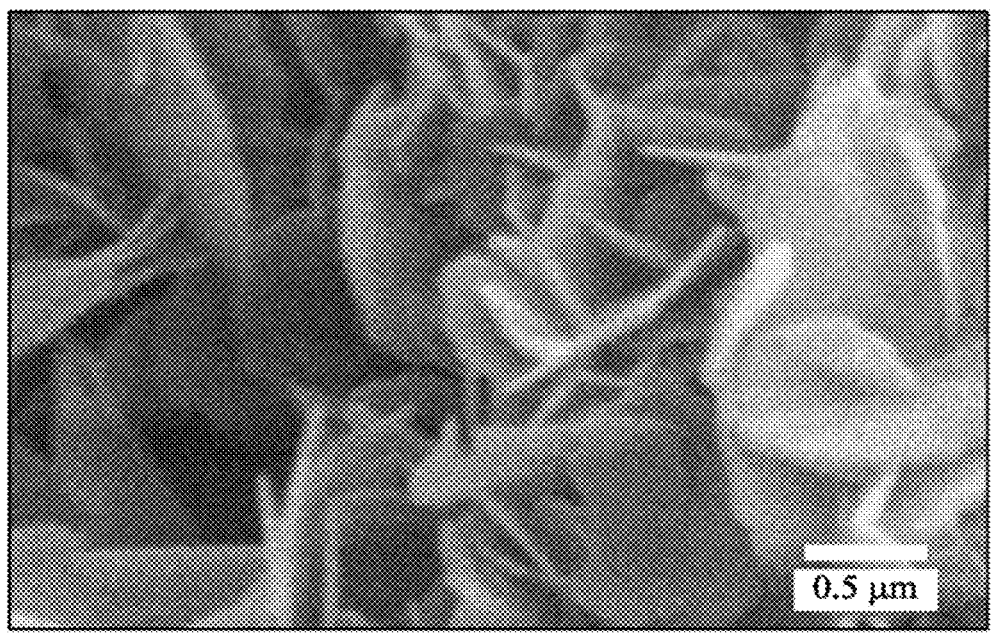
Figure 7F:
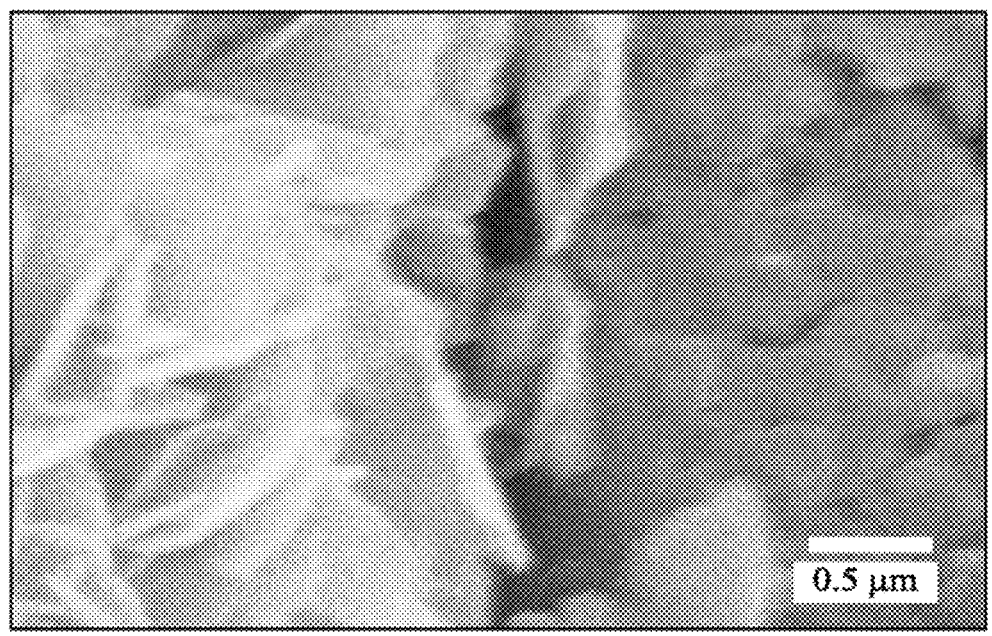
Figure 7G:
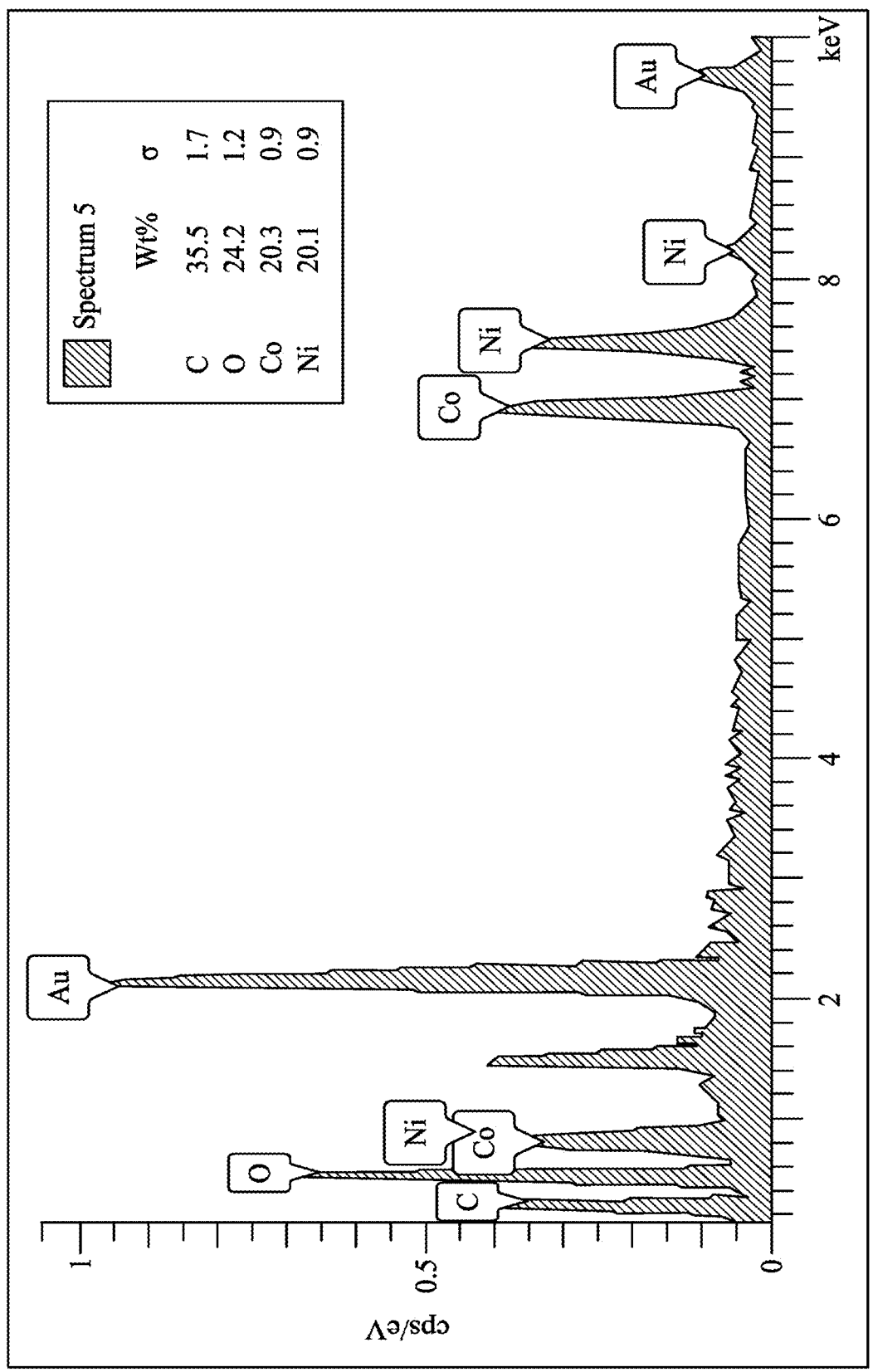
FIG. 7G depicts an EDS spectrum of the NiCoLDH-1@JAC-2 nanocomposite, according to certain embodiments.
Figure 7H:
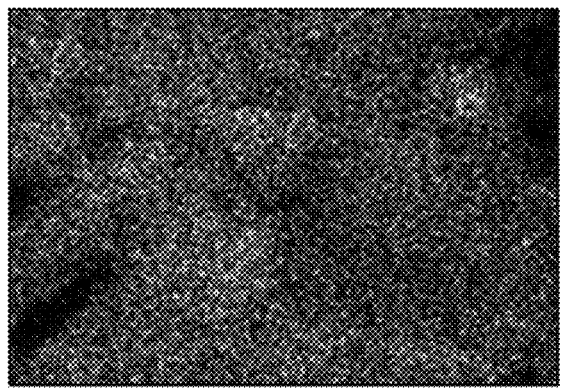
FIG. 7H depicts the EDS elemental mapping analysis of Ni for the NiCoLDH-1@JAC-2 nanocomposite, according to certain embodiments.
Figure 7I:
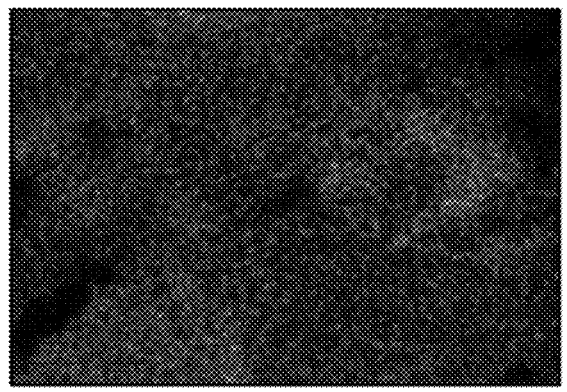
FIG. 7I depicts the EDS elemental mapping analysis of Co for the NiCoLDH-1@JAC-2 nanocomposite, according to certain embodiments.
Figure 7J:
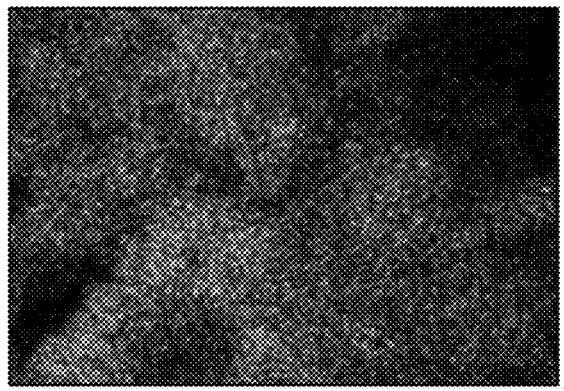
FIG. 7J depicts the EDS elemental mapping analysis of 0 for the NiCoLDH-1@JAC-2 nanocomposite, according to certain embodiments.
Figure 7K:
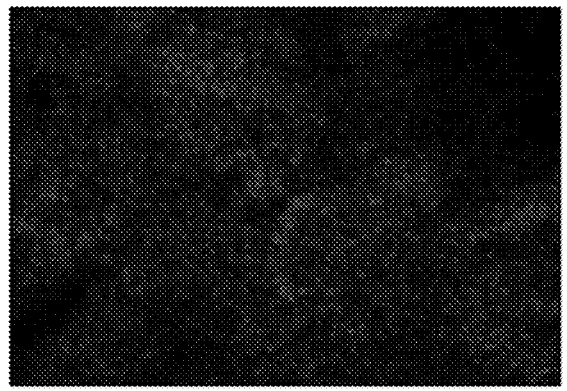
FIG. 7K depicts the EDS elemental mapping analysis of C for the NiCoLDH-1@JAC-2 nanocomposite, according to certain embodiments.

FIG. 7G depicts an EDS analysis that was conducted to ascertain the elemental composition of the NiCoLDH-1@JAC-2 nanocomposite. The elemental composition, as determined by the EDS spectrum, comprises carbon (C), nickel (Ni), cobalt (Co), and oxygen (O) as its constituent elements. In one aspect, the composite comprises 25-45 wt. % carbon, 15-35 wt. % oxygen, 10-30 wt. % cobalt, and 10-30 wt. % nickel, based on a total weight of the composite. No impurity peaks were observed, confirming the successful synthesis of a pure nanocomposite. Furthermore, the EDS spectra of NiCoLDH-1@JAC-2 demonstrate the presence of two separate peaks attributable to gold (Au). These peaks are a result of the gold coating applied during the preparation of the FESEM samples. The EDS elemental mapping analysis of the NiCoLDH-1@JAC-2 nanocomposite (FIG. 7H-K) confirms the homogeneous dispersion of nickel, cobalt, oxygen, and carbon elements throughout the entire nanocomposite structure.

Figure 7L:
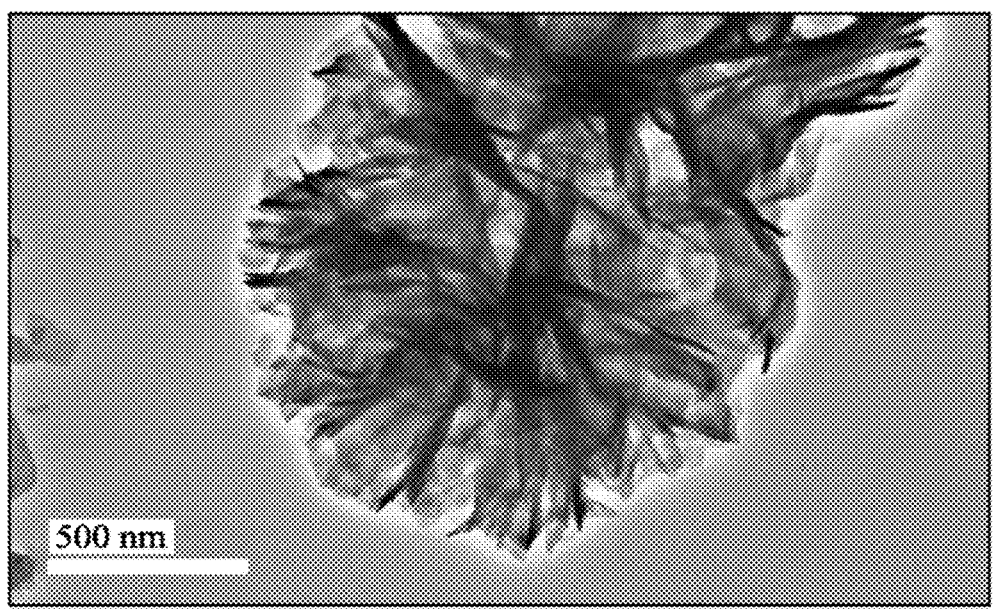
FIGS. 7L-7O depicts TEM images of the NiCoLDH-1@JAC-2 nanocomposite, at different magnifications, according to certain embodiments.
Figure 7M:
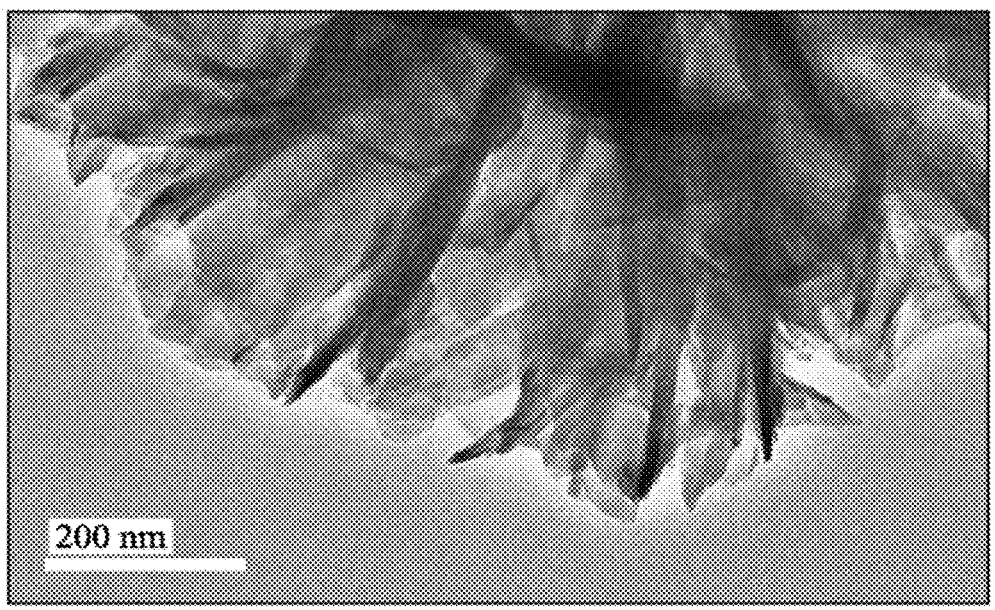
Figure 7N:
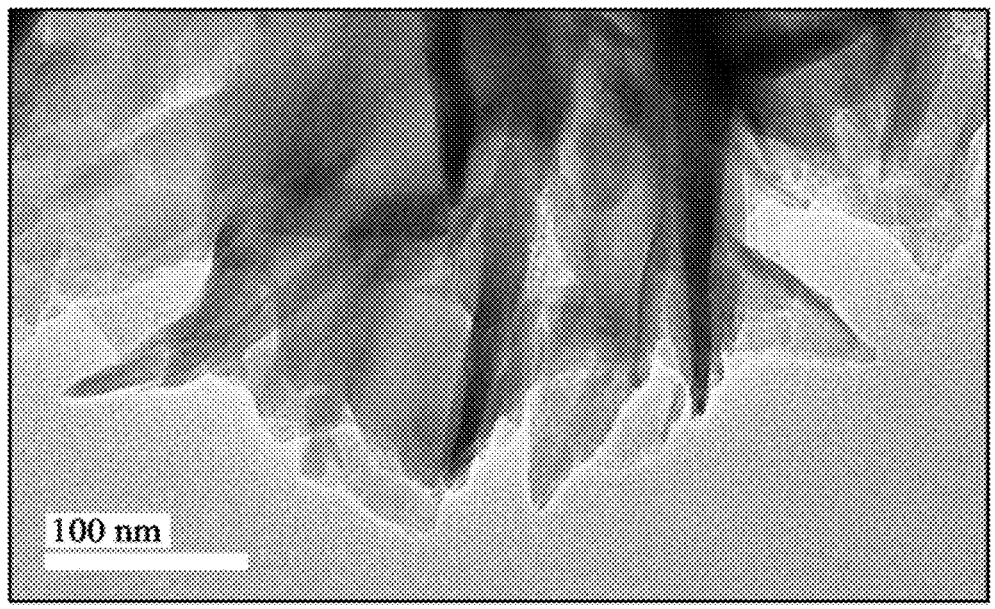
Figure 7O:
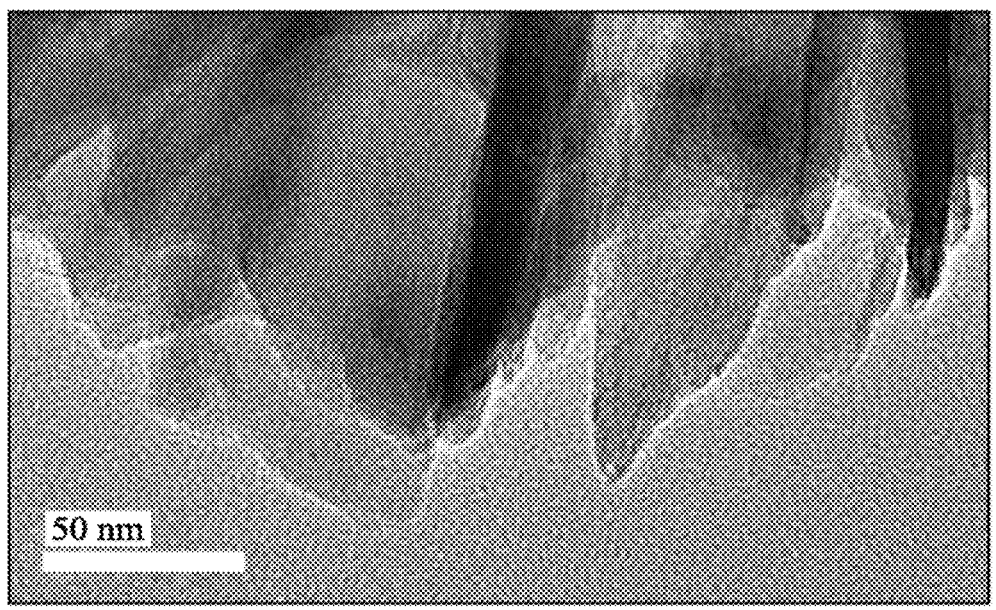
Figure 7P:
FIG. 7P depicts an HRTEM image of the NiCoLDH-1@JAC-2 nanocomposite, according to certain embodiments.
Figure 7Q:
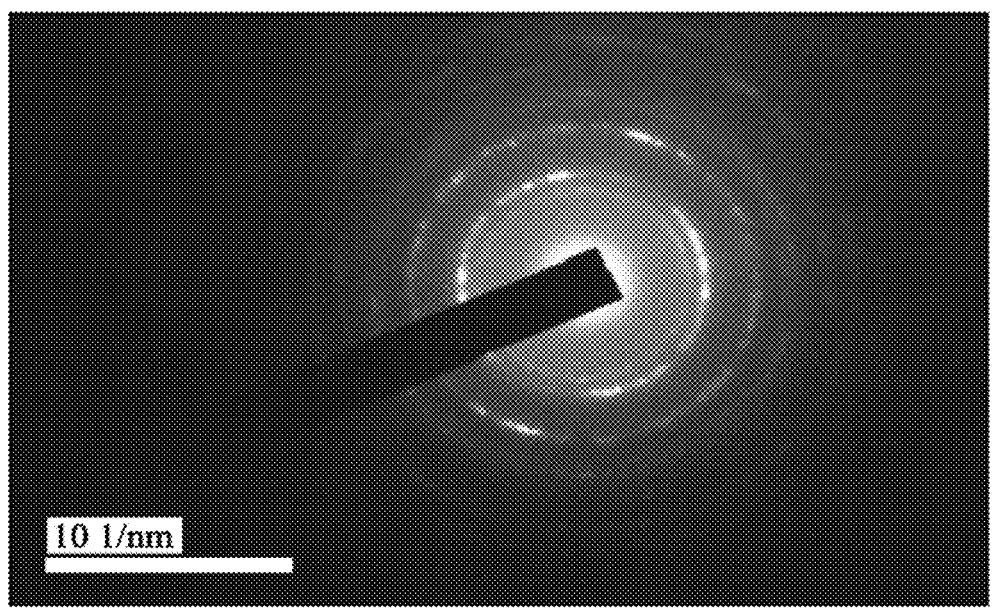
FIG. 7Q shows an SAED pattern of the NiCoLDH-1@JAC-2 nanocomposite, according to certain embodiments.

The morphology of NiCoLDH-1@JAC-2 was examined using transmission electron microscopy (TEM), as depicted in FIGS. 7L.-O. The acquired images affirm the presence of a nanoflower-like morphology and a structure resembling nanosheets within the material. These TEM images distinctly reveal closely packed petals forming the nanoflowers, consistent with the observations from the FESEM micrographs. These petals exhibit straight shapes, signifying a relatively uniform thickness. Importantly, the TEM images of the NiCoLDH-1@JAC-2 nanocomposite unveil the interconnection between the nanoflowers and their petals with the JAC-2 nanosheets. In order to assess the crystalline nature of the nanocomposite, a high-resolution transmission electron microscopy (HRTEM) image as shown in FIG. 7P, was captured, revealing lattice fringes with an average spacing of approximately 0.2 nm. This observation affirms the high crystallinity of the nanocomposite. Furthermore, the corresponding selected area electron diffraction (SAED) pattern, as shown in FIG. 7Q, obtained from the prepared NiCoLDH-1@JAC-2 nanocomposite, attests to the crystalline nature of the nanoflowers and their uniform orientation. The discernible diffraction rings align with the (003), (006), (101), (012), (015), (018), and (110) reflections, consistent with the XRD findings previously discussed.

Figure 8A:
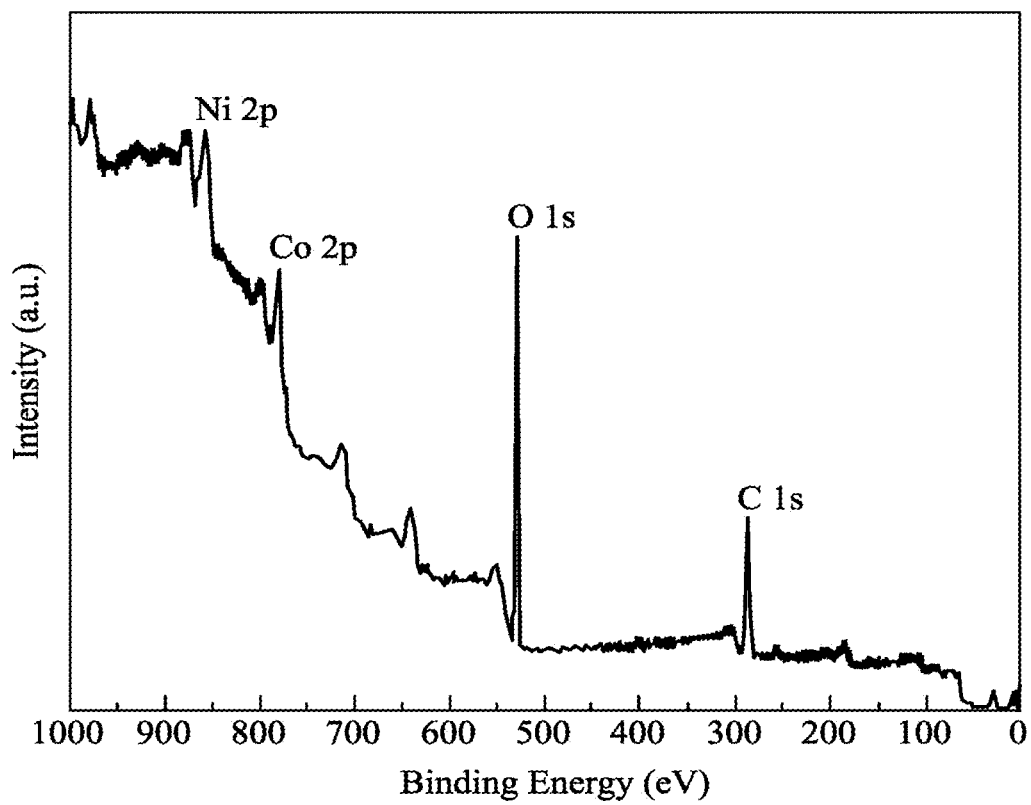
FIG. 8A shows a survey XPS spectrum of the NiCoLDH-1@JAC-2 nanocomposite, according to certain embodiments.
Figure 8B:
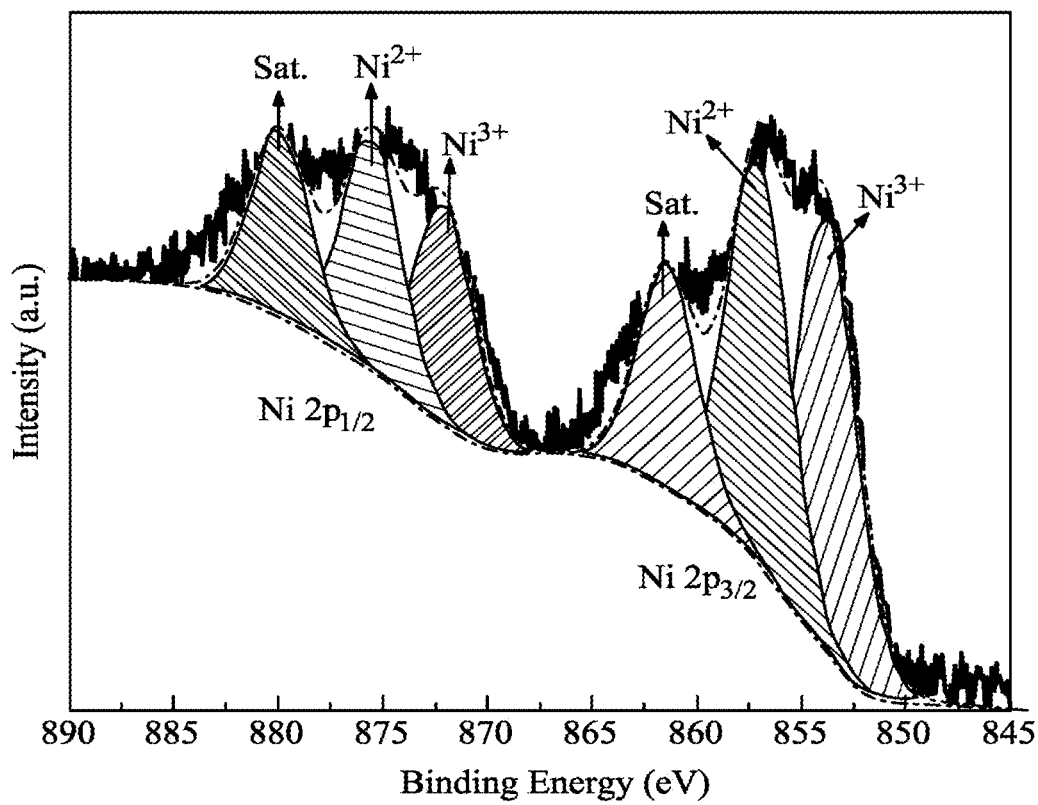
FIG. 8B shows a high-resolution XPS spectra of Ni 2p of the NiCoLDH-1@JAC-2 nanocomposite, according to certain embodiments.
Figure 8C:
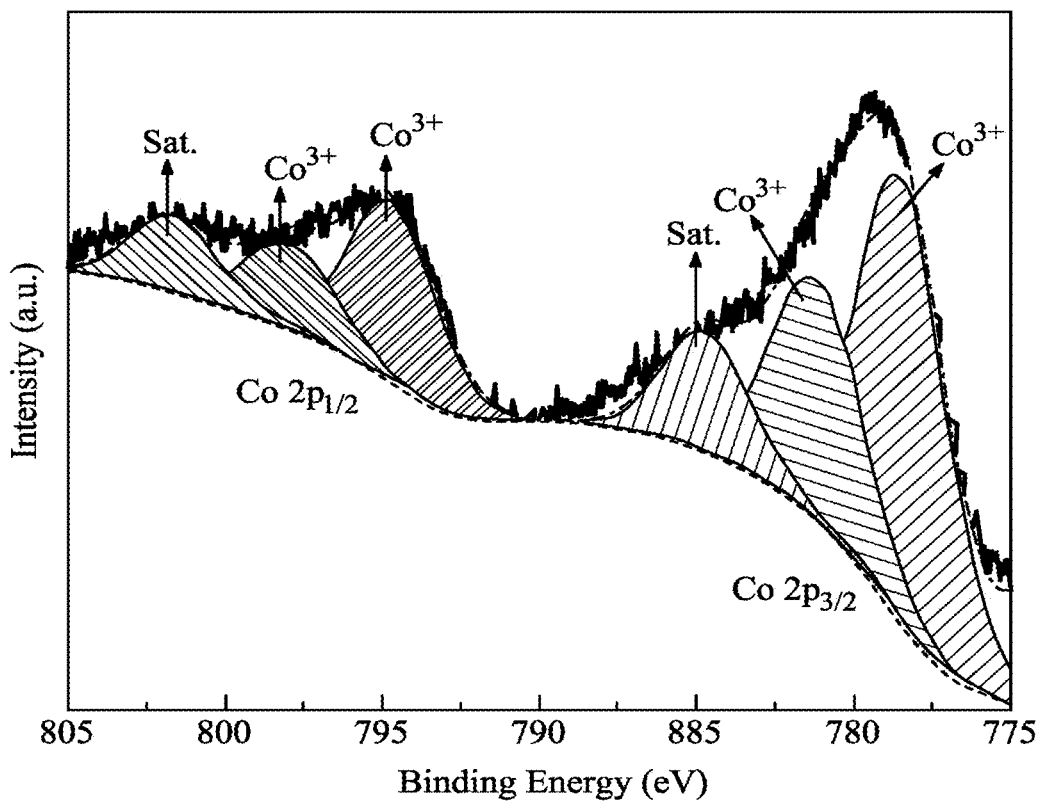
FIG. 8C shows a high-resolution XPS spectra of Co 2p of the NiCoLDH-1@JAC-2 nanocomposite, according to certain embodiments.
Figure 8D:
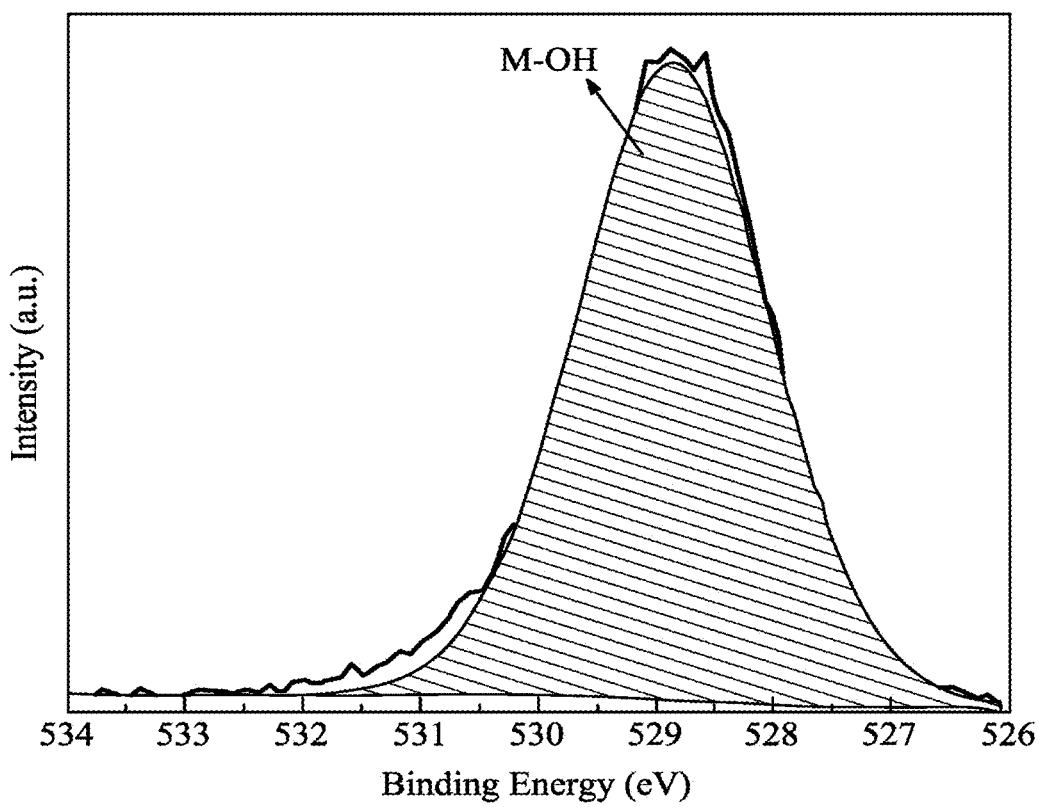
FIG. 8D shows a high-resolution XPS spectra of O is of the NiCoLDH-1@JAC-2 nanocomposite, according to certain embodiments.
Figure 8E:
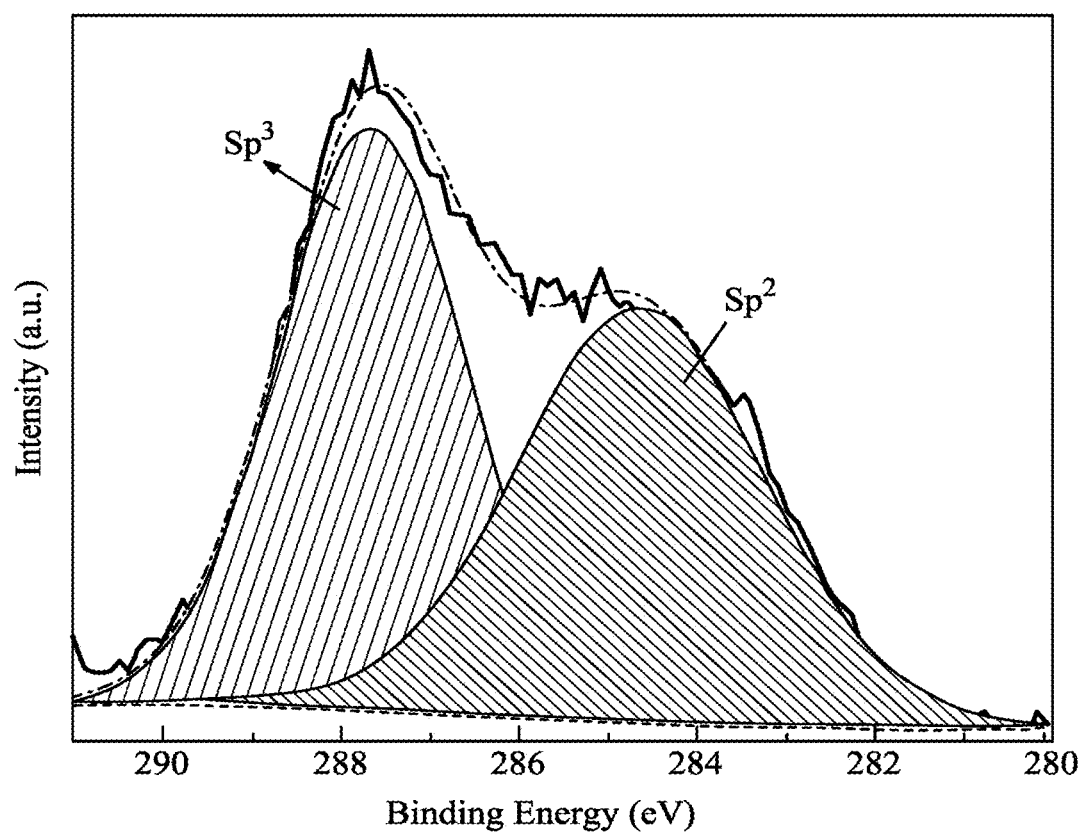
FIG. 8E shows a high-resolution XPS spectra of C is of the NiCoLDH-1@JAC-2 nanocomposite, according to certain embodiments.

XPS was harnessed to explore the elemental compositions and chemical states within the NiCoLDH-1@JAC-2 nanocomposite. FIG. 8A depicts the survey scan spectrum that substantiates the presence of Ni, Co, O, and C components. FIG. 8B depicts a detailed Ni 2p XPS spectrum, which reveals distinctive peaks at binding energies of approximately 875 and 855 eV, corresponding to Ni 2p1/2 and Ni 2p3/2, respectively. The observed energy separation of approximately 17 eV between the spin-orbit components indicates the presence of $Ni^{2+}$ and, indicates the existence of the —$Ni(OH)_2$ phase in the NiCoLDH-1@JAC-2 nanocomposite. Furthermore, satellite peaks around 861 and 880 eV provide additional support for these findings. The XPS spectrum of the Co 2p core level (FIG. 8C) presents two prominent peaks at approximately 796 and 780 eV, attributed to Co 2p1/2 and Co 2p3/2 orbitals, respectively. Satellite peaks around 784 and 801 eV are indicative of $Co^{2+}$ binding energy, while a less intense peak around 790 eV indicates the presence of $Co^{3+}$. These observations point towards the coexistence of both $Co^{2+}$ and $Co^{3+}$ ions in the NiCoLDH-1@JAC-2 nanocomposite, supporting the presence of the $Co(OH)_2$ phase, as reflected by the spin-orbit separation of approximately 16 eV in the Co 2p spectrum. Analysis of the high-resolution O 1s XPS spectrum (FIG. 8D) reveals a prominent peak at approximately 530 eV, characteristic of M-OH (M=Ni or Co) functionalities in the NiCoLDH-1@JAC-2 nanocomposite. FIG. 8E depicts the high-resolution XPS spectrum of the C 1s orbital, which exhibits two distinct peaks at approximately 284.6 eV and 287 eV, corresponding to $sp^2$ and $sp^3$ carbon species, respectively. These peaks align with the characteristics of JAC-2 nanosheets within the nanocomposite. Variations in the intensity and area of the $sp^2$ and $sp^3$ carbon peaks in the C 1s XPS spectra are attributed to the interaction between JAC-2 and NiCoLDH during the hydrothermal synthesis process. Initially, JAC-2 shows a higher content of $sp^2$ carbon. However, in the formation of the composite with NiCoLDH, some $sp^2$ carbon atoms undergo transformation into $sp^3$ carbon due to chemical bonding and surface modifications.

Example 6: Device Performance of the Symmetrical Supercapacitors

Figure 9A:
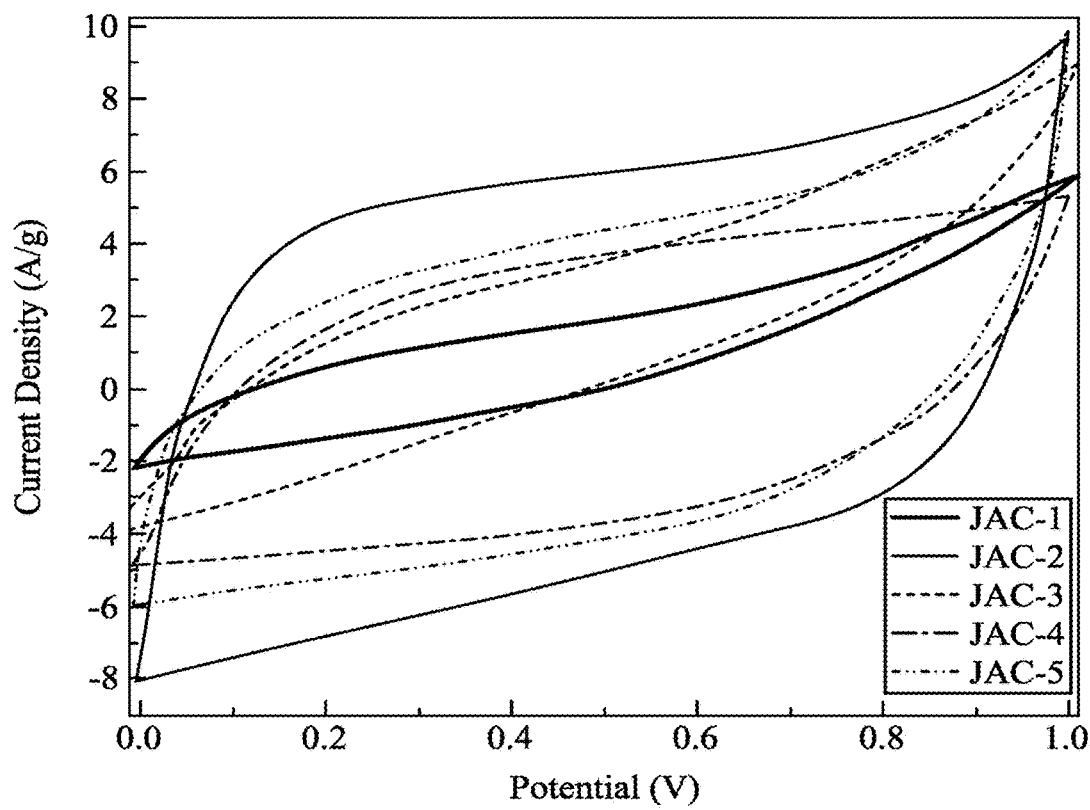
FIG. 9A depicts cyclic voltammetric (CV) curves for the JAC-based symmetric supercapacitors that were acquired at a scan rate of 50 mV/sec within an operational potential window (OPW) of (0 to 1.0 V), according to certain embodiments.

FIG. 9A depicts CV curves for the JAC-based symmetric supercapacitors that were acquired at a scan rate of 50 mV/sec within an operational potential window (0 to 1.0 V). Among the tested electrode materials, the symmetric supercapacitor incorporating JAC-2 exhibited a distinct rectangular morphology with a significantly larger area under the cyclic voltammogram. This observation indicates that the JAC-2-based supercapacitor possesses a notably capacitive nature compared to other materials. This behavior results from effective electrolyte absorption due to the high surface area of JAC-2 nanosheets and the presence of numerous mesopores. Conversely, reduced surface structure and surface area in other electrode materials like JAC-5, JAC-4, JAC-3, and JAC-1 led to inferior electrochemical performance in their respective symmetric supercapacitors.

Figure 9B:
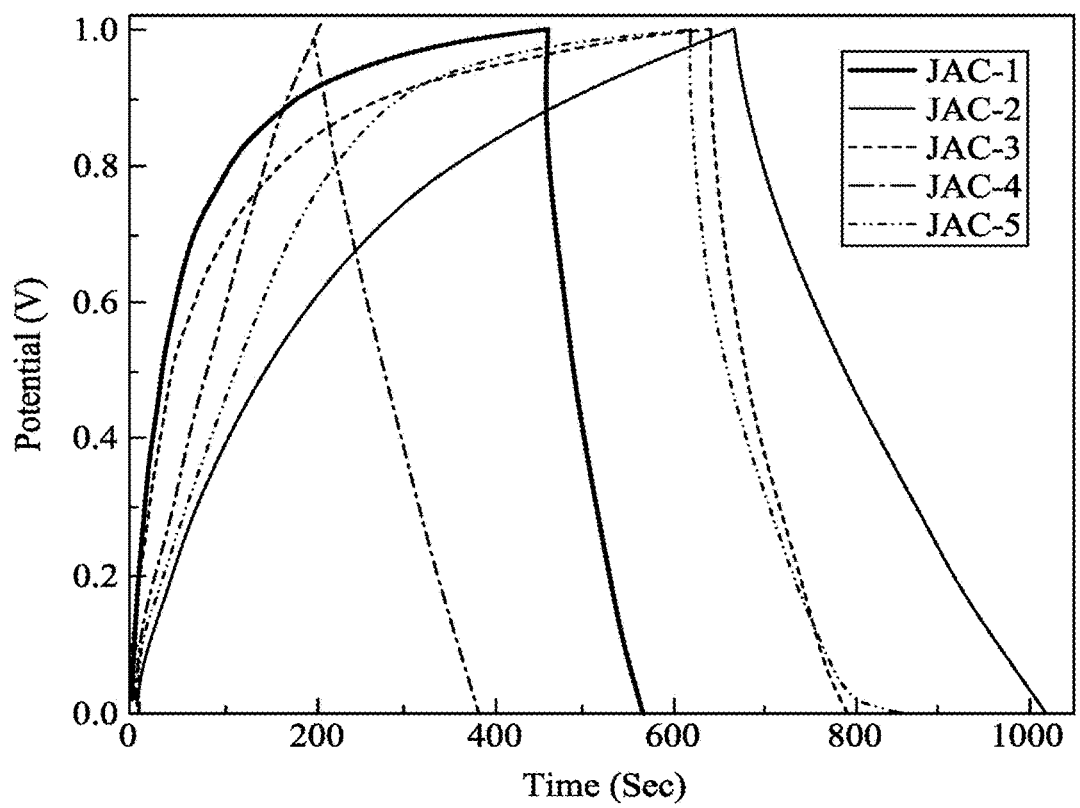
FIG. 9B illustrates Galvanostatic charge-discharge (GCD) profiles for the JAC-based symmetric supercapacitors at a current density of 1.0 A/g, according to certain embodiments.

FIG. 9B illustrates Galvanostatic charge-discharge (GCD) profiles for the symmetric supercapacitors using JAC materials that were obtained at a current density of 1.0 A/g. These profiles exhibit nearly symmetrical charge/discharge curves, indicative of typical electric double-layer capacitance (EDLC) behavior and excellent electrochemical reversibility. Notably, the JAC-2-based symmetric supercapacitor displayed the longest discharging duration, implying exceptional capacitive performance and the highest specific capacitance, consistent with CV analysis. Minimal voltage drop further confirms the superior electrochemical performance of the JAC-2-based supercapacitor. In contrast, symmetric supercapacitors based on JAC-3 and JAC-1 exhibited the largest voltage drop, signifying higher charge transfer resistance and inferior supercapacitor performance.

Figure 9C:
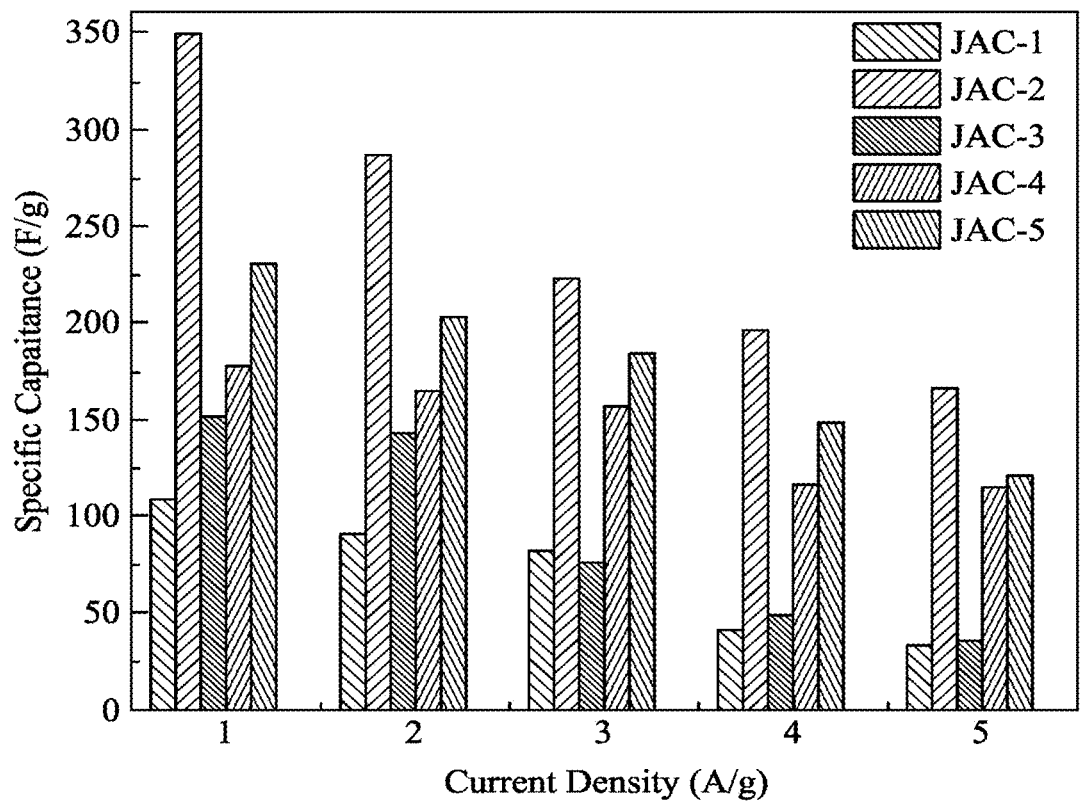
FIG. 9C depicts specific capacitances for the JAC-based symmetric supercapacitors obtained from the GCD profiles of FIG. 9B, at various current densities, according to certain embodiments.

FIG. 9C presents specific capacitances of the JAC-5, JAC-4, JAC-3, JAC-2, and JAC-1-based symmetric supercapacitors at various current densities. The JAC-2-based symmetric supercapacitor, composed of hierarchically porous JAC-2 nanosheets with a high graphitic $sp^2$ carbon content, exhibits remarkable specific capacitance. Its superior rate capability, high surface area, and high conductivity enable efficient charge transfer. The presence of graphitic carbon enhances overall supercapacitor performance, allowing enhanced energy storage and retrieval, efficient electrolyte ion diffusion, low charge transfer resistance, and minimal IR drop.

Figure 9D:
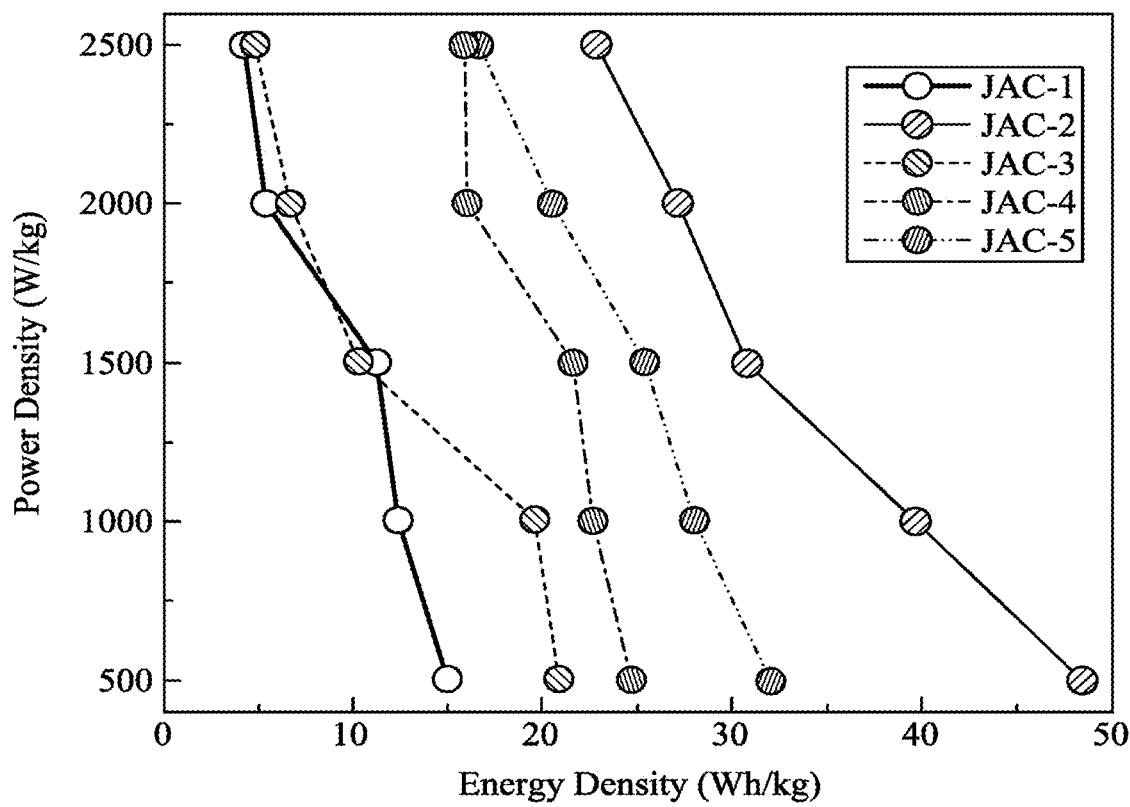
FIG. 9D shows Ragone plots depicting energy and power densities for the JAC-based symmetric supercapacitors, according to certain embodiments.

FIG. 9D presents energy and power densities of symmetric supercapacitors with various JAC electrodes computed based on GCD measurements at different current densities. The JAC-2-based symmetric supercapacitor achieved the highest energy density (~48 Wh/kg) and power density (500 W/kg) at a current density of 1.0 A/g. These results affirm the advantageous properties of JAC-2 nanosheets for supercapacitors and align with CV and GCD measurements, highlighting the potential of this integrated approach for developing high-performance activated carbon-based supercapacitors.

Figure 9E:
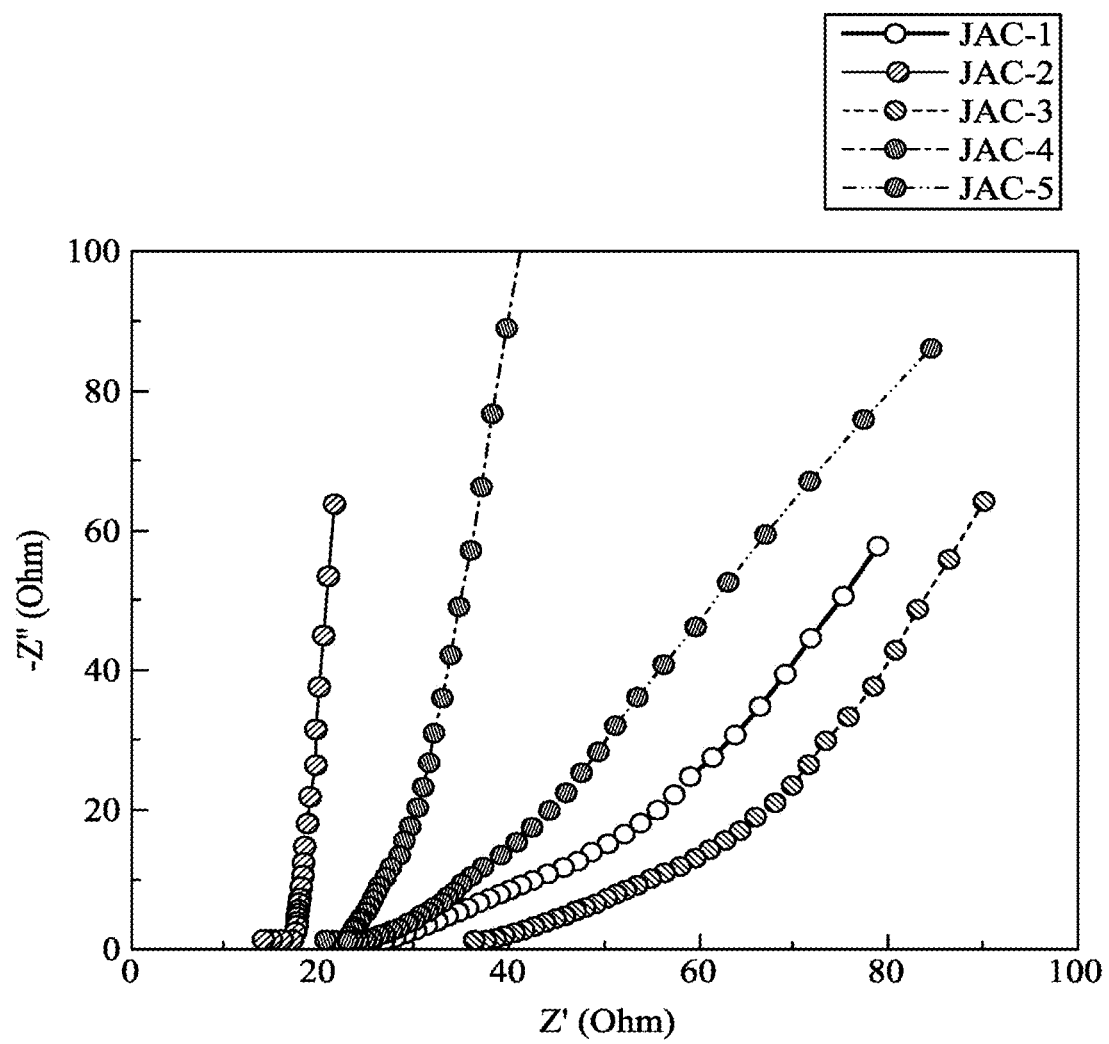
FIG. 9E shows electrochemical impedance spectroscopy (EIS) spectra for the JAC-based symmetric supercapacitors, according to certain embodiments.
Figure 9F:
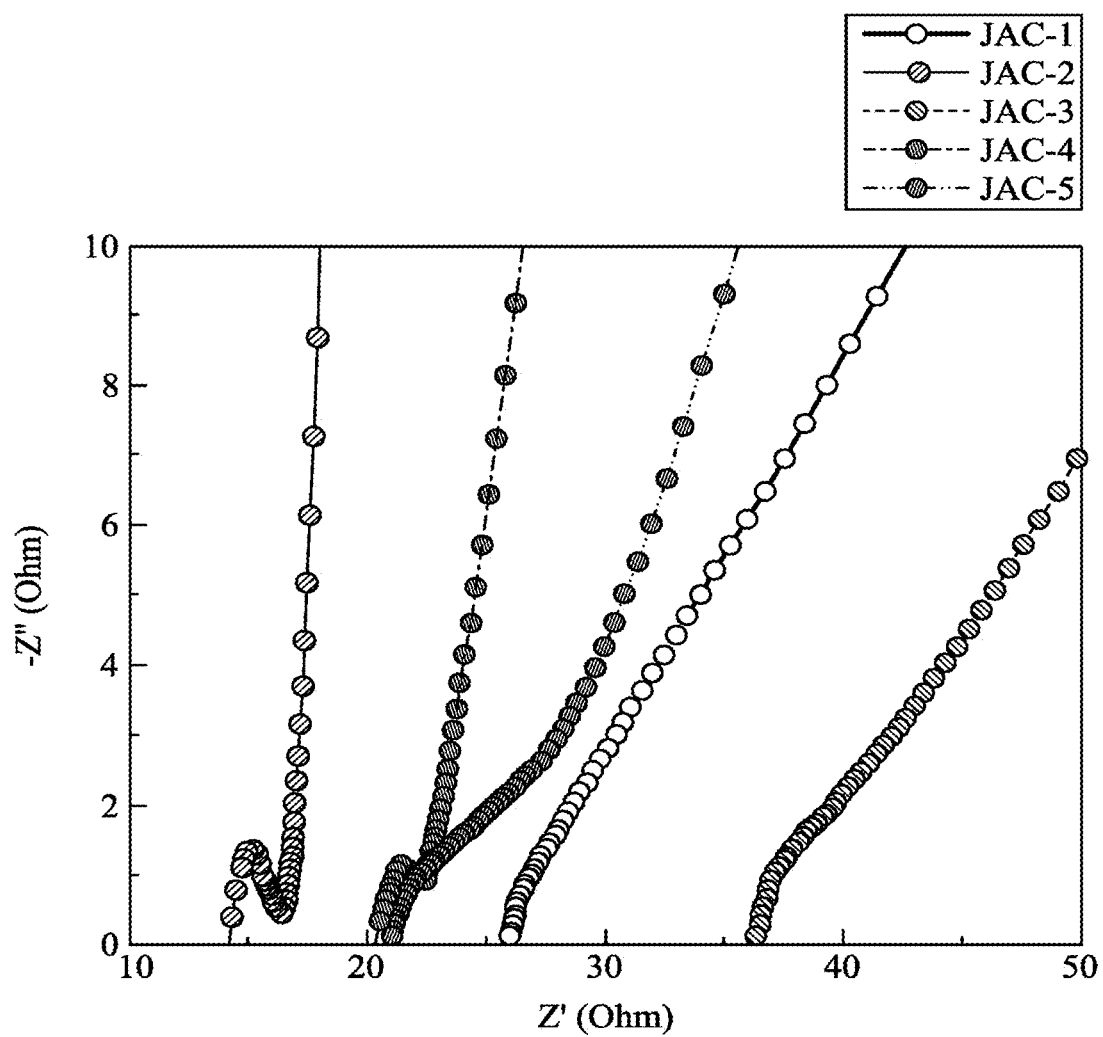
FIG. 9F shows the highest frequency region of FIG. 9E, according to certain embodiments.

FIG. 9E presents electrochemical impedance spectroscopy (EIS) for assessing the electrical properties of the symmetric supercapacitors. Nyquist plots across a frequency range of 1 Hz to 1 MHz exhibited semi-circular shapes at high frequencies, with solution resistance calculated from the X-axis intercept. FIG. 9F shows that, in the highest frequency region, solution resistances were approximately 25Ω for JAC-1, 13Ω for JAC-2, 35Ω for JAC-3, 20Ω for JAC-4, and 20Ω for JAC-5-based symmetric supercapacitors. The smooth transition to mid-frequency semicircles, indicating ion diffusion, was observed. The vertical lines, reflecting a balance between mass capacitance, leakage resistance, and Warburg resistance, were near the imaginary axis, resembling the behavior of an ideal supercapacitor.

The JAC-2-based symmetric supercapacitor demonstrates a nearly linear Warburg impedance, characterized by a steeper vertical slope compared to other supercapacitors. This behavior signifies improved electrolyte ion diffusion on the electrode surface of JAC-2, resulting in enhanced charge-discharge performance. The high-frequency region of the Nyquist plots allows for the calculation of charge transfer resistance (RCT) in supercapacitors. Remarkably, the JAC-2-based symmetric supercapacitor exhibits the smallest semicircle in FIG. 9F, indicative of the lowest charge transfer resistance among the fabricated supercapacitors. Measuring the semicircle diameter yielded RCT values, with the JAC-2-based symmetric supercapacitor displaying the lowest RCT value of approximately 2Ω compared to others: JAC-1 (14Ω), JAC-3 (11Ω), JAC-4 (4Ω), and JAC-5 (3Ω). Due to their superior electrode performance in supercapacitors (higher specific capacitance, lower solution resistance, and lower RCT values), JAC-2 nanosheets were selected as the preferred electrode materials for further analysis and for use as negative electrode materials in asymmetric supercapacitors.

Figure 10A:
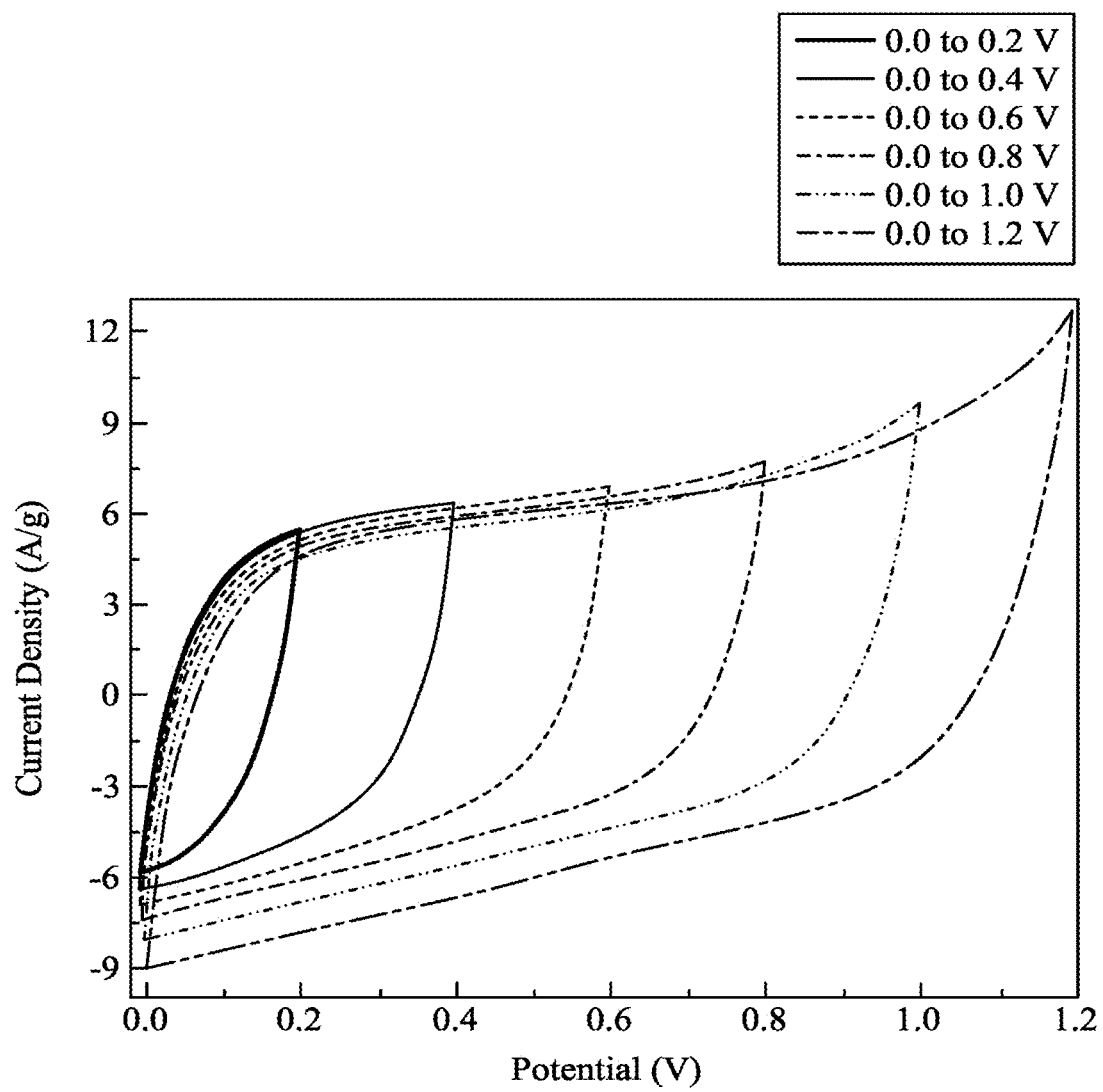
FIG. 10A shows CV curves of the JAC-2-based symmetric supercapacitor obtained in various operating potential windows (OPWs) at a 50 mV/sec scan rate, according to certain embodiments.

A comprehensive set of CV measurements was conducted on the JAC-2-based symmetric supercapacitor device to determine the maximum stable operational potential window (OPW). FIG. 10A illustrates the CV curves obtained by varying the OPW from 0 to 1.2 V at a consistent scan rate of 50 mV/sec. A stable OPW of up to 1.0 V was selected for assessing the CV performance of the all-solid-state symmetric supercapacitor based on JAC-2. While the CV measurements were recorded up to 1.2 V, analysis was limited to 1.0 V due to an unusual increase in current density observed between 1.0 and 1.2 V. It is important to maintain a robust OPW as it allows for desired output without needing multiple devices in series. The anomalous rise in current density could potentially be attributed to specific redox or catalytic reactions. The supercapacitor device's safe operating range is confirmed within the 0 to 1.0 V OPW, as the anodic current responsible for polarization did not significantly increase even at 1.0 V.

Figure 10B:
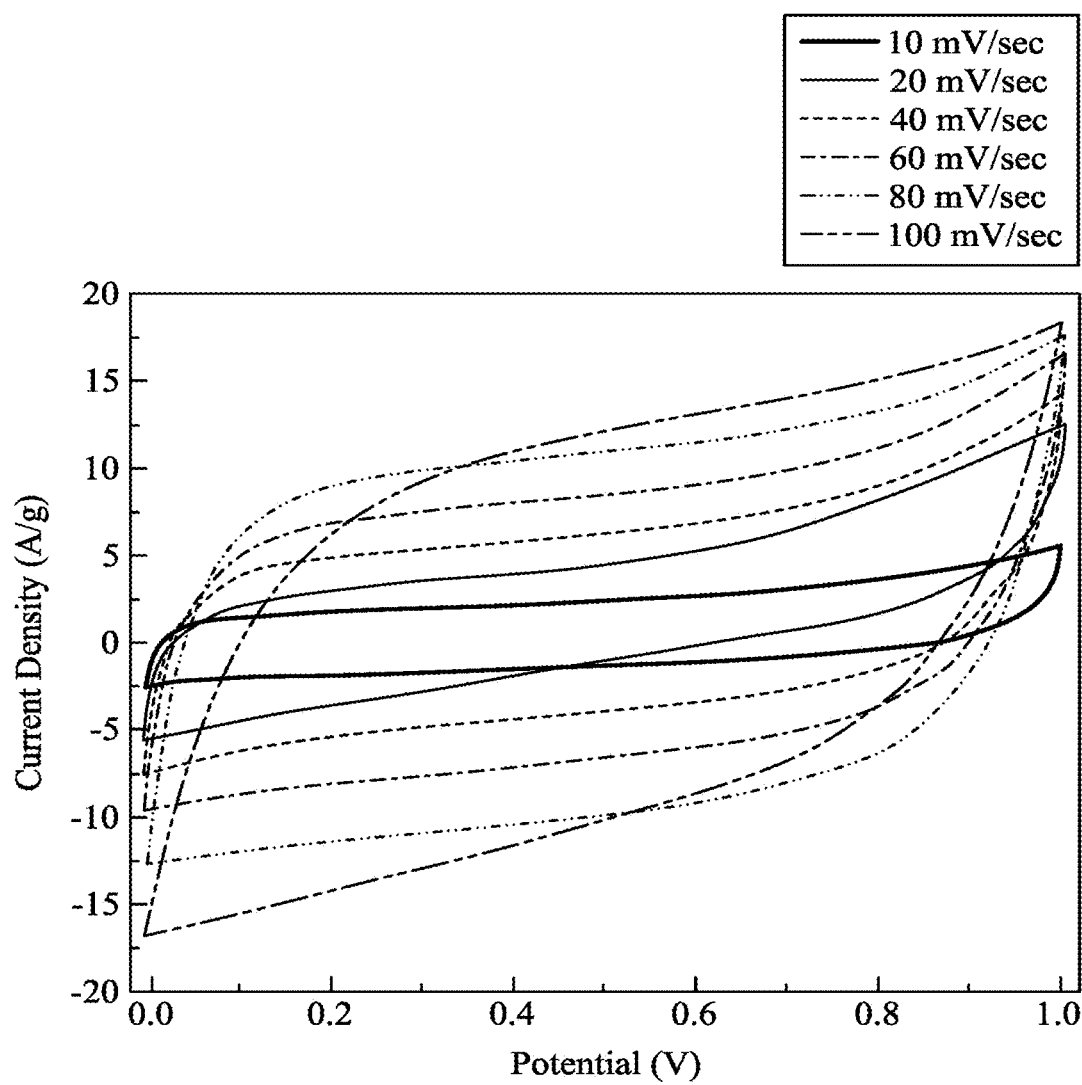
FIG. 10B shows CV curves of the JAC-2-based symmetric supercapacitor, obtained at different scan rates, according to certain embodiments.
Figure 10C:
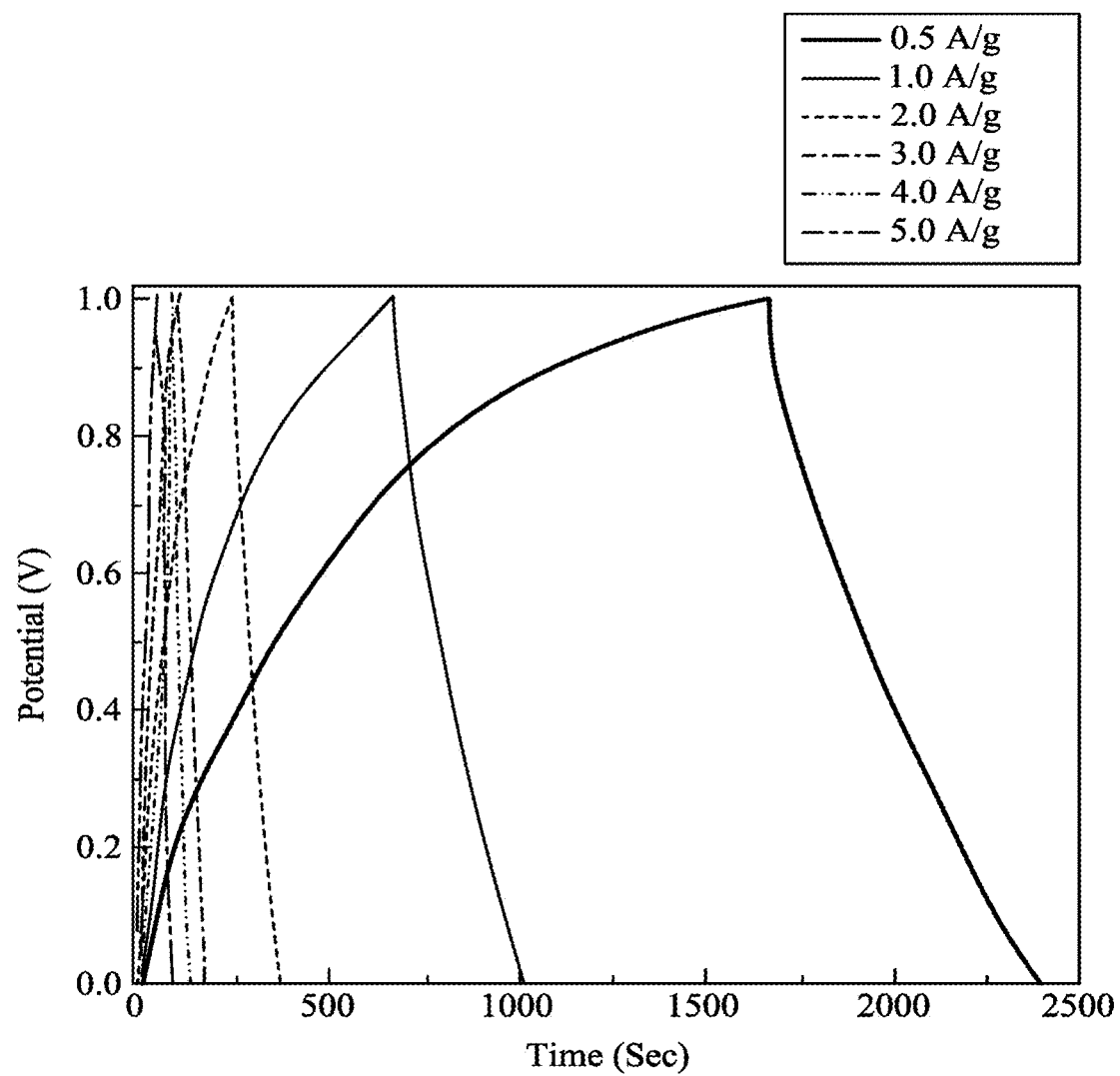
FIG. 10C shows GCD profiles of the JAC-2-based symmetric supercapacitor obtained at different current densities, according to certain embodiments.
Figure 10D:
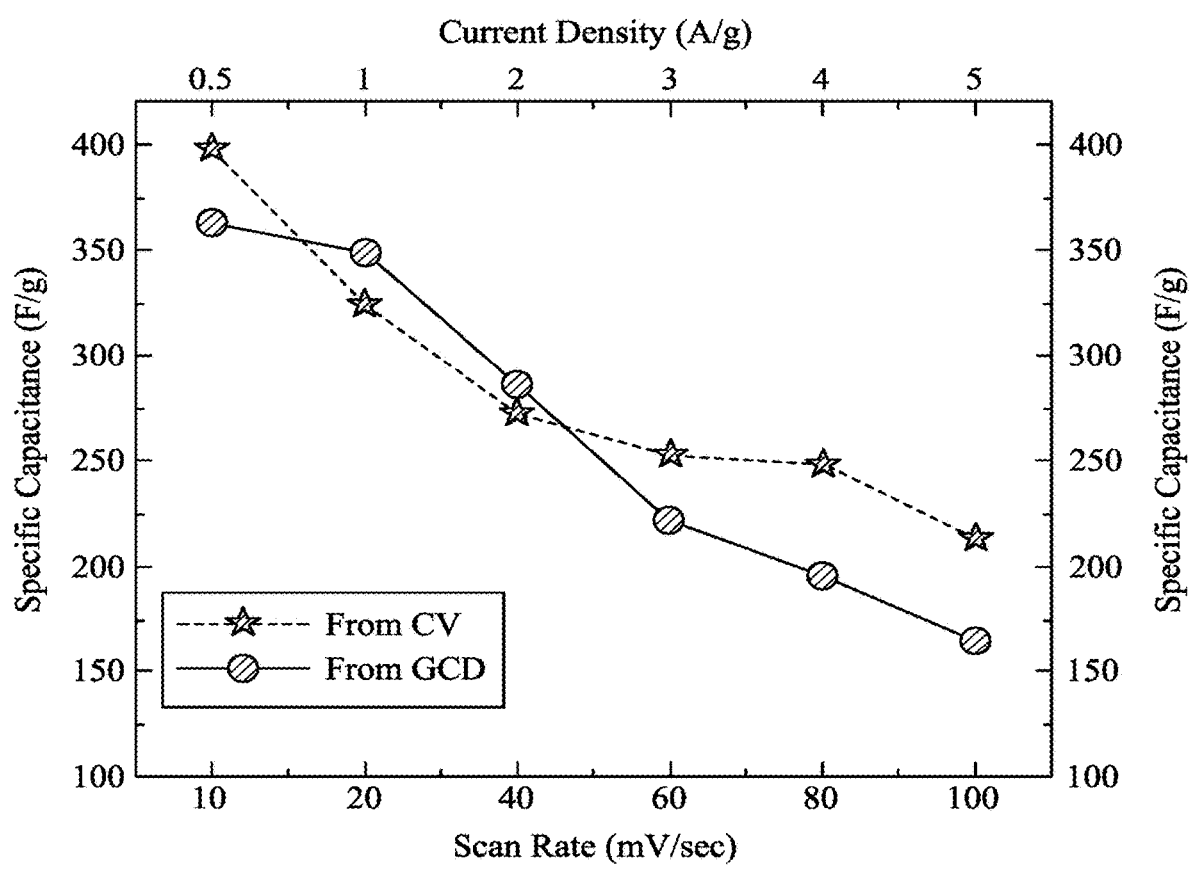
FIG. 10D shows corresponding variations in specific capacitances, measured at various scan rates, from FIGS. 10A-10C, according to certain embodiments.

FIG. 10B illustrates CV curves for the JAC-2-based symmetric supercapacitor and exhibits symmetrical rectangular shapes at different scan rates, indicating both reversibility and high-rate capability. The increased area under the CV curves as the scan rate increases from 10 to 100 mV/sec signifies electric double-layer capacitance (EDLC) behavior and a high capacitance capacity. The JAC-2 electrodes possess a porous structure with a large surface area and multiple mesopores, facilitating efficient electrolyte ion movement to the electrode-electrolyte interface. At a scan rate of 10 mV/sec, a maximum specific capacitance of approximately 398 F/g was observed. FIG. 10C illustrates that as the scan rate increases from 10 to 100 mV/sec, current densities and areas under the forward and reverse scans of the CV curves rise while the corresponding specific capacitance decreases from 398 to 213 F/g. FIG. 10D displays the results of the corresponding variations in specific capacitances, measured at various scan rates (from cyclic voltammograms) and current densities (from GCD profiles) graphically. This trend occurs because electrolyte ions fully diffuse into the electrode material at lower scan rates, utilizing the entire active surface for charge storage. However, ion diffusion is hindered at higher scan rates, limiting charge storage to the exterior active surface area.

The electrochemical performance of the all-solid-state symmetric supercapacitor device was systematically evaluated through galvanostatic charge-discharge (GCD) analyses conducted at various current densities ranging from 0.5 to 5.0 A/g. These assessments ensured that the operational potential window (OPW) remained within the specified range of 0.0 to 1.0 V. The GCD profiles, are illustrated in FIG. 10C, consistently exhibits triangular and symmetrical shapes across different current densities, indicative of the nearly ideal capacitive behavior exhibited by the symmetric supercapacitor. The recorded GCD profiles at different current densities were utilized to calculate the individual capacitances of the symmetric supercapacitor device. Specifically, a specific capacitance of 362 F/g was achieved at a current density of 0.5 A/g. As current densities increase, there is a decline in specific capacitance, which is attributed to the limited time available for electrolyte ions to traverse the electrode pores, leading to elevated electrical resistance within the material, as presented in FIG. 10C.

Figure 10E:
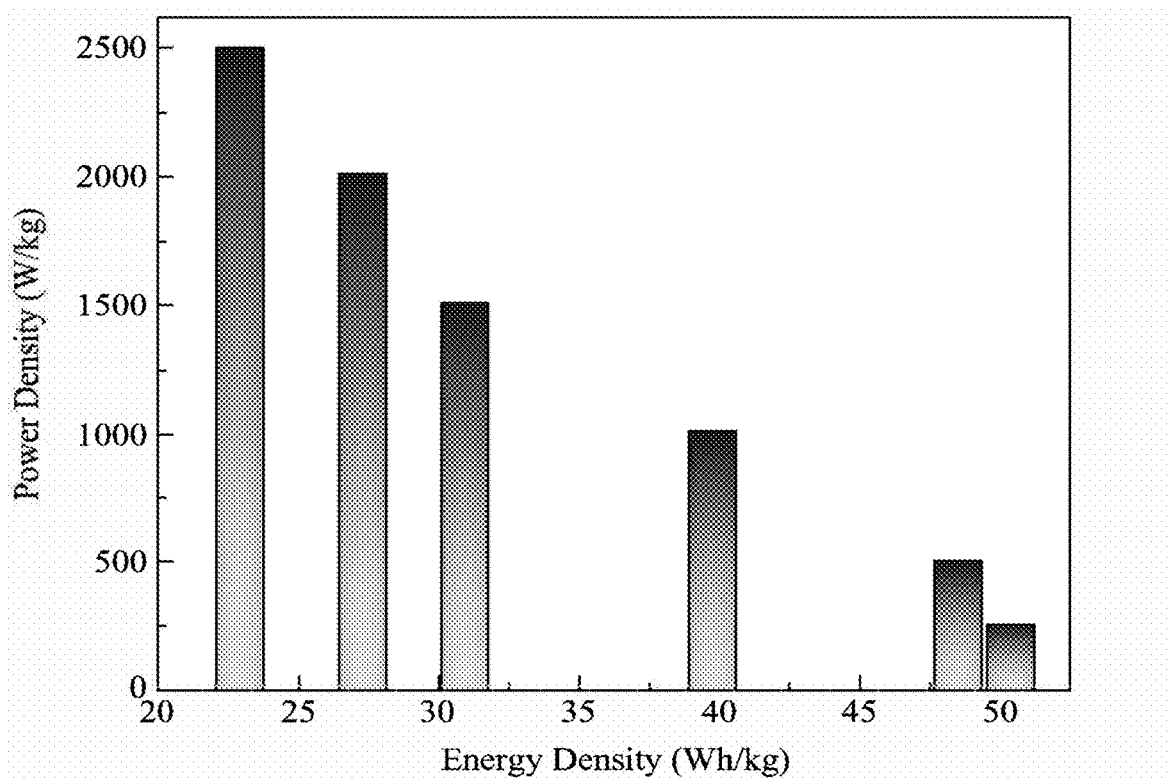
FIG. 10E shows energy and power density values for the JAC-2-based symmetric supercapacitor, according to certain embodiments.

The energy density and power density of the JAC-2-based symmetric supercapacitor device were calculated by analyzing the GCD curves. FIG. 10E showcases the energy density of the constructed symmetric supercapacitor device, achieving approximately 51 Wh/kg at a power density of around 250 W/kg. Remarkably, even at a high power density of approximately 2500 W/kg, the device maintains an impressive energy density of about 23 Wh/kg. This impressive performance is attributed to the porous structure of the JAC-2 electrode material, which incorporates meso- and macro-sized pores. This combination of a substantial surface area and a porous design facilitates efficient electrolyte diffusion within the pores, reducing the electron transport pathway and enhancing overall efficiency during the charging and discharging processes.

Figure 10F:
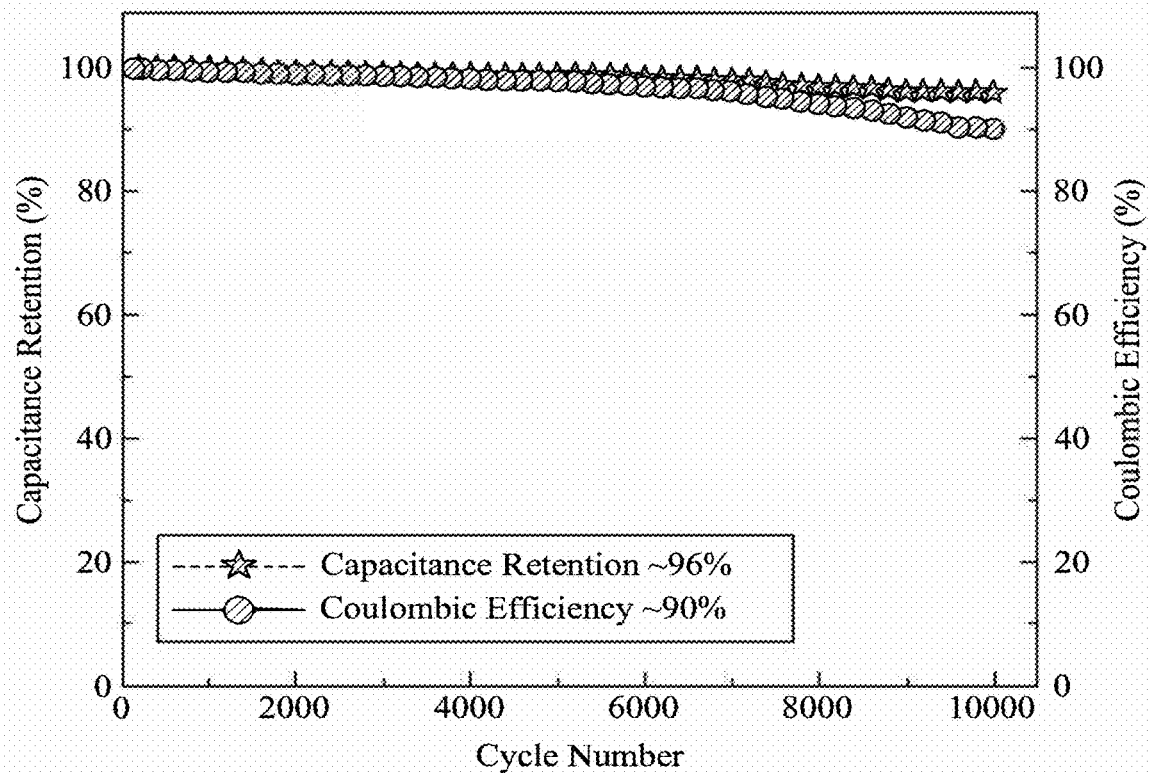
FIG. 10F shows Coulombic efficiency and capacitance retention for 10000 GCD cycles recorded at a 10.0 A/g current density, for the JAC-2-based symmetric supercapacitor, according to certain embodiments.

In the present embodiment, GCD measurements were conducted under a high current density of 10 A/g for a maximum of 10,000 cycles to assess the cyclic stability of a symmetric supercapacitor device constructed using JAC-2 nanosheets and a PVA/KOH electrolyte. FIG. 10F depicts coulombic efficiency and capacitance retention for 10000 GCD cycles recorded at a 10.0 A/g current density. The results, depicted in FIG. 10F, reveal that the symmetric supercapacitor retains over 96% of its initial capacitance after enduring 10,000 GCD cycles, accompanied by a Coulombic efficiency of approximately 90%. This demonstrates the cyclic stability of the JAC-2 nanosheet-based symmetric supercapacitor, even under high current density conditions. The PVA/KOH electrolyte utilized in the fabricated supercapacitor device contributes to its long-term cycling stability. The slight reduction in capacitance retention and Coulombic efficiency observed after 10,000 cycles may be attributed to the accumulation of electrode material and a potential decrease in adhesion between the electrode materials and the current collector.

Figure 10G:
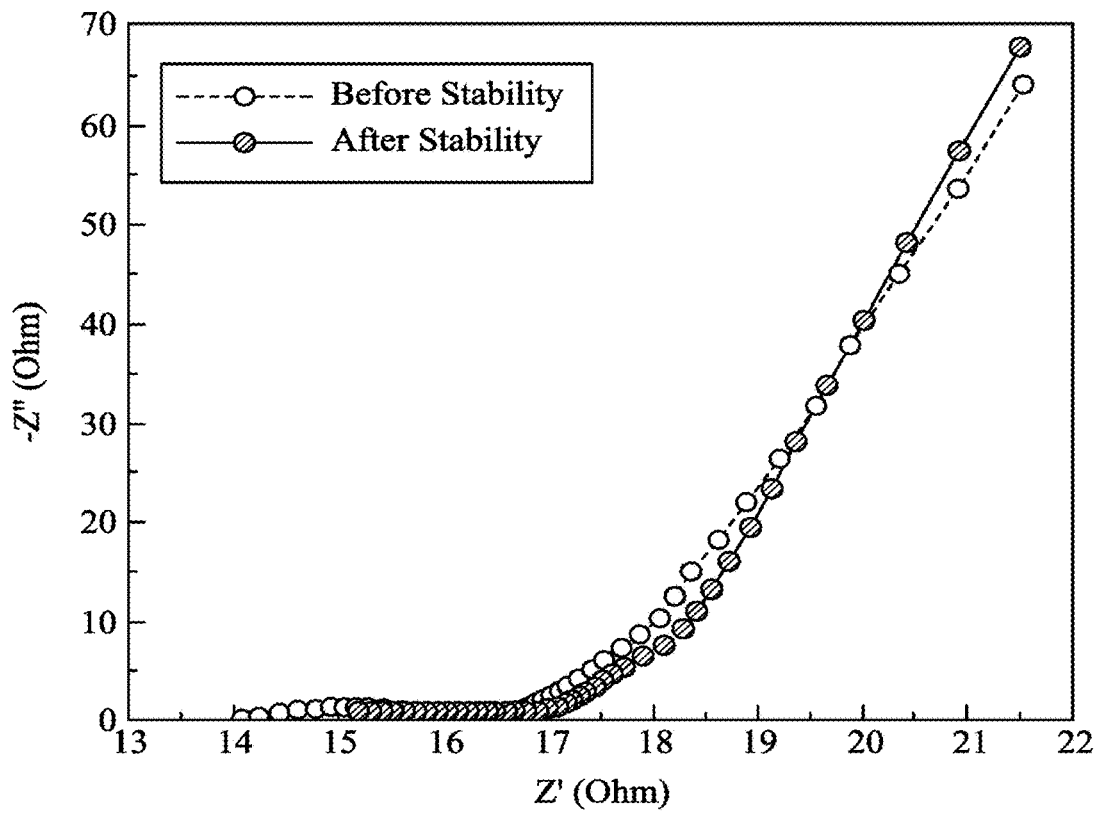
FIG. 10G shows Nyquist plots before and after stability for the JAC-2-based symmetric supercapacitor, according to certain embodiments.

The electron/ion transport mechanism in the advanced symmetric supercapacitor was assessed using EIS. Nyquist plots were generated from EIS data to analyze the capacitive, resistive, and charge-transport characteristics of the supercapacitor, both before and after subjecting the device to 10,000 GCD cycles. The objective of this analysis was to evaluate the long-term cycling stability of the supercapacitor. FIG. 10G depicts Nyquist plots before and after stability for the JAC-2-based all-solid-state symmetric supercapacitor. Nyquist plots obtained before and after GCD cycles, as illustrated in FIG. 10G, exhibit a nearly vertical straight line (Cdl) in the low-frequency region, characteristic of positive behavior typical of an Electric Double-Layer Capacitor (EDLC). The slope in the low-frequency zone represents the Warburg impedance (W), indicated ion diffusion through the pore channels of the electrode materials. High-frequency analysis revealed two notable patterns: a small value of solution resistance (Rs), which encompasses intrinsic electrode material resistance, ionic electrolyte resistance, and contact resistance between the electrode and current collector; and a small semicircle, the diameter of which is proportional to the charge transfer resistance (RCT). Both before and after 10,000 GCD cycles, Nyquist plots displayed a small semicircle in the high-frequency region representing RCT and a straight-line portion in the low-frequency area corresponding to the ion diffusion-controlled Warburg impedance at the electrode-electrolyte interface (EEI).

Figure 10H:
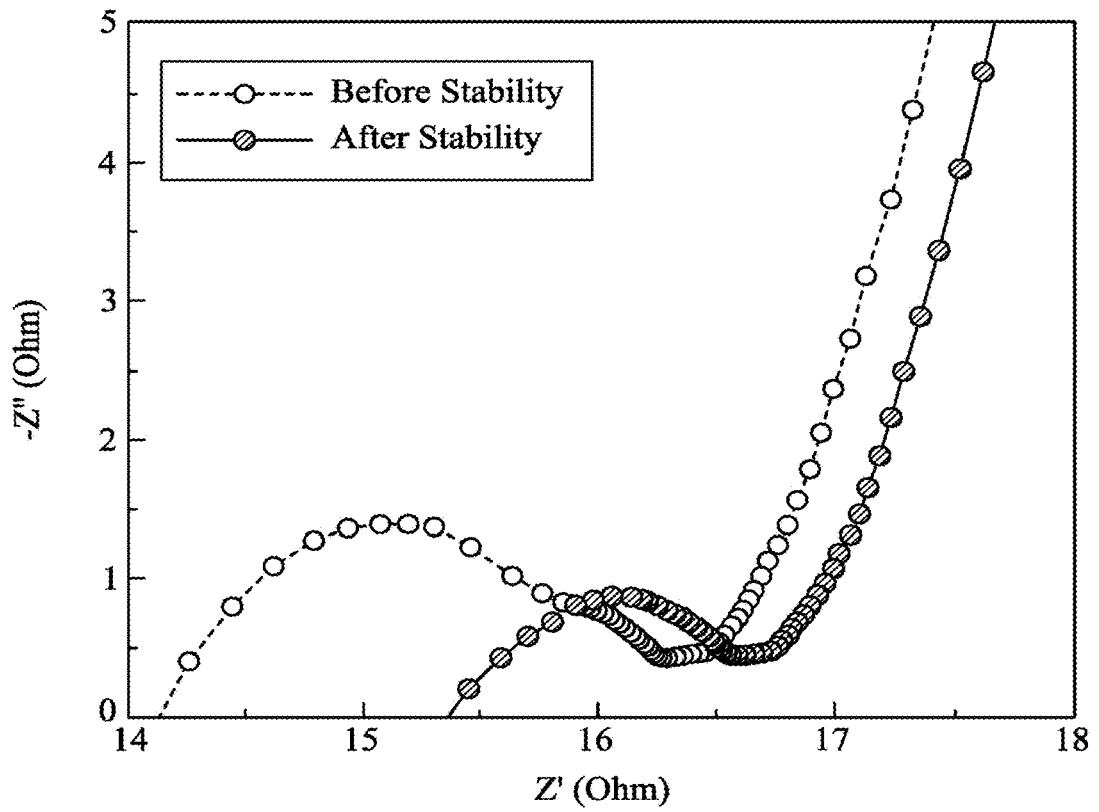
FIG. 10H depicts an enlarged overview in the high-frequency region of FIG. 10G, according to certain embodiments.

FIG. 10H depicts the enlarged overview in the high-frequency region of FIG. 10G. Throughout the 10,000 GCD cycles, there was a marginal increase in both Rs and RCT values, shifting from 14Ω to 15Ω and from 2Ω to 3Ω, respectively, as illustrated in FIG. 10H. This minor shift in the straight-line portion in the low-frequency area after 10,000 cycles can be attributed to the enhanced repulsive resistive effect caused by ions filling the pores. Nevertheless, the JAC-2 electrodes exhibit low Rs and RCT values, enhancing high capacitance and prolonged cyclic performance, ultimately bolstering the overall performance of high-performance supercapacitors.

Example 7: Device Performance of the Asymmetrical Nanocomposite Supercapacitors

Electrochemical analysis was conducted to evaluate the charge storage capacity of NiCoLDHs and the NiCoLDH-1@JAC-2 nanocomposite electrodes in a 3 M KOH aqueous electrolyte, employing a three-electrode electrochemical cell for comparison purposes.

Figure 11A:
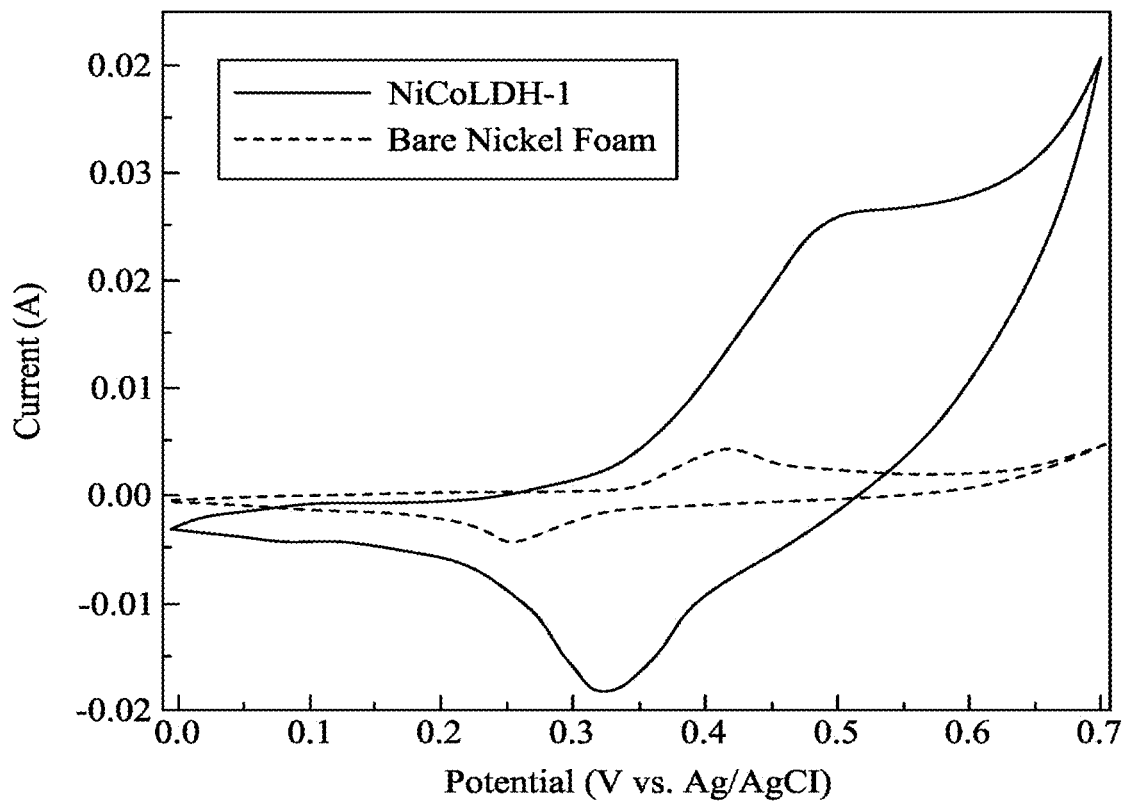
FIG. 11A shows CV curves showing the comparative electrochemical activities of bare NF and NiCoLDH-1, according to certain embodiments.
Figure 11B:
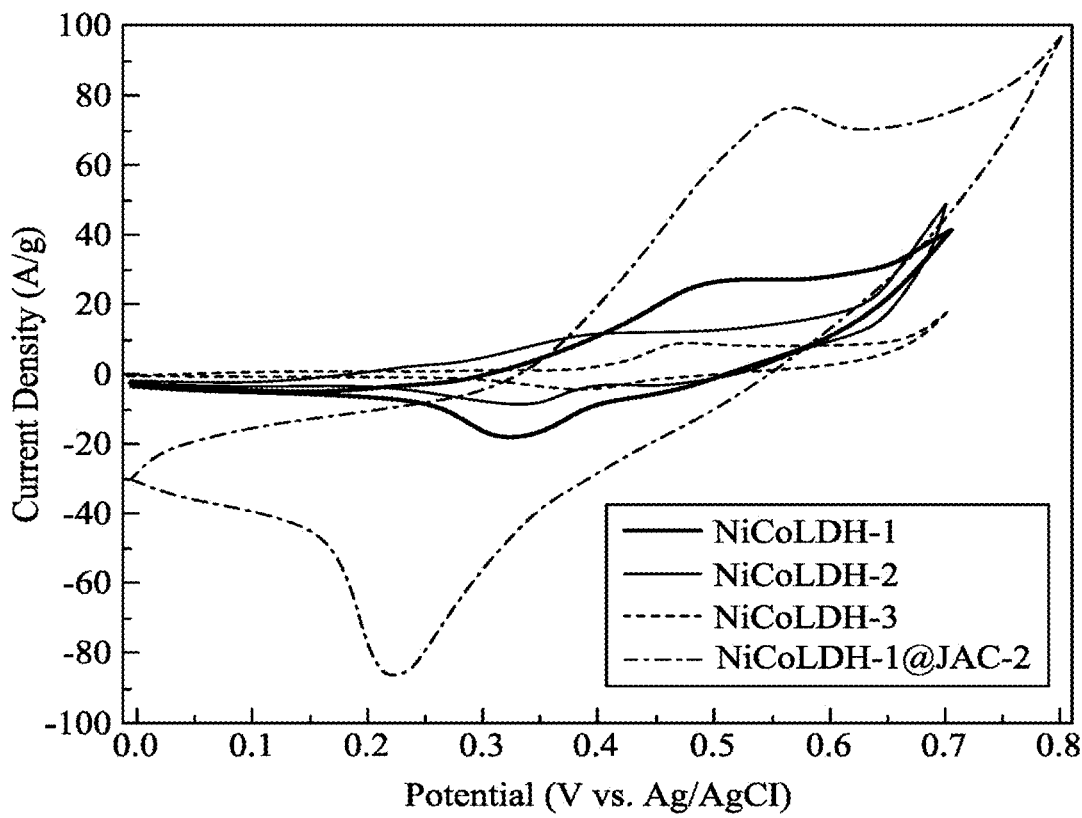
FIG. 11B depicts the CV curves of fabricated NiCoLDH electrodes, according to certain embodiments.

FIG. 11A illustrates that NiCoLDH-1 exhibits a higher current density and a larger area under the cyclic voltammetry (CV) curve compared to the bare NF (Nickel foam). This indicates that the presence of NF minimally influences the electrochemical assessments conducted on the fabricated electrodes. In FIG. 11B, the CV curves of all NiCoLDH electrodes display pairs of redox peaks at distinct potentials (vs. Ag/AgCl), corresponding to the $Ni^{3+}/Ni^{2+}$ and $Co^{3+}/Co^{2+}$ reversible redox reactions, as evidenced by Equations 1 to 3. These redox reactions are associated with the pseudocapacitive behavior exhibited by NiCoLDHs.

Equations $$Ni(OH)_2 + OH^- \leftrightarrow NiOOH + H_2O + e^- \qquad 1.$$

$$Co(OH)_2 + OH^- \leftrightarrow CoOOH + H_2O + e^- \qquad 2.$$

$$CoOOH + OH^- \leftrightarrow CoO_2 + H_2O + e^- \qquad 3.$$

The CV curves manifest varying redox peaks, dependent on the molecular ratios in NiCoLDH-1, NiCoLDH-2, and NiCoLDH-3, indicating that nanoflowers with distinct Ni/Co molar ratios possess unique active sites. Notably, NiCoLDH-1 exhibits a substantial redox current and the largest CV curve area, indicating higher specific capacitance than the other NiCoLDH electrodes. Furthermore, the NiCoLDH-1@JAC-2 composite electrode demonstrates superior electrochemical performance, displaying a higher current density response than the NiCoLDH-1 electrode at the same scan rate, indicative of higher capacitance.

Figure 11C:
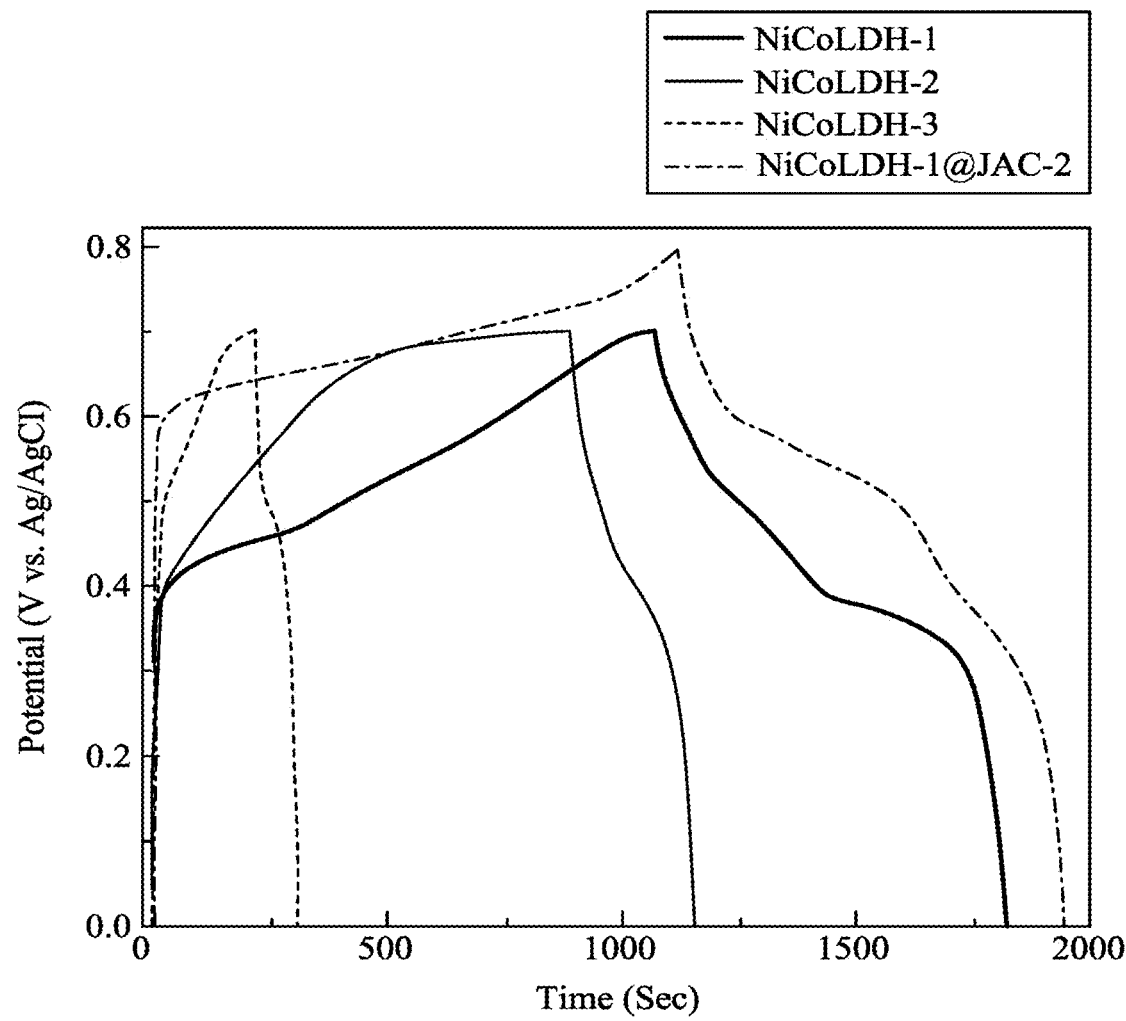
FIG. 11C shows GCD profiles of the fabricated NiCoLDH electrodes at a current density of 1 A/g, according to certain embodiments.
Figure 11D:
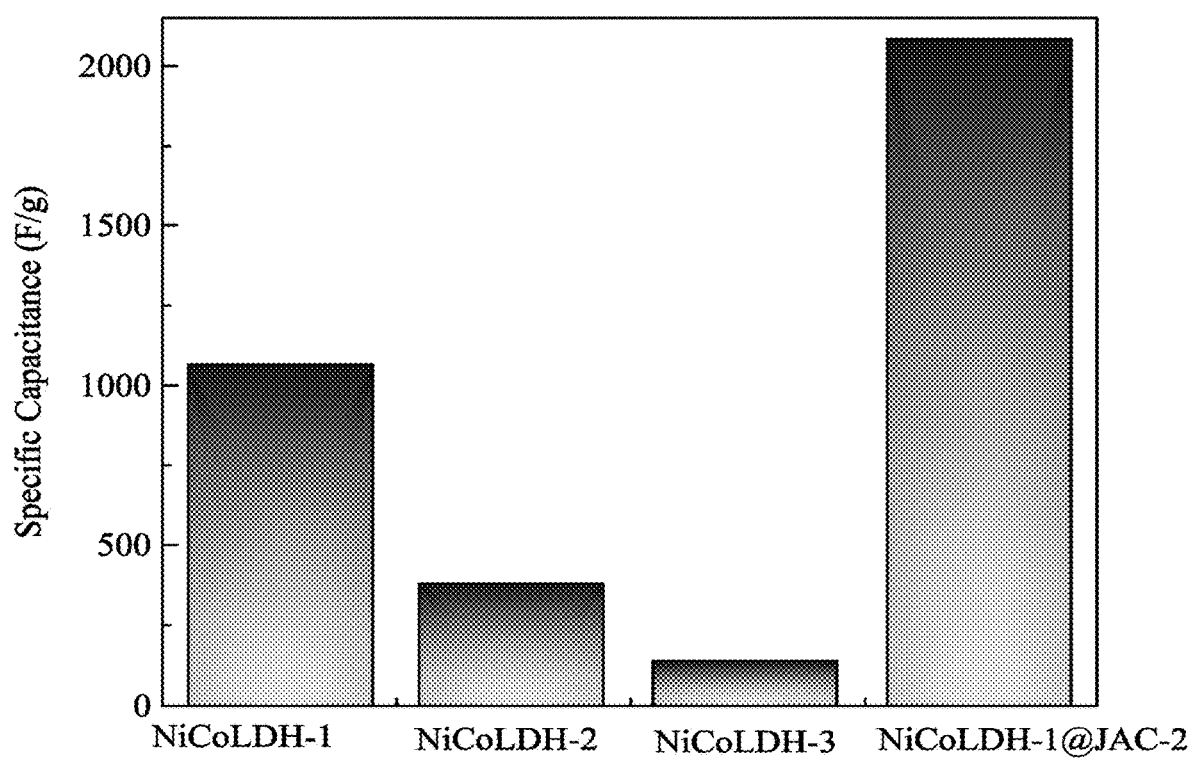
FIG. 11D displays specific capacitances of the fabricated NiCoLDH electrodes, at a current density of 1.0 A/g, according to certain embodiments.

FIG. 11C presents the galvanostatic charge-discharge (GCD) profiles of the fabricated electrodes at a current density of 1 A/g. The NiCoLDH-1@JAC-2 composite electrode exhibits the longest discharge time. FIG. 11D displays the GCD profiles at a current density of 1.0 A/g, which were used to calculate specific capacitances. The NiCoLDH-1@JAC-2 composite electrode achieves the highest specific capacitance, approximately 2083 F/g. This electrochemical performance can be attributed to the uniform microstructures of the NiCoLDH-1 nanoflowers and the high electrical conductivity of the JAC-2 nanosheets. Additionally, the NiCoLDH-1 nanoflowers, characterized by a distinct LDH phase, feature nanosheets with reduced thickness, enhancing pseudocapacitance efficiency.

Figure 11E:
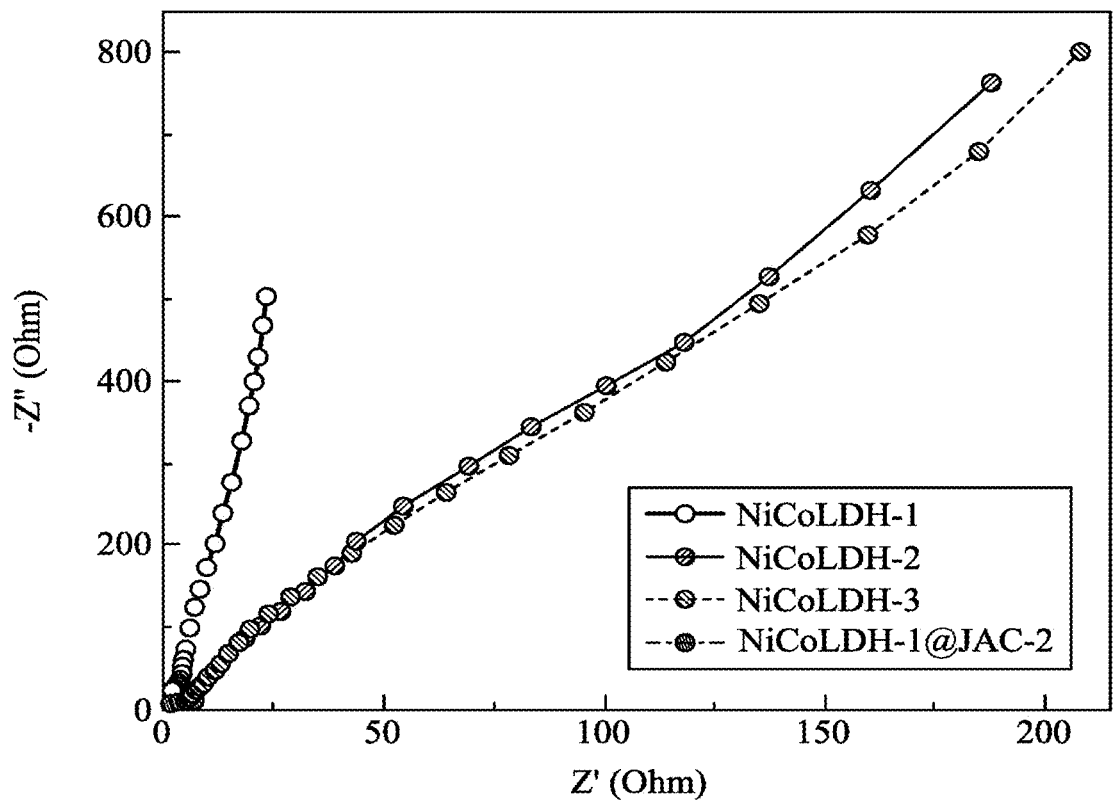
FIG. 11E depicts EIS curves of the fabricated NiCoLDH electrodes, according to certain embodiments.

Nyquist plots in FIG. 11E portrays a single semicircle within the high-frequency region of the EIS spectra for all electrodes tested, spanning a frequency range from 1 Hz to 1 MHz. The resistance values (RESR) of the NiCoLDH-1, NiCoLDH-2, NiCoLDH-3, and NiCoLDH-1@JAC-2 electrodes follow a similar trend, measuring approximately 1.0, 1.1, 1.2, and 0.7Ω, respectively. Notably, the Warburg impedance of the NiCoLDH-1@JAC-2 nanocomposite electrode exhibits a linear behavior with a steeper vertical slope compared to other electrodes, indicating accelerated electrolyte ion diffusion on the NiCoLDH-1@JAC-2 nanocomposite electrode surface, resulting in enhanced charge-discharge performance.

Figure 11F:
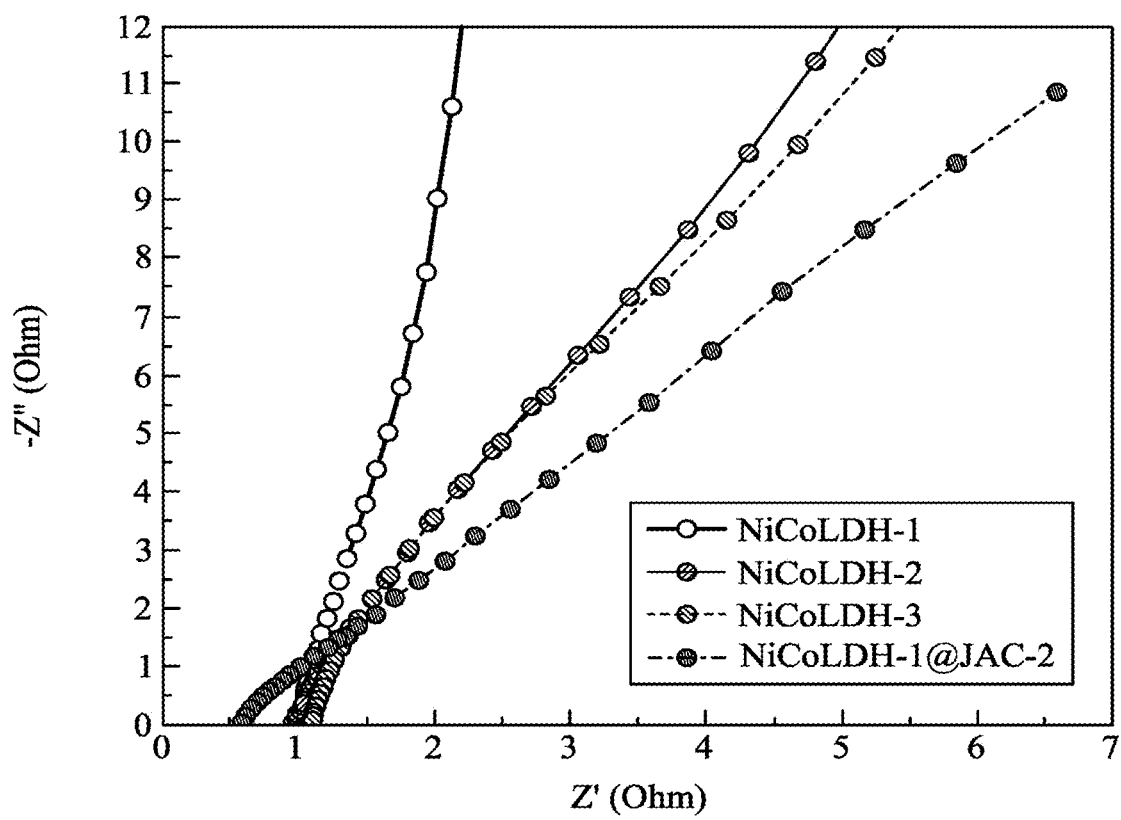
FIG. 11F is an enlarged overview of the fabricated NiCoLDH electrodes, according to certain embodiments.

The determination of the charge transfer resistance (RCT) in supercapacitors is achievable by analyzing the Nyquist plot regions at high frequencies. As depicted in FIG. 11F, it is evident that the NiCoLDH-1@JAC-2 nanocomposite electrode exhibits the smallest semicircle. In general, the size of an electrode's semicircle is indicative of its electrochemical impedance, with a smaller semicircle signifying a lower RCT. Consequently, the NiCoLDH-1@JAC-2 nanocomposite electrode, benefiting from the high conductivity and large specific surface area (SSA) of JAC-2 in the nanocomposite, possesses the lowest RCT. The choice of the NiCoLDH-1@JAC-2 nanocomposite electrode as the preferred material for supercapacitor electrodes primarily arises from its superior specific capacitance, reduced resistance (RESR), and lower RCT value.

Figure 11G:
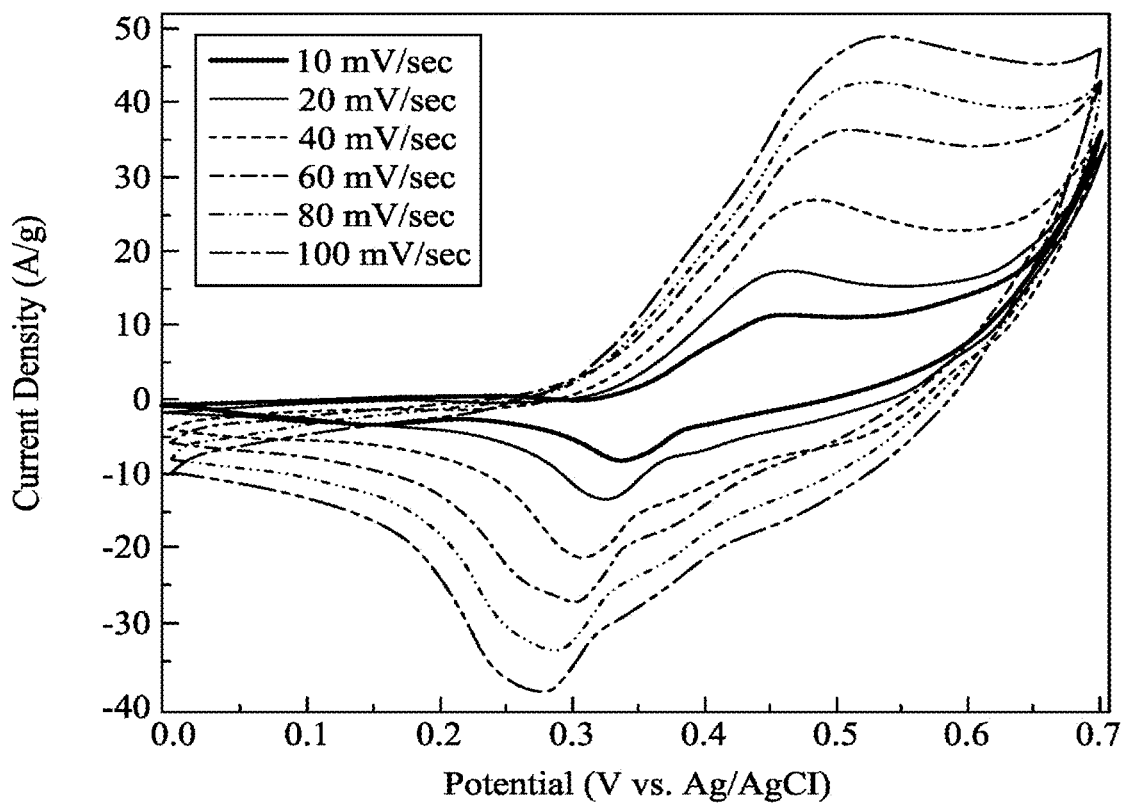
FIG. 11G shows CV curves of the NiCoLDH-1 electrode at various scan rates, according to certain embodiments.

FIG. 11G illustrates cyclic voltammetry (CV) curves at various scan rates. CV curves of the NiCoLDH-1 nanoflowers electrode were obtained using a three-electrode electrochemical cell within an operating potential window (OPW) ranging from 0 to 0.7 V relative to the Ag/AgCl reference electrode, as displayed in FIG. 11G. The working electrode consists of NiCoLDH-1 nanoflowers, while Ag/AgCl and platinum wire serve as references and counter electrodes, respectively. The CV curves exhibit faradaic pseudocapacitive redox characteristics attributed to the surface redox processes of $Ni^{3+}/Ni^{2+}$ and $Co^{3+}/Co^{2+}$. The high reversibility of the NiCoLDH-1 electrode is evident from the persistence of redox peaks as the scan rate increases from 10 to 100 mV/sec. Notably, when the scan rate elevates from 10 to 100 mV/sec, the specific capacitance decreases from approximately 1210 to 410 F/g.

Figure 11H:
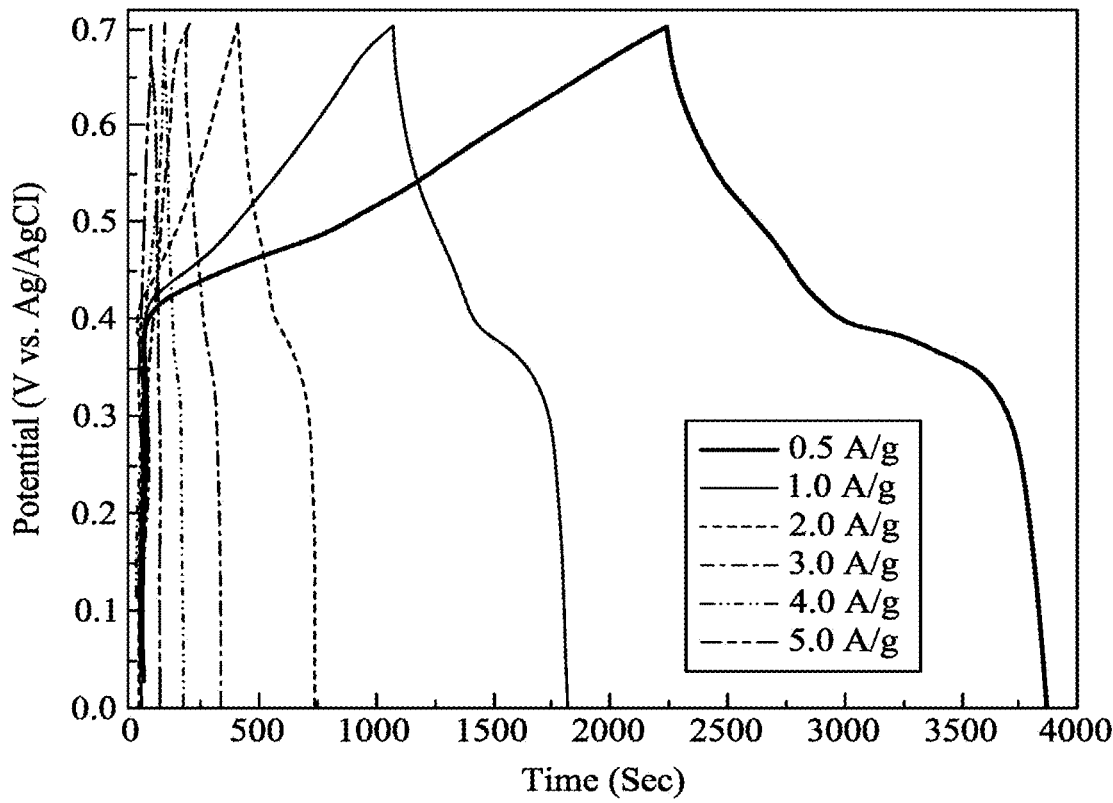
FIG. 11H shows GCD profiles of the NiCoLDH-1 electrode at various current densities, according to certain embodiments.
Figure 11I:
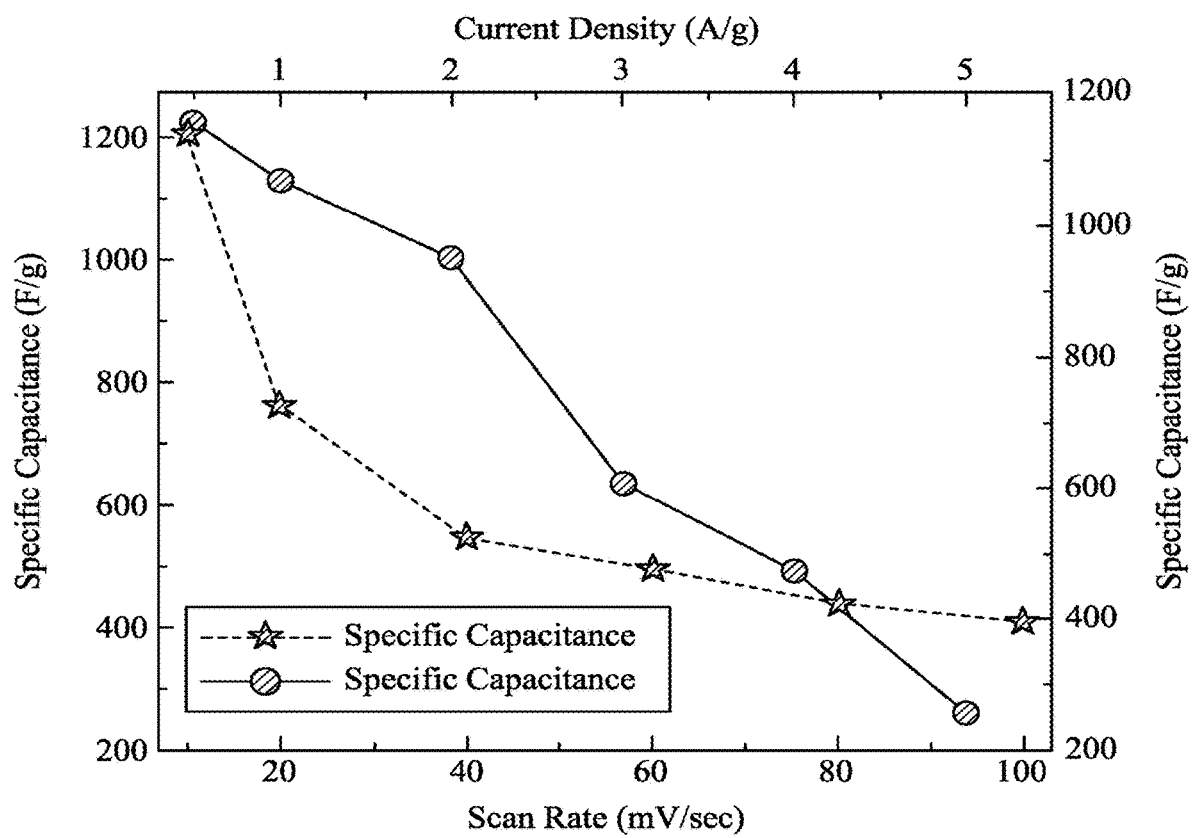
FIG. 11I depicts specific capacitances obtained from CV curves and GCD profiles of the NiCoLDH-1 electrode, according to certain embodiments.

GCD profiles of the NiCoLDH-1 electrode at current densities ranging from 0.5 to 5.0 A/g are presented in FIG. 11H. These profiles, characterized by a triangular shape with distinct polarized peaks, provide evidence of the favorable electrochemical pseudocapacitive characteristics exhibited by the NiCoLDH-1 electrode. FIG. 11I illustrates that as the current density increases from 0.5 to 5.0 A/g, the specific capacitance, as calculated from the GCD profiles, decreases from roughly 1160 to 260 F/g.

Figure 12A:
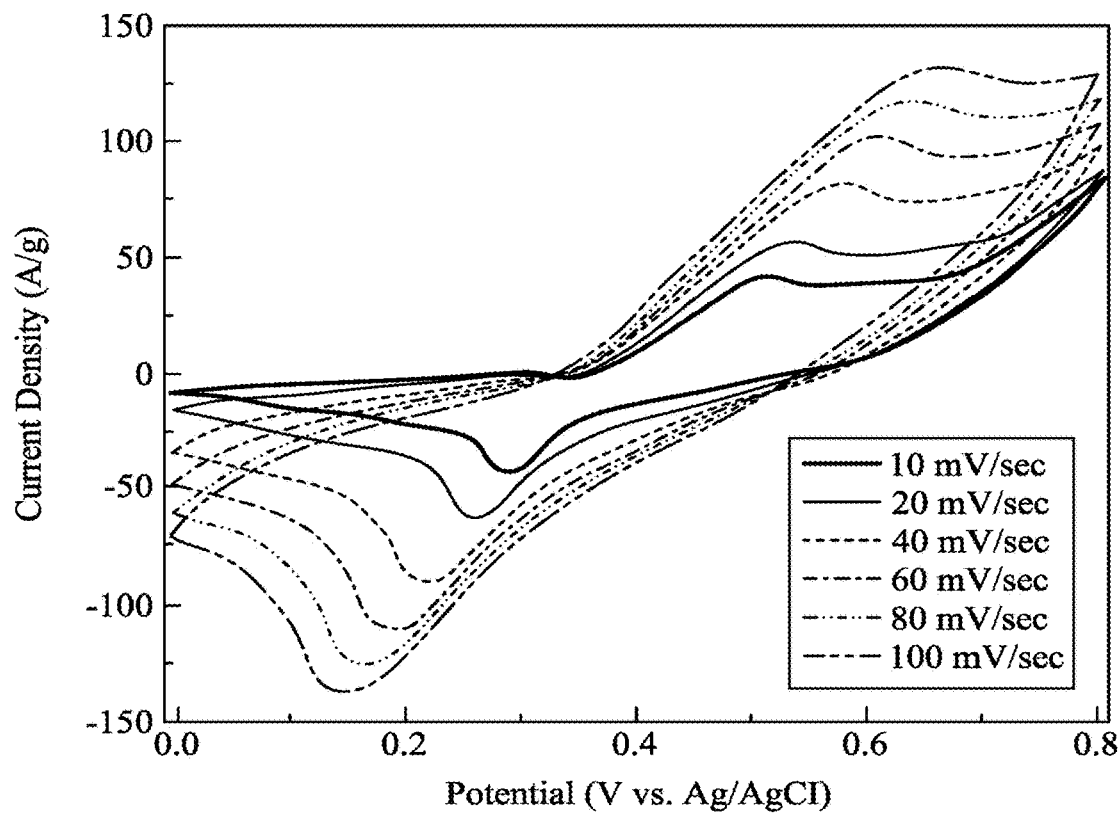
FIG. 12A depicts CV curves at various scan rates for the NiCoLDH-1@JAC-2 electrode, according to certain embodiments.

For the NiCoLDH-1@JAC-2 composite electrode, CV curves were obtained using a three-electrode electrochemical cell with an OPW ranging from 0 to 0.8 V, referenced to the Ag/AgCl electrode, as depicted in FIG. 12A. This configuration consisted of three electrodes: the NiCoLDH-1@JAC-2 composite, Ag/AgCl, and platinum wire, serving as reference and counter electrodes, respectively. The redox peaks in the CV curves of the NiCoLDH-1@JAC-2 composite electrode demonstrate a high level of reversibility, as evidenced by their remarkable stability when the scan rate is increased from 10 to 100 mV/sec. The JAC-2 material exhibits an increase in current density due to its high conductivity and extensive SSA, as evident from the CV curves. These characteristics enable the accommodation of a substantial quantity of electrolyte ions, resulting in reduced charge transfer resistance. Extrapolation of the CV curves reveals a decrease in specific capacitance from approximately 2550 to 730 F/g as the scan rate increases from 10 to 100 mV/sec.

Figure 12B:
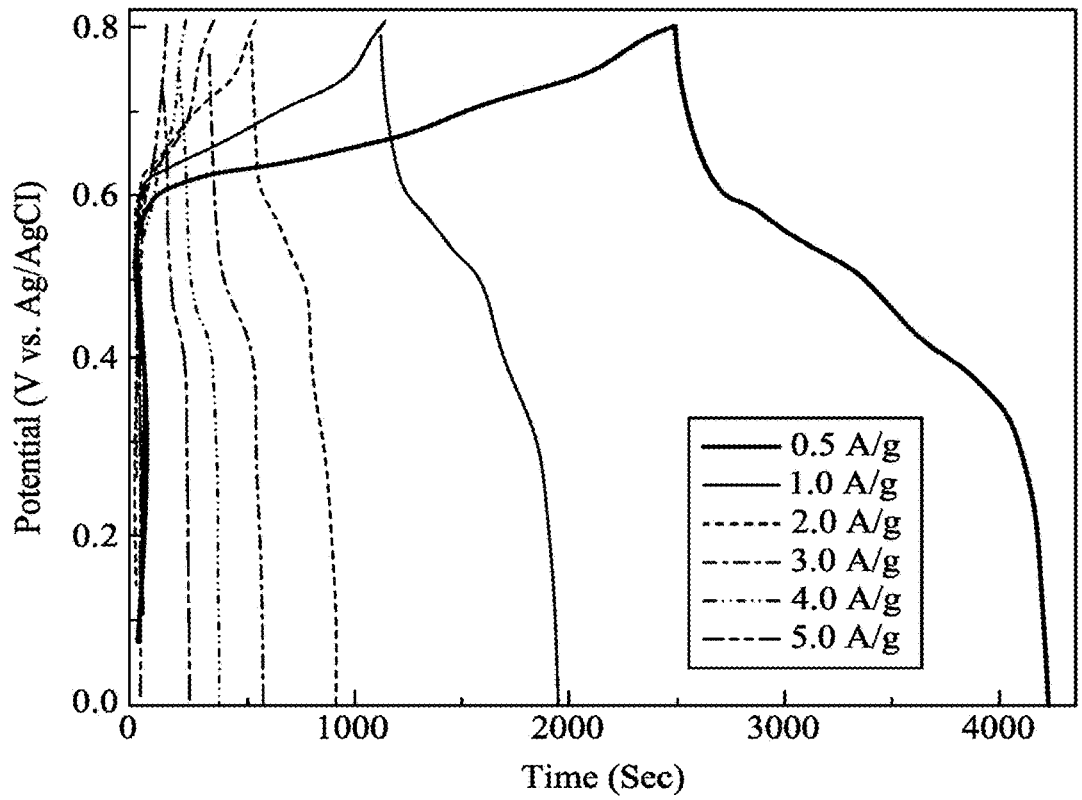
FIG. 12B depicts GCD profiles at various current densities for the NiCoLDH-1@JAC-2 electrode, according to certain embodiments.
Figure 12C:
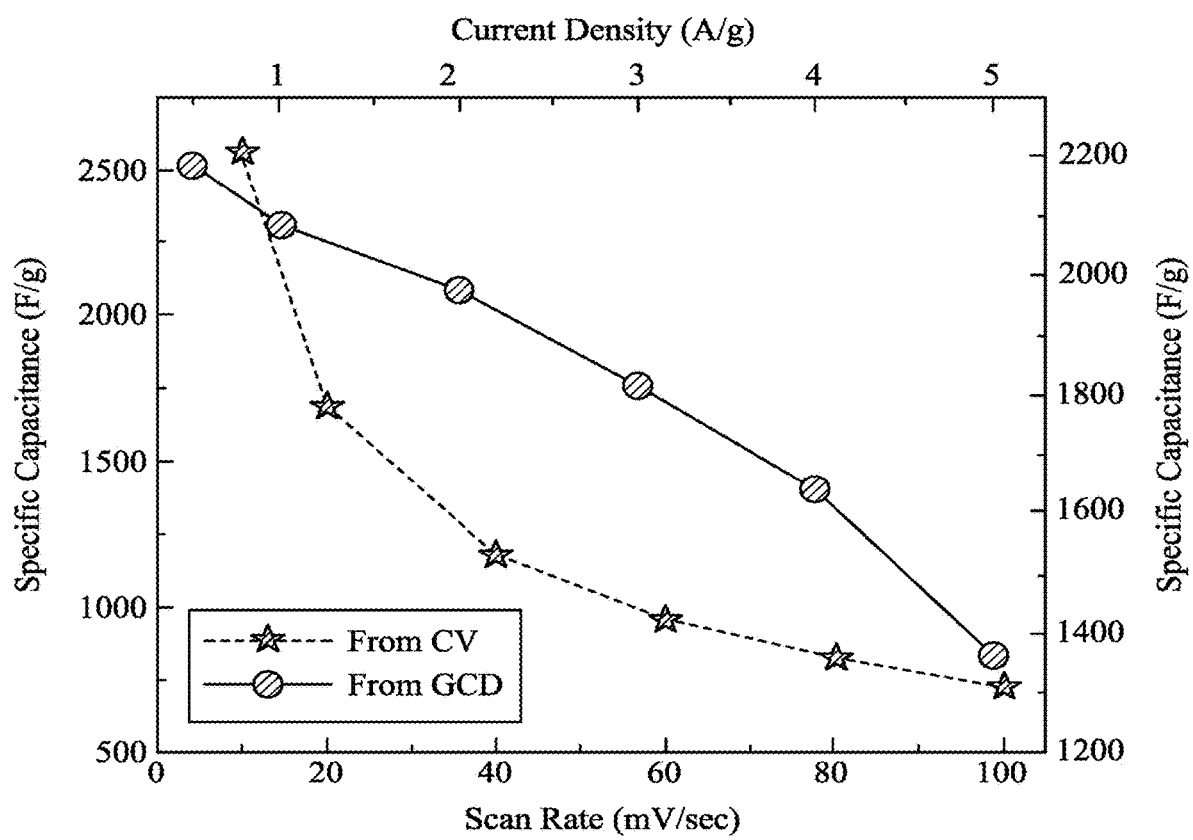
FIG. 12C depicts specific capacitances measured from CV curves and GCD profiles of the NiCoLDH-1@JAC-2 electrode, according to certain embodiments.

GCD profiles of the NiCoLDH-1@JAC-2 composite electrode at current densities ranging from 0.5 to 5.0 A/g are presented in FIG. 12B. The triangular form of the curves and the presence of polarized peaks indicate electrochemical pseudo-capacitance features of the NiCoLDH-1@JAC-2 composite electrode. FIG. 12C depicts specific capacitances measured from CV curves and GCD profiles of the NiCoLDH-1@JAC-2 electrode. The observed trend in FIG. 12C demonstrates a decrease in specific capacitances as the current density increases from 0.5 to 5.0 A/g, with values declining from approximately 2180 to 1362 F/g.

To determine the appropriate concentration of JAC-2 in the hydrothermal synthesis of NiCoLDH-1@JAC-2 nanocomposites, two additional nanocomposites were synthesized, each featuring distinct concentrations of JAC-2. These nanocomposites, denoted as NiCoLDH-1@JAC-2_10 (with 10 mg JAC-2) and NiCoLDH-1@JAC-2_30 (with 30 mg JAC-2), were prepared and compared to NiCoLDH-1@JAC-2 (20 mg JAC-2) in terms of their electrochemical performance. The experimental setup included several electrodes: a reference electrode composed of Ag/AgCl, a counter electrode made of platinum wire, a working electrode consisting of the nanocomposite electrode produced, and an aqueous electrolyte solution containing 3 M KOH.

Figure 13A:
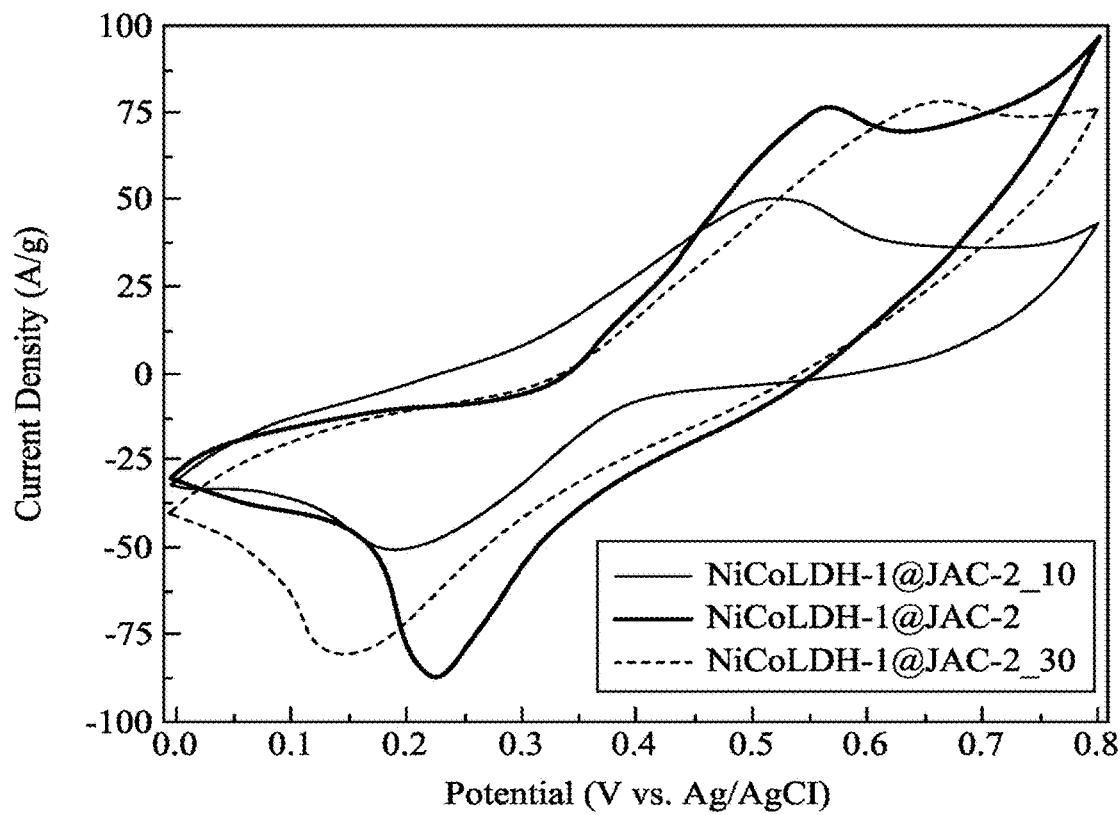
FIG. 13A depicts CV curves that were recorded at a constant scan rate of 50 mV/sec for the NiCoLDH-1@JAC-2 nanocomposite, according to certain embodiments.

FIG. 13A depicts CV curves that were recorded at a constant scan rate of 50 mV/sec in the 0.0 to 0.8 V (vs. Ag/AgCl) operating potential window (OPW). These curves illustrate that the prepared nanocomposites exhibit comparable redox peaks due to the use of the same redox-active material, specifically NiCoLDH-1. The electrochemical performance of the NiCoLDH-1@JAC-2_10 nanocomposite is characterized by a smaller area under the CV curve and lower oxidation and reduction current densities, indicating inferior electrochemical properties. In contrast, the NiCoLDH-1@JAC-2 and NiCoLDH-1@JAC-2_30 nanocomposites demonstrate nearly indistinguishable areas under the CV curve and comparable redox peak current densities. The NiCoLDH-1@JAC-2 nanocomposite exhibits a reduced potential gap between the reduction and oxidation peaks, indicating its exceptional conductivity and reversibility, which aligns with its improved electrochemical performance.

Figure 13B:
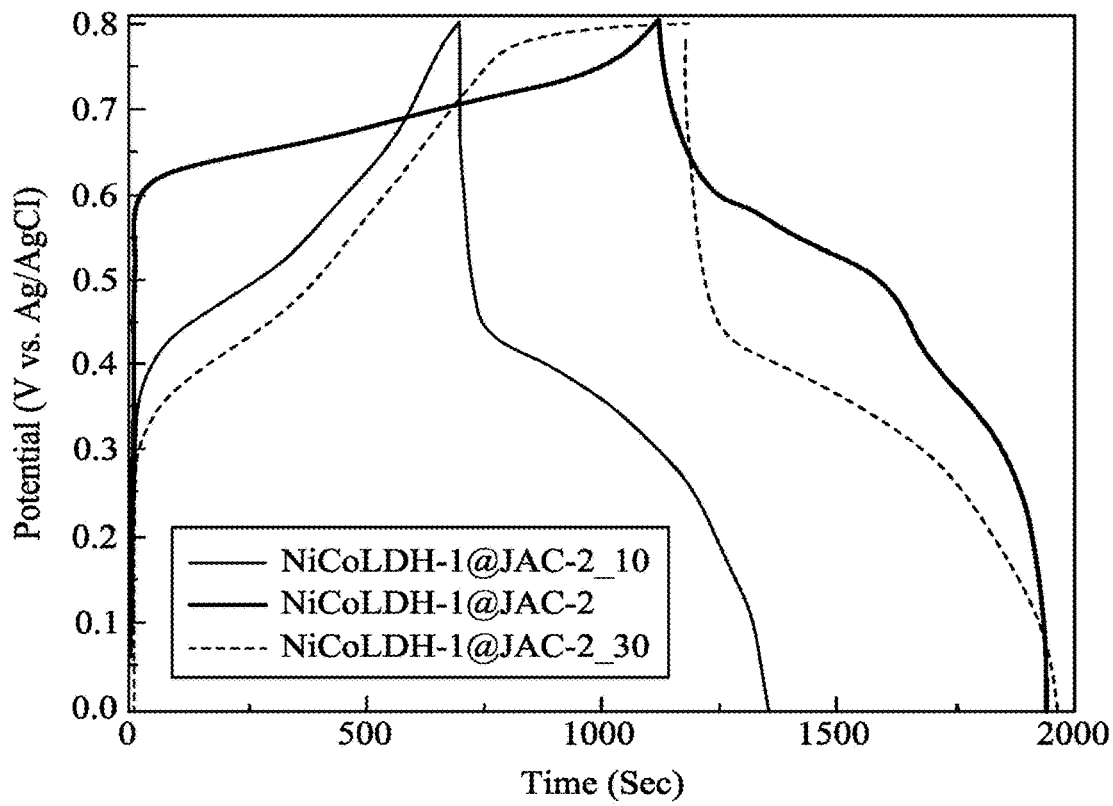
FIG. 13B illustrates CV profiles that were obtained at a fixed current density of 1.0 A/g within the 0.0 to 0.8 V (vs. Ag/AgCl) OPW for the NiCoLDH-1@JAC-2 nanocomposite, according to certain embodiments.

Similarly, FIG. 13B illustrates CV profiles that were obtained at a fixed current density of 1.0 A/g within the 0.0 to 0.8 V (vs. Ag/AgCl) OPW. The NiCoLDH-1@JAC-2_10 nanocomposite exhibits a shorter discharging time, implying a lower specific capacitance. On the other hand, the NiCoLDH-1@JAC-2 and NiCoLDH-1@JAC-2_30 nanocomposites exhibit similar charging and discharging times, indicating that their capacitances are comparable. It is worth noting that a larger IR drop can be observed in the GCD profile of the NiCoLDH-1@JAC-2_30 nanocomposite compared to the NiCoLDH-1@JAC-2 nanocomposite.

Figure 13C:
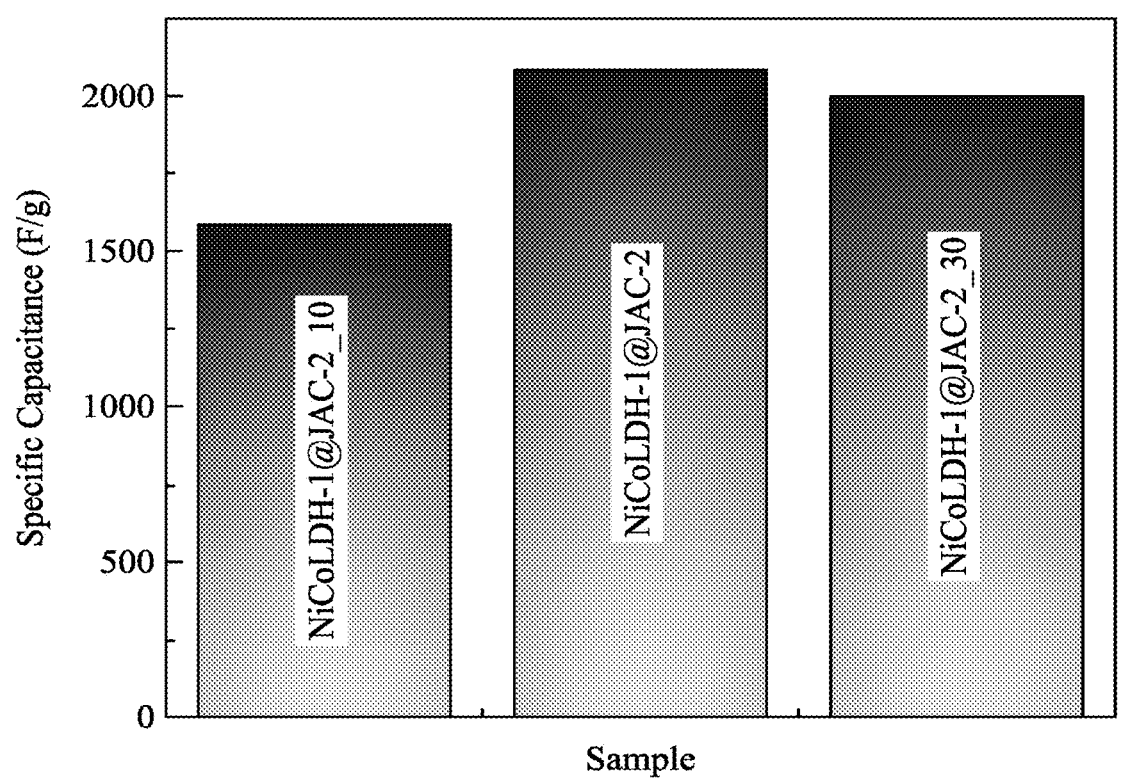
FIG. 13C shows specific capacitances calculated from the GCD profiles at a current density of 1.0 A/g for the NiCoLDH-1@JAC-2, NiCoLDH-1@JAC-2_10 (sample 1) and NiCoLDH-1@JAC-2_30 (sample 2) nanocomposites, according to certain embodiments.

The observed differences in electrochemical performance can be attributed to several factors. The highly porous JAC-2 nanosheets can provide more anchor points for NiCoLDH-1 growth, resulting in the nanocomposite with 20 mg JAC-2 exhibiting a greater area under the CV curve and higher current densities in the redox peaks compared to the sample without JAC-2 (i.e., NiCoLDH-1). However, further increasing the JAC-2 concentration leads to nanosheet stacking, hindering the further growth of NiCoLDH-1 and resulting in similar or decreased electrochemical performance. FIG. 13C presents the specific capacitances calculated from the GCD profiles at a current density of 1.0 A/g for the NiCoLDH-1@JAC-2 and NiCoLDH-1@JAC-2_30 nanocomposites are 1580, 2083, and 1998 F/g, respectively.

Figure 13D:
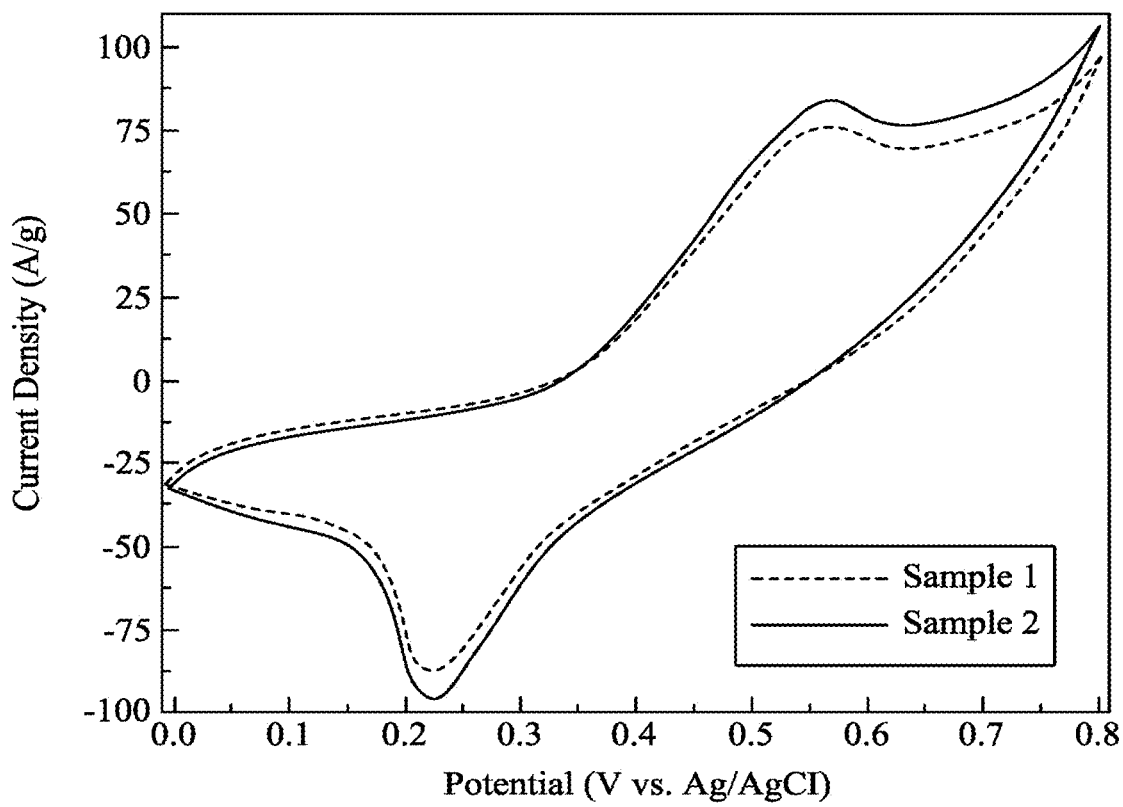
FIG. 13D depicts CV curves of sample 1 and sample 2 at a 50 mV/sec scan rate, according to certain embodiments.
Figure 13E:
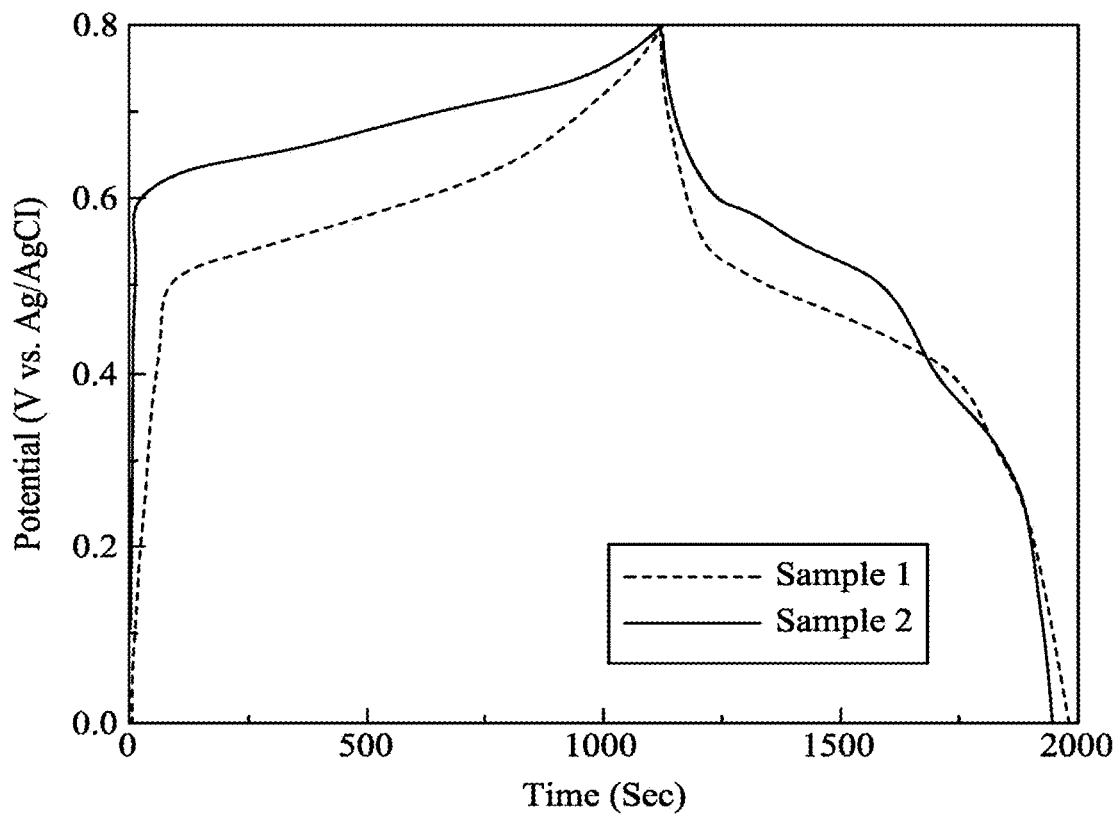
FIG. 13E shows GCD profiles of sample 1 and sample 2 at a 1.0 A/g current density, according to certain embodiments.
Figure 13F:
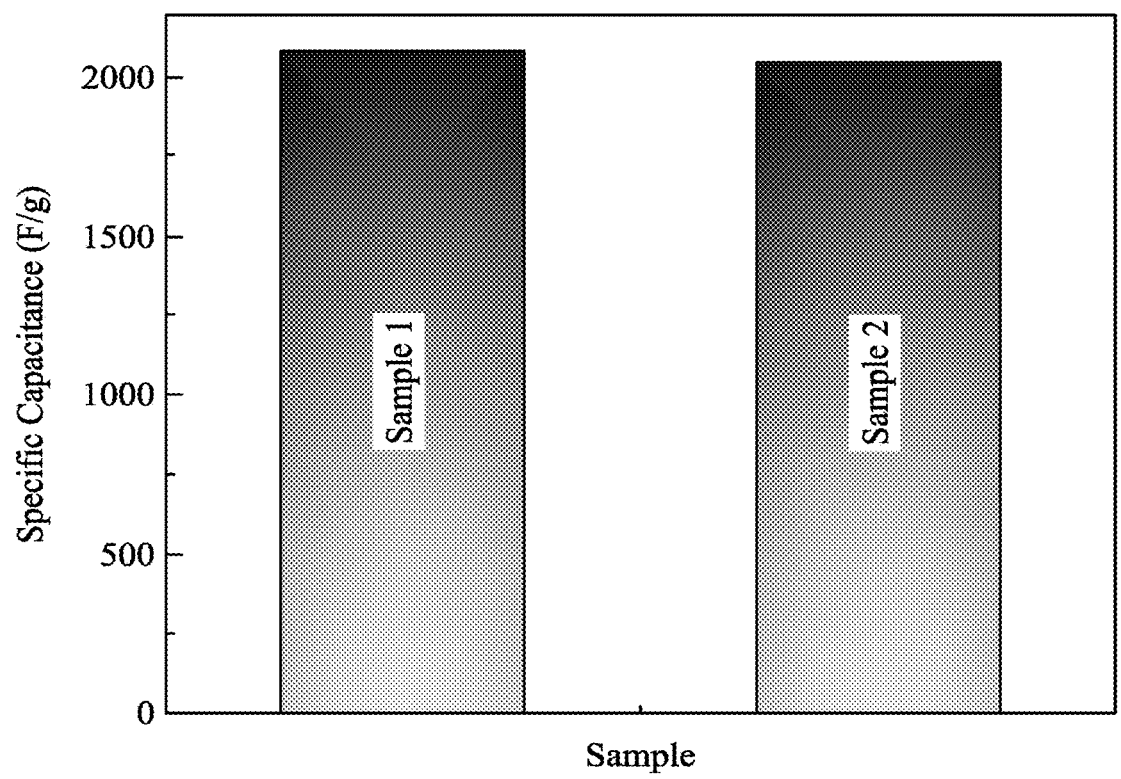
FIG. 13F illustrates specific capacitances measured from the GCD profiles of sample 1 and sample 2 of NiCoLDH-1@JAC-2 nanocomposite, according to certain embodiments.

To evaluate the reproducibility of the synthesis methods, an additional sample of LDH-1@JAC-2 nanocomposite (referred to as sample 2) was prepared under the same synthesis conditions. FIG. 13D presents the cyclic voltammetry (CV) profiles of two nanocomposite samples, LDH-1@JAC-2 (sample 1 and sample 2). The CV curves show comparable areas and current densities for both the oxidation and reduction peaks. Furthermore, FIG. 13E depicts the galvanostatic charge-discharge (GCD) profiles for both samples exhibit similar charging and discharging times. These results indicate consistency in electrochemical behavior between the two samples. Additionally, FIG. 13F illustrates the specific capacitances that were found to be similar for samples 1 (2083 F/g) and 2 (2054 F/g). This observation confirms the reproducible nature of the hydrothermal synthesis method employed for producing NiCo-LDH-1@JAC-2 nanocomposites.

An asymmetric hybrid supercapacitor (HSC) was prepared with the NiCoLDH-1@JAC-2 nanocomposite electrode (NiCoLDH-1@JAC-2//JAC-2). This device consisted of JAC-2 as the negative electrode, NiCoLDH-1@JAC-2 nanocomposite as the positive electrode, and PVA/KOH as a separator and electrolyte.

Figure 14A:
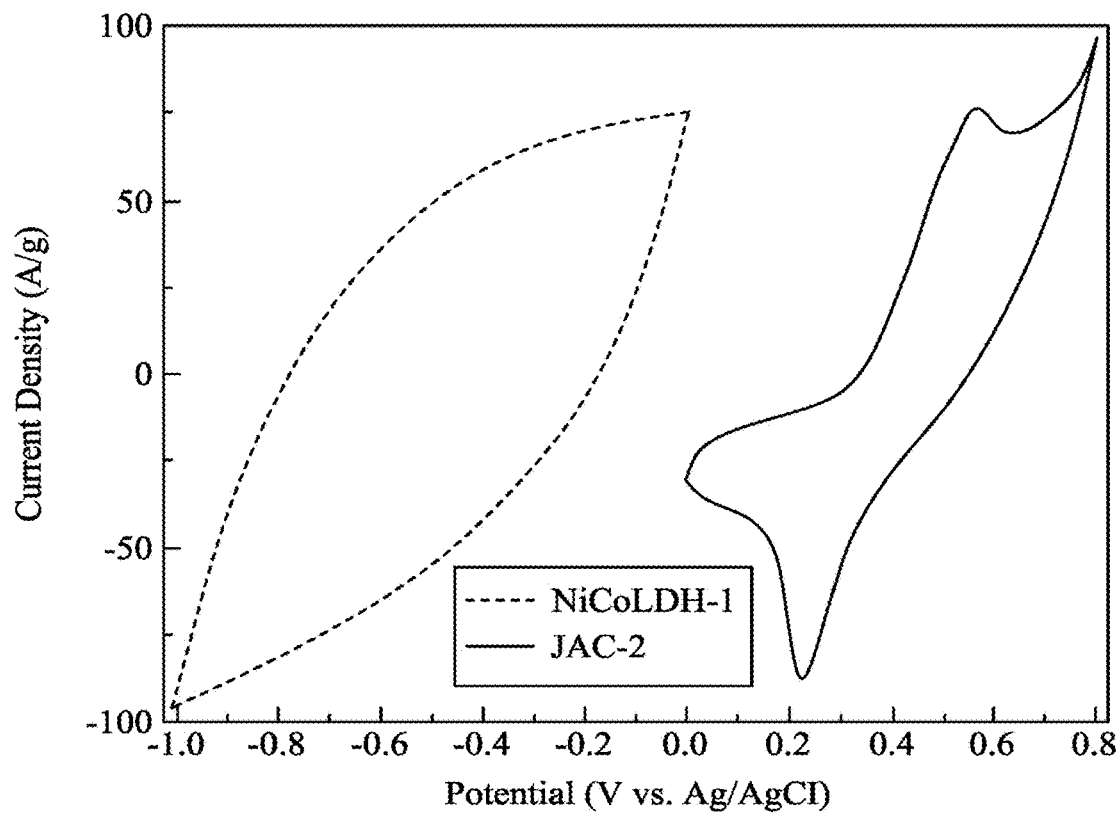
FIG. 14A depicts CV curves of the NiCoLDH-1 and JAC-2 in a three-electrode system recorded at a 50 mV/sec scan rate, according to certain embodiments.

FIG. 14A depicts the CV curves of the NiCoLDH-1@JAC-2 composite electrode and the JAC-2 electrode. These electrodes were examined in a three-electrode electrochemical cell, utilizing a 50 mV/sec scan rate and a 3 M KOH aqueous electrolyte. The OPW for the positive electrode (NiCoLDH-1@JAC-2) was found to be from 0 to 0.8 V (vs. Ag/AgCl), while for the negative electrode (JAC-2), it was from −1.0 to 0.0 V (vs. Ag/AgCl). The NiCoLDH-1@JAC-2//JAC-2 HSC device has a total OPW of 1.8 V, which is the sum of the OPWs at the positive and negative electrodes. Pseudocapacitive behavior was confirmed by the presence of prominent redox peaks in the CV curve of the NiCoLDH-1@JAC-2 nanocomposite electrode, whereas the quasi-rectangular shape of the CV curve of the JAC-2 electrode indicated EDLC behavior.

Figure 14B:
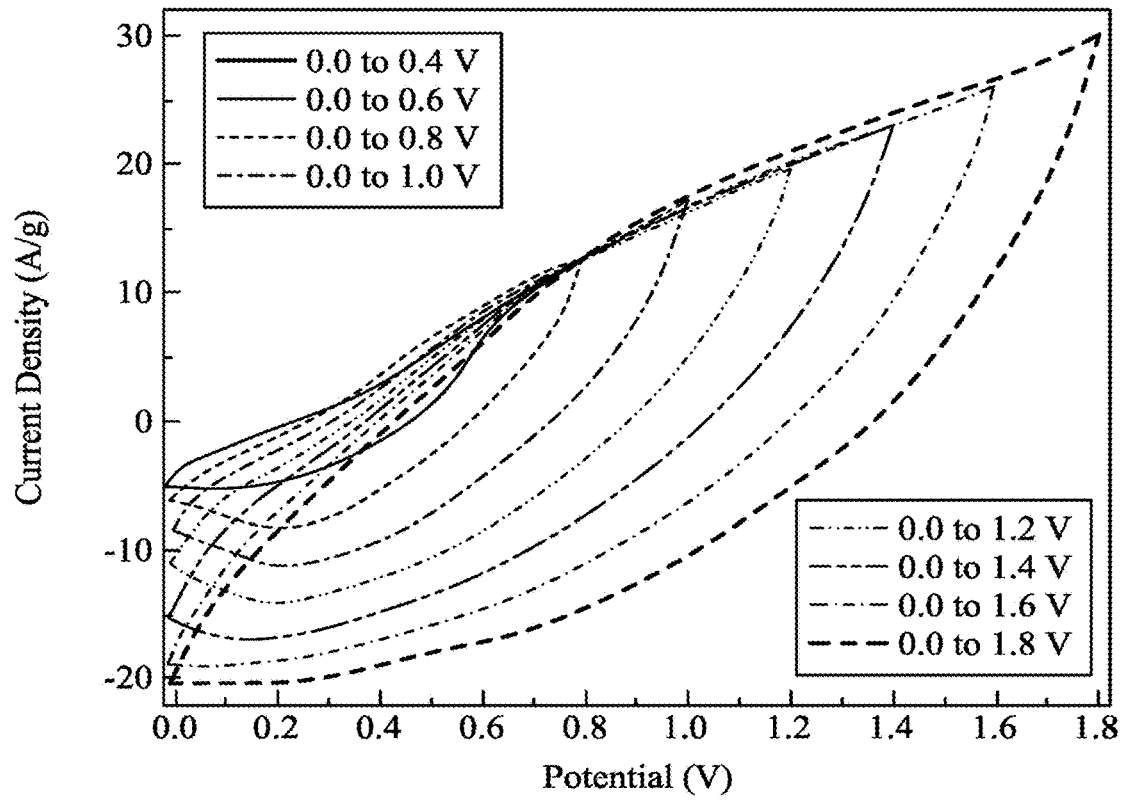
FIG. 14B depicts CV curves of the asymmetric HSC device (NiCoLDH-1@JAC-2//JAC-2) in various OPWs at a 50 mV/sec scan rate, according to certain embodiments.

FIG. 14B depicts the CV curves of the NiCoLDH-1@JAC-2//JAC-2 HSC device at a constant scan rate of 50 mV/sec for various OPWs. It is evident that the NiCoLDH-1@JAC-2//JAC-2 HSC can be operated within a wider OPW range of 0-1.8 V. The cyclic voltammogram of the NiCoLDH-1@JAC-2//JAC-2 HSC exhibited a quasi-rectangular shape, which indicates the combined influence of both pseudocapacitance (from NiCoLDH-1@JAC-2) and EDLC (from JAC-2). The expansion of the OPW resulted in a corresponding increase of Faradic electrochemical processes, as evidenced by the findings presented in FIG. 14B. Notably, the onset of oxygen evolution was observed when the OPW reached approximately 1.8 V. Hence, in order to conduct a more comprehensive evaluation of the electrochemical performance of the NiCoLDH-1@JAC-2//JAC-2 HSC, a cut-off OPW of 1.0 V was utilized.

Figure 14C:
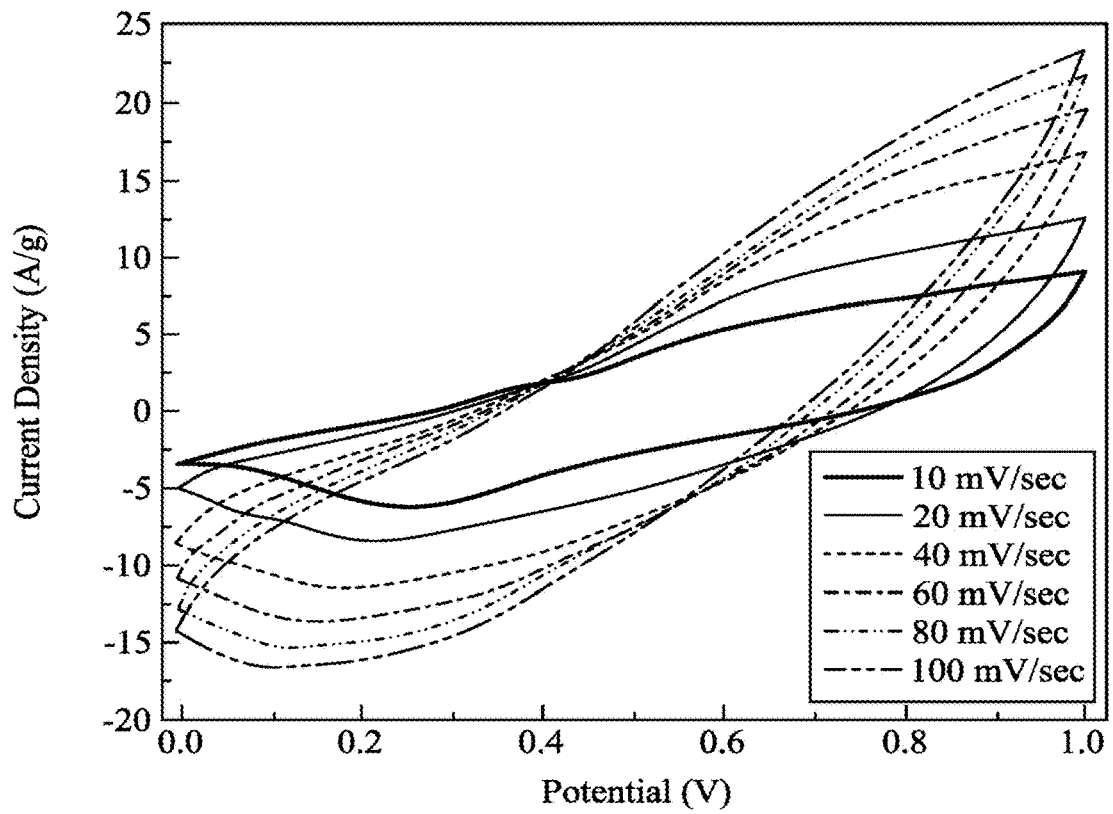
FIG. 14C depicts CV curves of NiCoLDH-1@JAC-2//JAC-2 at various scan rates, according to certain embodiments.
Figure 14D:
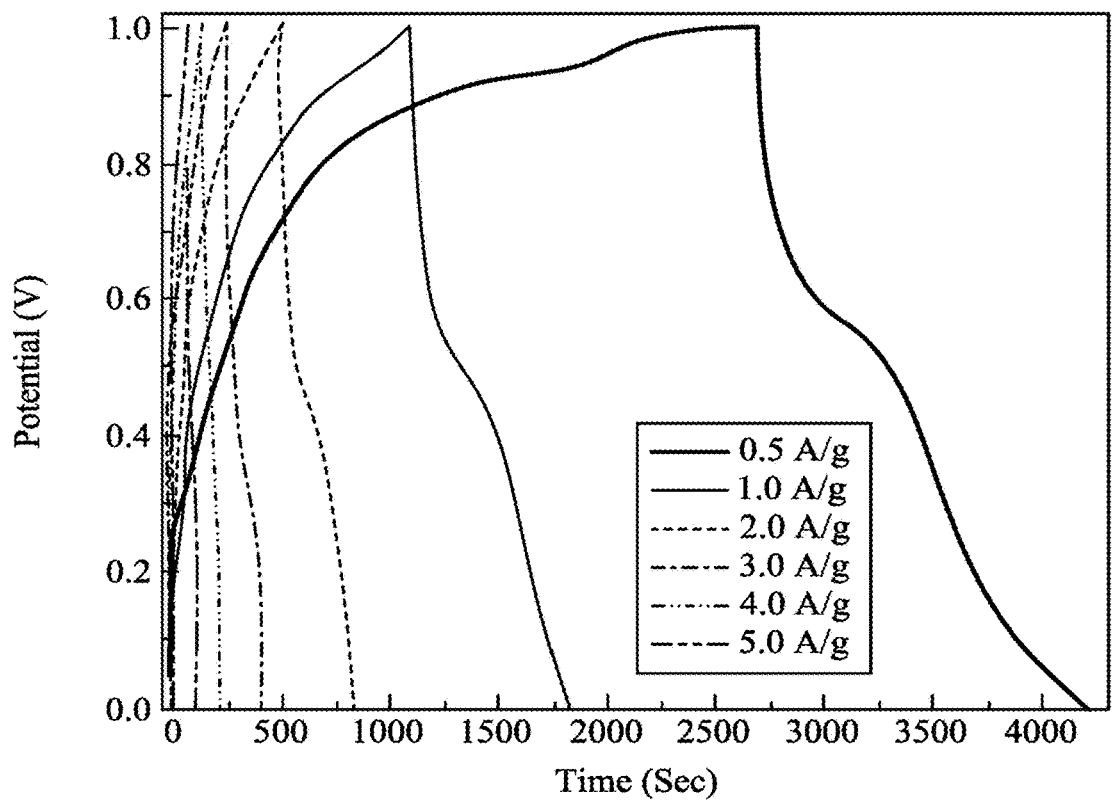
FIG. 14D shows GCD profiles of NiCoLDH-1@JAC-2//JAC-2 at different current densities, according to certain embodiments.

FIG. 14C shows the HSC CV curves for NiCoLDH-1@JAC-2//JAC-2 at different scan rates within the OPW range of 0 to 1.0 V. With increasing scan rates, both the oxidation peak current and the area under the CV curves increased. Despite the higher scan rate of 100 mV/sec, the CV curves of the NiCoLDH-1@JAC-2//JAC-2 HSC remained relatively quasi-rectangular with polarized peaks, indicating favorable EDLC and pseudocapacitor behaviors. This demonstrates the charge/discharge characteristics and remarkable rate capability of the NiCoLDH-1@JAC-2// JAC-2 HSC. FIG. 14D illustrates the distinctive GCD profiles of the NiCoLDH-1@JAC-2//JAC-2 HSC at various current densities, ranging from 0.5 to 5.0 A/g. The symmetrical GCD profiles designate complete reversibility of the electrochemical redox processes. Notably, the low IR drop in the GCD profile at a current density of 0.5 A/g reflects the ionic and electronic conductivity of the electrode materials during the fabrication process of the NiCoLDH-1@JAC-2//JAC-2 HSC.

Figure 14E:
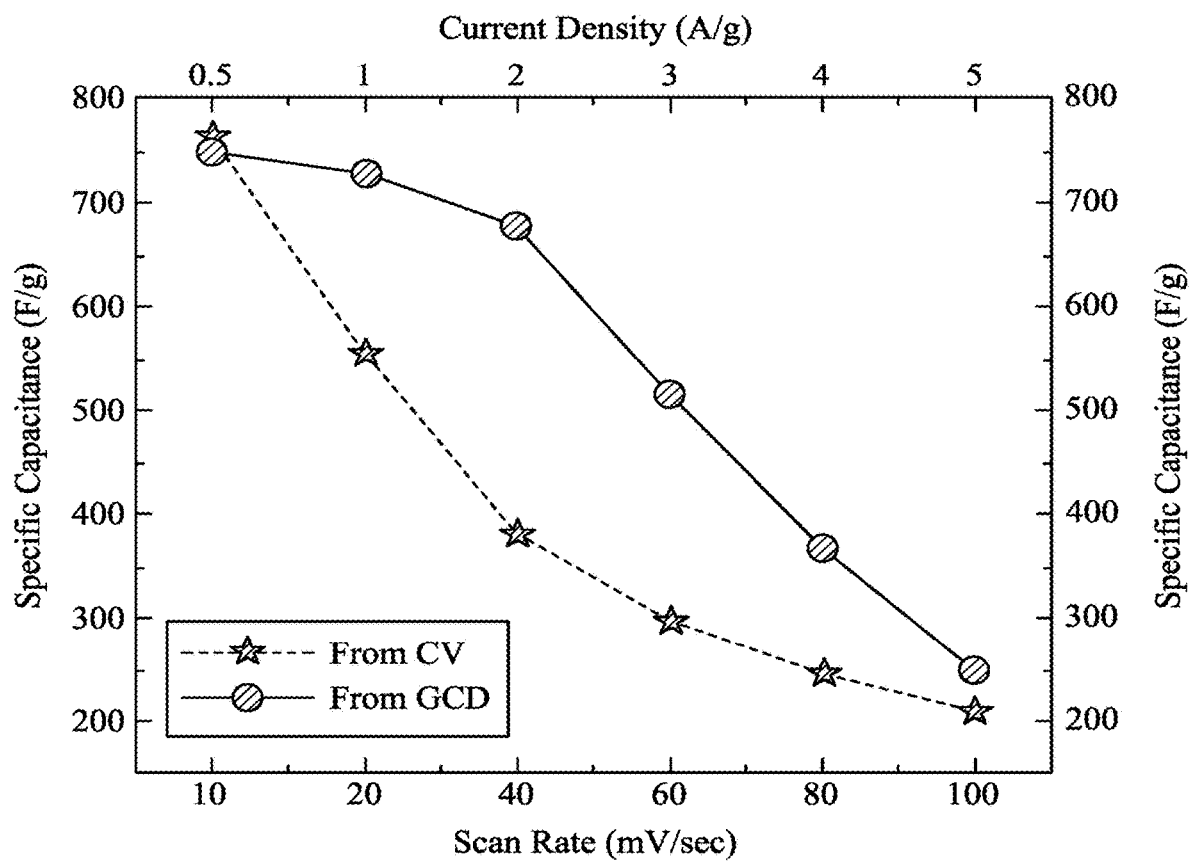
FIG. 14E depicts the specific capacitances of NiCoLDH-1@JAC-2//JAC-2, according to certain embodiments.

FIG. 14E depicts the specific capacitances of the NiCoLDH-1@JAC-2//JAC-2 HSC, illustrating their dependency on scan rates as determined from CV curves and current densities as derived from GCD profiles. It is evident that as the scan rate decreases from 100 to 10 mV/sec, the specific capacitance increases from 210 to 763 F/g. Similarly, by reducing the current density in the GCD measurements from 5.0 to 0.5 A/g, the specific capacitance rises from 250 to 748 F/g. Additionally, assessing energy and power densities, is a part of the investigation into the electrochemical performance of the NiCoLDH-1@JAC-2// JAC-2 HSC.

Figure 14F:
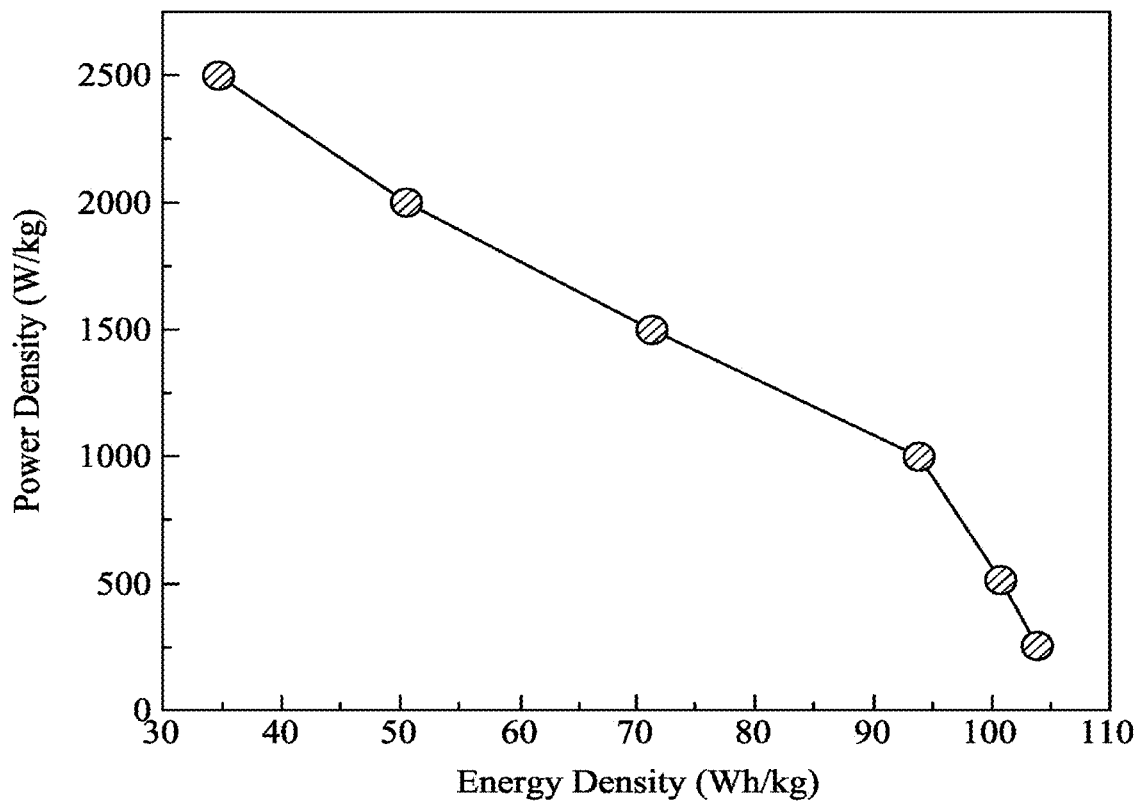
FIG. 14F depicts Ragone plot of NiCoLDH-1@JAC-2//JAC-2, according to certain embodiments.

The Ragone plot of the NiCoLDH-1@JAC-2//JAC-2 HSC is depicted in FIG. 14F. This plot illustrates the relationship between energy and power densities. The NiCoLDH-1@JAC-2//JAC-2 HSC reaches its maximum energy density of 100 Wh/kg at a current density of 0.5 A/g, with a corresponding power density of 250 W/kg. The power density increases to 2500 W/kg at a current density of 5.0 A/g, while the energy density decreases to 35 Wh/kg.

Figure 14G:
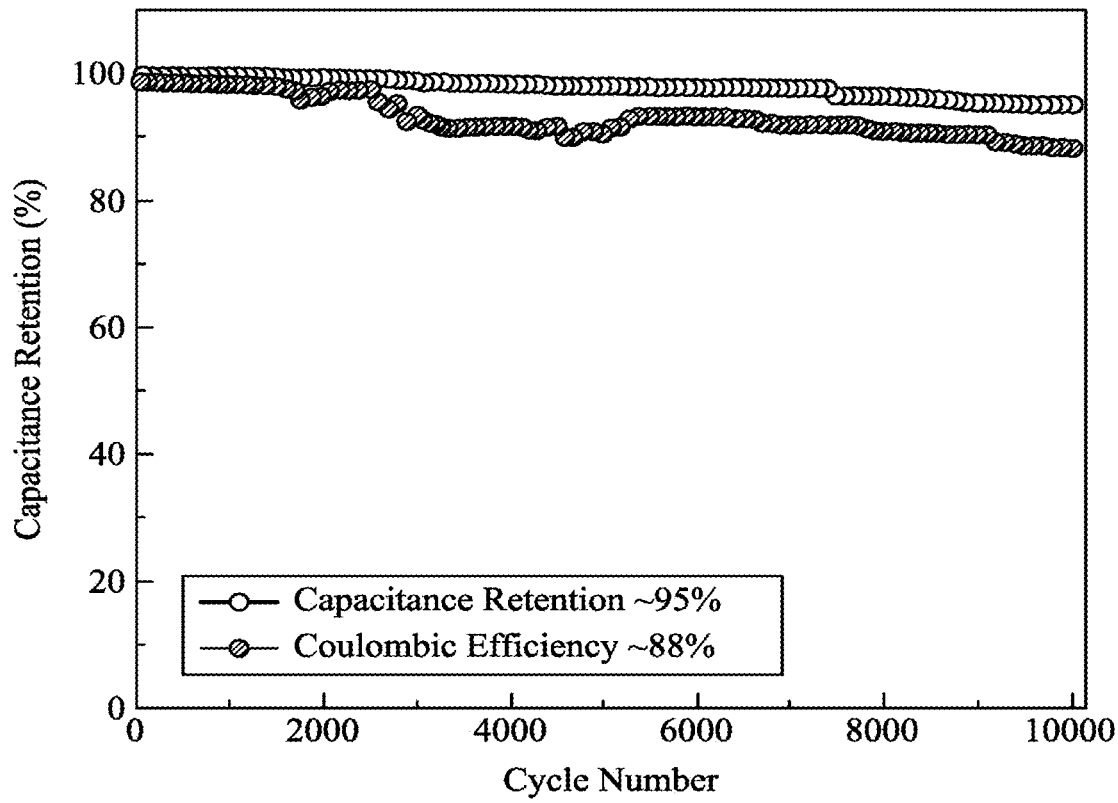
FIG. 14G presents capacitance retention and Coulombic efficiency of NiCoLDH-1@JAC-2//JAC-2, according to certain embodiments.

GCD measurements were conducted at a current density of 10.0 A/g for 10,000 cycles to evaluate the cyclic stability of the developed NiCoLDH-1@JAC-2//JAC-2 HSC device with PVA/KOH electrolyte. FIG. 14G presents capacitance retention and Coulombic efficiency. The results indicate that after 10,000 GCD cycles, the NiCoLDH-1@JAC-2//JAC-2 HSC maintains approximately 95% of its initial capacitance and exhibits a Coulombic efficiency of approximately 88%. This observed phenomenon provides strong evidence for the robust cyclic stability of the NiCoLDH-1@JAC-2//JAC-2 HSC, particularly at high current density. The symmetric supercapacitor employing a PVA/KOH electrolyte demonstrates potential for maintaining high cyclic stability over an extended period. Despite enduring numerous deep charge-discharge cycles, its performance remains consistent. The slight decline in capacitance retention and Coulombic efficiency after 10,000 cycles can be attributed to the accumulation of electrode material and subsequent deterioration of adhesion between the electrode materials and the current collector.

Figure 14H:
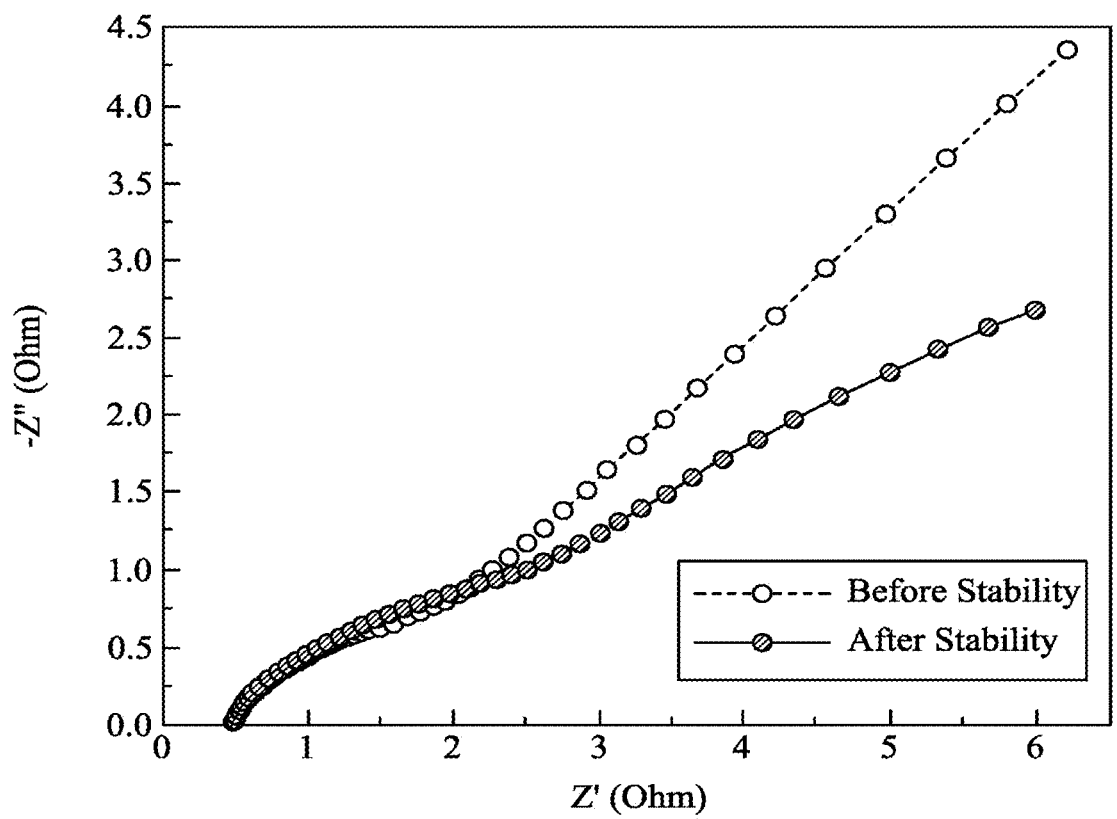
FIG. 14H shows Nyquist plots before and after 10,000 GCD cycles of NiCoLDH-1@JAC-2//JAC-2 HSC, according to certain embodiments.

FIG. 14H offers insight into cyclic stability by overlaying the Nyquist plot for the NiCoLDH-1@JAC-2//JAC-2 HSC with the EIS spectra obtained before and after the 10,000 GCD cycle test. The high-frequency zone (lower Z' values) exhibits a semicircle, while the low-frequency region (higher Z' values) displays a straight line. The stability test indicates a short ion/electron pathway due to the narrow diameter of the semicircle, which was also observed before the test. Notably, the EIS spectra reveal similarities in the ion/electron transport channel after cyclic stability. Similarly, it can be observed that a linear slope in the low-frequency region of the Nyquist plot prior to cycling signifies reduced resistance to interfacial diffusion, implying enhanced ion diffusion and efficient mass transport across the interface between the electrode and electrolyte.

Numerous modifications and variations of the present disclosure are possible in light of the above teachings. It is therefore to be understood that within the scope of the appended claims, the invention may be practiced otherwise than as specifically described herein.

The invention claimed is:

1. An electrode, comprising:
   a substrate;
   a binding compound, and
   a composite,
   wherein the composite comprises:
      jute activated carbon; and
      a nickel-cobalt-layered double hydroxide (NiCoLDH),
   wherein particles of the NiCoLDH are in a form of nanoflowers with an average size of 5-15 µm,
   wherein the nanoflowers comprise nanosheets with an average thickness of 5-20 nm,
   wherein particles of the jute activated carbon are in a form of interconnected nanosheets which form a porous carbon framework,
   wherein the porous carbon framework connects the nanoflowers thereby forming an interconnected structure in the composite, and
   wherein a mixture of the composite and the binding compound is coated on a surface of the substrate.

2. The electrode of claim 1, wherein the mixture comprises 70-95 wt. % of the composite, based on a total weight of the binding compound and the composite.

3. The electrode of claim 1, wherein the NiCoLDH comprises $Co^{2+}$ and $Co^{3+}$.

4. The electrode of claim 1, wherein the NiCoLDH has a molar ratio of Ni to Co of 1:2 to 2:1.

5. The electrode of claim 1, wherein the nanosheets of the NiCoLDH have an average width of 50-500 nm and an average length of greater than 100 nm.

6. The electrode of claim 1, wherein the nanosheets of the jute activated carbon have an average thickness of from 7 to 15 nm and an average width of 50-200 nm.

7. The electrode of claim 1, wherein the porous carbon framework of the jute activated carbon comprises pores greater than 200 nm in size.

8. The electrode of claim 1, wherein a surface area of the jute activated carbon is greater than 2,000 $m^2/g$.

9. The electrode of claim 1, wherein the jute activated carbon has a pore volume of from 0.5-1.5 $cm^3/g$.

10. The electrode of claim 1, wherein the composite comprises 25-45 wt. % carbon, 15-35 wt. % oxygen, 10-30 wt. % cobalt, and 10-30 wt. % nickel, based on a total weight of the composite.

11. A method of making the electrode of claim 1, comprising:
   pyrolyzing jute sticks at a temperature of 300-500° C. to form partially carbonized jute powder;
   mixing the partially carbonized jute powder with a base and pyrolyzing at a temperature of 700-900° C. to form the jute activated carbon;
   mixing a cobalt salt, a nickel salt, and cetrimonium bromide in a solvent to form a first solution;
   heating the first solution and the jute activated carbon in an autoclave for 10-20 hours at a temperature of 150-250° C. to form the composite; and
   coating the surface of the substrate with the mixture to form the electrode.

12. A supercapacitor, comprising:
   a negative electrode;
   the electrode of claim 1 as a positive electrode; and
   a solid-state electrolyte,
   wherein the negative electrode comprises:
      a second substrate;
      the jute activated carbon; and
      a binding compound,
   wherein a second mixture of the jute activated carbon and the binding compound is coated on a surface of the second substrate,
   wherein the positive and negative electrodes are disposed facing each other, and
   wherein the solid-state electrolyte is present between the positive and negative electrodes to form the supercapacitor.

13. The supercapacitor of claim 12, wherein the substrate and the second substrate are made from at least one material selected from the group consisting of stainless steel, aluminum, nickel, copper, platinum, zinc, tungsten, and titanium.

14. The supercapacitor of claim 12, wherein the solid-state electrolyte comprises a base and a polymer.

15. The supercapacitor of claim 12, wherein the solid-state electrolyte comprises polyvinyl alcohol and potassium hydroxide.

16. The supercapacitor of claim 12, having a specific capacitance of 700-800 F/g at a current density of 0.5 A/g.

17. The supercapacitor of claim 12, having an energy density of 90-110 Wh/kg at a power density of 250 W/kg.

18. The supercapacitor of claim 12, having a capacitance retention of at least 85% after 10,000 charge-discharge cycles.

19. A power bank, comprising:
   2-10 of the supercapacitors of claim 12 connected in parallel and/or series.

* * * * *